(12) United States Patent
Chiang et al.

(10) Patent No.: US 12,442,089 B2
(45) Date of Patent: *Oct. 14, 2025

(54) CHEMICAL REACTION DEVICES INVOLVING ACID AND/OR BASE, AND RELATED SYSTEMS AND METHODS

(71) Applicant: Massachusetts Institute of Technology, Cambridge, MA (US)

(72) Inventors: Yet-Ming Chiang, Weston, MA (US); Leah Ellis, Nova Scotia (CA); Andres Badel, Deerfield Beach, FL (US); Isaac W. Metcalf, Austin, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,403

(22) Filed: Dec. 22, 2023

(65) Prior Publication Data

US 2024/0133054 A1 Apr. 25, 2024

Related U.S. Application Data

(63) Continuation of application No. 17/438,888, filed as application No. PCT/US2020/022672 on Mar. 13, 2020.

(60) Provisional application No. 62/962,061, filed on Jan. 16, 2020, provisional application No. 62/887,143, filed on Aug. 15, 2019, provisional application No. 62/818,604, filed on Mar. 14, 2019.

(51) Int. Cl.
  C25B 1/00 (2021.01)
  C04B 7/06 (2006.01)
  C25B 1/22 (2006.01)

(52) U.S. Cl.
  CPC . *C25B 1/22* (2013.01); *C04B 7/06* (2013.01)

(58) Field of Classification Search
  CPC .................................. C25B 1/22; C04B 7/06
  See application file for complete search history.

(56) References Cited

U.S. PATENT DOCUMENTS

| | | | |
|---|---|---|---|
| 2,669,542 | A | 2/1954 | Dooley |
| 3,074,860 | A | 1/1963 | Shinzoh |
| 3,861,928 | A | 1/1975 | Slater |
| 4,110,399 | A | 8/1978 | Gaudernack et al. |
| 4,190,632 | A | 2/1980 | Achenbach et al. |
| 4,196,068 | A | 4/1980 | Scoville |
| 4,367,215 | A | 1/1983 | Gjelsvik et al. |
| 4,654,135 | A | 3/1987 | Yamamoto et al. |
| 4,749,453 | A | 6/1988 | Harris |
| 5,572,938 | A | 11/1996 | Leger |

(Continued)

FOREIGN PATENT DOCUMENTS

| | | |
|---|---|---|
| CN | 1137575 A | 12/1996 |
| CN | 1210153 A | 3/1999 |

(Continued)

OTHER PUBLICATIONS

Brazilian Office Action for BR 112021013144.2, mailed Nov. 7, 2023.

(Continued)

*Primary Examiner* — Zulmariam Mendez
(74) *Attorney, Agent, or Firm* — Wolf, Greenfield & Sacks, P.C.

(57) ABSTRACT

Chemical reaction devices involving acid and/or base, and related systems and methods, are generally described.

20 Claims, 23 Drawing Sheets

(56) References Cited

U.S. PATENT DOCUMENTS

| | | |
|---|---|---|
| 5,853,685 A | 12/1998 | Erickson |
| 6,284,207 B1 | 9/2001 | McCauley |
| 7,534,411 B2 | 5/2009 | Shapira et al. |
| 7,993,500 B2 | 8/2011 | Gilliam et al. |
| 8,357,270 B2 | 1/2013 | Gilliam et al. |
| 9,200,375 B2 | 12/2015 | Gilliam et al. |
| 9,297,082 B2 | 3/2016 | Licht |
| 9,718,731 B2 | 8/2017 | Bullerjahn et al. |
| 11,718,558 B2 | 8/2023 | Finke et al. |
| 2008/0124269 A1 | 5/2008 | Daudey et al. |
| 2008/0245660 A1 | 10/2008 | Little et al. |
| 2010/0101955 A1 | 4/2010 | Nocera et al. |
| 2010/0154593 A1 | 6/2010 | Ratchev et al. |
| 2011/0044882 A1 | 2/2011 | Buckley et al. |
| 2011/0182786 A1 | 7/2011 | Burba, III et al. |
| 2011/0233055 A1 | 9/2011 | Cerezo |
| 2012/0121491 A1 | 5/2012 | Rau |
| 2012/0234137 A1 | 9/2012 | Netten et al. |
| 2013/0153437 A1 | 6/2013 | Sandoval et al. |
| 2014/0010743 A1 | 1/2014 | Kosmoski et al. |
| 2015/0211094 A1 | 7/2015 | Vaisanen et al. |
| 2015/0343373 A1 | 12/2015 | Balfe et al. |
| 2016/0032421 A1 | 2/2016 | Boudreault et al. |
| 2016/0137551 A1 | 5/2016 | Le Gouil et al. |
| 2017/0022110 A1 | 1/2017 | Ulrike et al. |
| 2017/0240432 A1 | 8/2017 | Jung et al. |
| 2018/0037501 A1 | 2/2018 | Guynn et al. |
| 2019/0040347 A1 | 2/2019 | Kim et al. |
| 2019/0078170 A1 | 3/2019 | Fukui et al. |
| 2019/0226051 A1 | 7/2019 | Pierpoint et al. |
| 2021/0179492 A1 | 6/2021 | Hoffmann |
| 2022/0064063 A1 | 3/2022 | Chiang et al. |
| 2022/0145477 A1 | 5/2022 | Chiang et al. |
| 2023/0036470 A1 | 2/2023 | Finke et al. |
| 2023/0174396 A1 | 6/2023 | Chiang et al. |
| 2023/0295046 A1 | 9/2023 | Benck et al. |
| 2023/0313386 A1 | 10/2023 | Ellis et al. |
| 2023/0330724 A1 | 10/2023 | Chiang et al. |
| 2024/0083819 A1 | 3/2024 | Benck et al. |
| 2024/0124987 A1 | 4/2024 | Chiang et al. |
| 2024/0132400 A1 | 4/2024 | Chiang et al. |
| 2024/0150235 A1 | 5/2024 | Chiang et al. |

FOREIGN PATENT DOCUMENTS

| | | |
|---|---|---|
| CN | 1792789 A | 6/2006 |
| CN | 1805196 A | 7/2006 |
| CN | 101624181 A | 1/2010 |
| CN | 101981744 A | 2/2011 |
| CN | 102016123 A | 4/2011 |
| CN | 102149852 A | 8/2011 |
| CN | 102149854 A | 8/2011 |
| CN | 102730734 A | 10/2012 |
| CN | 103882468 A | 6/2014 |
| CN | 105263872 A | 11/2014 |
| CN | 104261449 A | 1/2015 |
| CN | 104520237 A | 4/2015 |
| CN | 104649328 A | 5/2015 |
| CN | 105126599 A | 12/2015 |
| CN | 105621744 A | 6/2016 |
| CN | 109970373 A | 7/2019 |
| CN | 110590007 A | 12/2019 |
| CN | 111394598 A | 7/2020 |
| EP | 0499666 A1 | 8/1992 |
| EP | 2816140 A1 | 12/2014 |
| FR | 2748755 A | 11/1997 |
| GB | 1008196 A | 10/1965 |
| GB | 1488339 A | 10/1977 |
| JP | 2001-058170 A | 3/2001 |
| JP | 2010-055951 A | 3/2010 |
| JP | 3192728 U | 8/2014 |
| JP | 2015-074575 A | 4/2015 |
| JP | 2016-020296 A | 2/2016 |
| JP | 2002-018395 A | 1/2022 |
| JP | 2002-018396 A | 1/2022 |
| JP | 2022-517257 A | 3/2022 |
| KR | 10-2017-0077777 A | 7/2017 |
| WO | WO 02/090605 A1 | 11/2002 |
| WO | WO 2007/074360 A2 | 7/2007 |
| WO | WO 2008/124538 A1 | 10/2008 |
| WO | WO 2013/153692 A1 | 10/2013 |
| WO | WO 2014/092667 A1 | 6/2014 |
| WO | WO 2015/082585 A1 | 6/2015 |
| WO | WO 2018/087697 A1 | 5/2018 |
| WO | WO 2019/133702 A1 | 7/2019 |
| WO | WO 2020/150449 A1 | 7/2020 |
| WO | WO 2020/186178 A1 | 9/2020 |
| WO | WO 2021/030529 A1 | 2/2021 |
| WO | WO 2021/222585 A1 | 11/2021 |
| WO | WO 2022/020470 A1 | 1/2022 |
| WO | WO 2022/020572 A1 | 1/2022 |
| WO | WO 2022/204059 A1 | 9/2022 |
| WO | WO 2012/142547 A1 | 10/2022 |
| WO | WO 2022/216741 A1 | 10/2022 |
| WO | WO 2022/221334 A1 | 10/2022 |
| WO | WO 2023/108054 A1 | 6/2023 |
| WO | WO 2023/150796 A1 | 8/2023 |

OTHER PUBLICATIONS

Chinese Office Action for CN 202080009144.7 mailed Feb. 23, 2022.
Chinese Office Action for CN 202080009144.7, mailed Oct. 8, 2022.
Chinese Office Action for CN 202080009144.7 mailed Apr. 23, 2023.
Eurasian Office Action for EA202191980, mailed Oct. 27, 2022.
European Office Action for EP20706886.7, mailed Feb. 22, 2023.
Indian Office Action for IN202117028021 mailed Oct. 9, 2023.
International Search Report and Written Opinion for International Patent Application No. PCT/US2020/013837, mailed May 25, 2020.
International Preliminary Report on Patentability for International Patent Application No. PCT/US2020/013837, mailed Jul. 29, 2021.
Chinese Office Action for CN 202080028904.9 mailed Mar. 30, 2022.
Chinese Office Action for CN 202080028904.9 mailed Sep. 16, 2022.
Chinese Office Action for CN 202080028904.9 mailed Mar. 8, 2023.
Eurasian Office Action for EA202192509 mailed Sep. 19, 2022.
European Office Action for EP20716365.0, mailed Feb. 21, 2023.
Indian Office Action for IN202117046712 mailed May 15, 2023.
International Search Report and Written Opinion for International Patent Application No. PCT/US2020/022672, mailed Aug. 17, 2020.
International Preliminary Report on Patentability for International Patent Application No. PCT/US2020/022672, mailed Sep. 23, 2021.
[No Author Listed], Around 2.5 billion more people will be living in cities by 2050, projects new UN report. United Nations. May 16, 2018. Accessed Oct. 6, 2021 from <https://www.un.org/development/desa/en/news/population/2018-world-urbanization- prospects.html>. 4 pages.
[No Author Listed], Breaking down the factors behind scrap glass prices. Recycling Product News. Dec. 7, 2017. Accessed Oct. 6, 2021 from <https://www.recyclingproductnews.com/article/27088/breaking-down-the-factors-behind-scrap-glass-prices>. 5 pages.
[No Author Listed], Cement prices in the United States from 2010 to 2020 (in U.S. Dollars per metric ton). Statista. Hamburg, Germany. Feb. 2021:8 pages.
[No Author Listed], Chemistry vol. 2. Chemistry Compiling Group of the Mathematics, Physics and Chemistry Self-Study Series Editorial Committee. Shanghai People's Publishing House. Apr. 1965; 235-7.
[No Author Listed], Climate Change 2014: Mitigation of Climate Change: Working Group III Contribution to the Fifth Assessment Report of the Intergovernmental Panel on Climate Change. O. Edenhofer et al., Eds. Cambridge University Press. New York, NY. 2014. 1454 pages.

(56) References Cited

OTHER PUBLICATIONS

[No Author Listed], Concrete $CO_2$ Fact Sheet. National Ready Mixed Concrete Association. Silver, Spring, MD. Feb. 2012. 13 pages.
[No Author Listed], Development of State of the Art-Techniques in Cement Manufacturing: Trying to Look Ahead, Revision 2017. European Cement Research Academy. Dusseldorf, Geneva. Mar. 20, 2017. 190 pages.
[No Author Listed], Geochemistry in mineral exploration. Eds. Chen et al. Geological Publishing House. Mar. 2014; p. 26.
[No Author Listed], Inorganic chemistry. Chemistry Textbook Compiling Group for Vocational and Technical Colleges. Higher Education Press. Aug. 2000; 298-300.
[No Author Listed], Lime Prices In The United States, By Type. IndexMundi. Accessed Oct. 15, 2021 as available Sep. 8, 2017 from <https://web.archive.org/web/20170908194700/https://www.indexmundi.com/en/commodities/minerals/lime/lime_t5.html>. 1 page.
[No Author Listed], LumiShield Chemistry. LumiShield Technologies, Inc. Pittsburgh, PA. Accessed Oct. 15, 2021 as available Jan. 31, 2019 from <https://web.archive.org/web/20190131025944/http://lumishieldtech.com/chemistry.html>. 1 page.
[No Author Listed], Mineral Commodity Summaries. U.S. Department of the Interior, U.S. Geological Survey. Jan. 2018. 204 pages.
[No Author Listed], Mini Chlor Alkali Plant. SkidPlant. Chenai, India. Accessed Oct. 15, 2021 as available Jan. 10, 2019 from <https://web.archive.org/web/20190110233048/http://www.skidplant.com/mini-chlor-alkali-plant>. 3 pages.
[No Author Listed], Recycling Markets—Gambling or Good Business. Northeast Resource Recovery Association. Epsom, NH. Apr. 2014. 137 pages.
[No Author Listed], Renewable Power Generation Costs in 2017. International Renewable Energy Agency (IRENA), Abu Dhabi. 2018. 160 pages.
[No Author Listed], Table 31. Average Sales Price of Coal by State and Coal Rank, 2017. U.S. Energy Information Administration Annual Coal Report 2017. Accessed Oct. 15, 2021 as available Jan. 8, 2019 from <https://web.archive.org/web/20190108234119/https://www.eia.gov/coal/annual/pdf/table31.pdf >. 1 page.
[No Author Listed], Technology Roadmap; Low-Carbon Transition in the Cement Industry. International Energy Agency, Paris, France. World Council for Sustainable Development, Geneva, Switzerland. 2018. 66 pages.
[No Author Listed], U.S. Labor-Energy Input Survey. Portland Cement Association. Skoki, IL. Accessed Oct. 15, 2021 as available Sep. 23, 2019 from <https://web.archive.org/web/20190923015840/https://www.cement.org/docs/default-source/market-economics-pdfs/more-reports/labor-energy-sample-2.pdf?sfvrsn=6&sfvrsn=6>. 36 pages.
Abdykirova et al., Production of Electrolytic Manganese Dioxide from Purified Solutions after the Leaching of Manganese-Bearing Slurry. Steel Transl. Aug. 25, 2016;46(5):319-321.
Abergel et al., Global Status Report 2017. International Energy Agency. Paris, France. 2017. 48 pages.
Åhman et al., Global climate policy and deep decarbonization of energy-intensive industries. Climate Policy. Jun. 13, 2016;17(5):634-49. doi: 10.1080/14693062.2016.1167009.
Ali et al., A review on emission analysis in cement industries. Renewable and Sustainable Energy Reviews. 2011;15(5):2252-61. Epub Mar. 17, 2011.
Allanore A., Contribution of Electricity to Materials Processing: Historical and Current Perspectives. JOM. 2012;65(2):130-135. doi: 10.1007/s11837-012-0538-3. Author manuscript provided. 20 pages.
Allegrini et al., Quantification of the resource recovery potential of municipal solid waste incineration bottom ashes. Waste Manag. Sep. 2014;34(9):1627-36. doi: 10.1016/j.wasman.2014.05.003. Epub Jun. 2, 2014.
Aromaa, J., Aqueous Processing of Metals. In: Encyclopedia of Electrochemistry. 2007. A.J. Bard et al., Eds. Wiley-Vch. Chapter 4.1:161-223.
Barker et al., $CO_2$ Capture in the Cement Industry. IEA Greenhouse Gas R&D Programme. Cheltenham, Glos., UK. Jul. 2008;1-221.
Belevi et al., Factors Determining the Element Behavior in Municipal Solid Waste Incinerators. 1. Field Studies. Environ. Sci. Technol. May 12, 2000;34(12):2501-2506.
Benson et al., Advancing Enhanced Oil Recovery as a Sequestration Asset. Joule. Aug. 15, 2018;2(8):1386-9.
Bjerge et al., $CO_2$ Capture in the Cement Industry, Norcem $CO_2$ Capture Project (Norway). Energy Procedia. 2014;63:6455-63.
Blunt et al., Carbon Dioxide in Enhanced Oil Recovery. Energy Convers. Mgmt. 1993;34(9-11):1197-1204.
Carrasco-Maldonado et al., Oxy-fuel combustion technology for cement production—State of the art research and technology development. International Journal of Greenhouse Gas Control. 2016;45:189-99. Epub Jan. 4, 2016.
Chen et al., Environmental impact of cement production: detail of the different processes and cement plant variability evaluation. Journal of Cleaner Production. 2010;18(5):478-485. Epub Jan. 4, 2010.
Davis et al., Net-zero emissions energy systems. Science. Jun. 29, 2018;360(6396):eaas9793. 9 pages. Supplementary Material included. 27 pages total.
Delgado et al., $CO_2$ Balance in a Compression and Purification Unit (CPU). Energy Procedia. 2014;63:322-31.
Dowling et al., Lime in the limelight. Journal of Cleaner Production. 2015;92:13-22. Epub Dec. 20, 2014.
Dubois et al., Study of the post-combustion $CO_2$ capture applied to conventional and partial oxy-fuel cement plants. Energy Procedia. 2017;114:6181-96.
Ellis et al. Toward electrochemical synthesis of cement-An electrolyzer-based process for decarbonating $CaCO_3$ while producing useful gas streams. Proc Natl Acad Sci U S A. Jun. 9, 2020;117(23):12584-12591. doi: 10.1073/pnas.1821673116. Epub Sep. 16, 2019.
Free, M.L., Hydrometallurgy—Fundamentals and Applications. 2013. John Wiley & Sons, Inc. 451 pages.
Funari et al., Solid residues from Italian municipal solid waste incinerators: A source for "critical" raw materials. Waste Manag. Nov. 2015;45:206-16. Epub Dec. 12, 2014. Prepublicaion version provided. 11 pages.
Gardarsdottir et al., Comparison of Technologies for CO2 Capture from Cement Production-Part 2: Cost Analysis. Energies. Feb. 1, 20190;12(3):1-20.
Geels et al., Sociotechnical transitions for deep decarbonization. Science. Sep. 22, 2017;357(6357):1242-1244.
Gray, H.B., Powering the planet with solar fuel. Nature Chemistry. Mar. 19, 2009;1:7. Erratum included. 2 pages total.
Haruta et al., Catalytic Combustion of Hydrogen I—Its Role in Hydrogen Utilization System and Screening of Catalyst Materials. Int. J. Hydrogen Energy. 1981;6(6):601-8.
Hasanbeigi et al., Emerging energy-efficiency and $CO_2$ emission-reduction technologies for cement and concrete production: A technical review. Renewable and Sustainable Energy Reviews. Aug. 30, 2012;16(8):6220-38.
Imbabi et al., Trends and developments in green cement and concrete technology. International Journal of Sustainable Built Environment. 2012;1:194-216.
Janssen, G.J.M., Modelling study of $CO_2$ poisoning on PEMFC anodes. Journal of Power Sources. Jul. 3, 2004;136:45-54.
Joseph et al., The Use of Municipal Solid Waste Incineration Ash in Various Building Materials: A Belgian Point of View. Materials. Jan. 16, 2018;11(141):1-30.
Keith et al., A Process for Capturing $CO_2$ from the Atmosphere. Joule. Aug. 15, 2018;2(8):1573-94.
Kelly et al., Historical Statistics for Mineral and Material Commodities in the United States, US Geological Survey. Reston, VA. Accessed Jan. 7, 2009 as updated Apr. 17, 2008 from <http://minerals.usga.gov/ds/2005/140/>. 8 pages.
Körner, A., Technology Roadmap Hydrogen and Fuel Cells: Technical Annex. International Energy Agency. Jun. 29, 2015. 30 pages.
Lammel et al., Greenhouse Effect of $NO_x$. Environ. Sci. & Pollut. Res. 1995;2(1):40-45.
Larscheid et al., Potential of new business models for grid integrated water electrolysis. Renewable Energy. Feb. 23, 2018;125:599-608.

(56) References Cited

OTHER PUBLICATIONS

Lassagne et al., Techno-economic study of $CO_2$ capture for aluminum primary production for different electrolytic cell ventilation rates. Chemical Engineering Journal. Jun. 26, 2013;230:338-50.

Lau et al., "Optimization and Characterization of the Solar Thermal Electrochemical Conversion of Calcium Carbonate into Calcium Oxide for STEP Cement," Abstract from the 227th Meeting of the Electrochemical Society, 2015.

Lawal et al., Dynamic modelling and analysis of post-combustion $CO_2$ chemical absorption process for coal-fired power plants. Fuel. Jun. 2, 2010;89(10):2791-2801.

Lehne et al., Making Concrete Change; Innovation in Low-carbon Cement and Concrete. Chatham House, London, UK. Jun. 2018. 138 pages.

Li et al., Greenhouse Gas Emissions, Energy Efficiency, and Cost of Synthetic Fuel Production Using Electrochemical $CO_2$ Conversion and the Fischer-Tropsch Process. Energy Fuels. Jun. 1, 2016;30(7):5980-9.

Li et al., Impacts of exhaust gas recirculation (EGR) on the natural gas combined cycle integrated with chemical absorption CO2 capture technology. Energy Procedia. 2011;4:1411-8.

Licht et al., STEP Cement: Solar Thermal Electrochemical Production of CaO without $CO_2$ emission. Chem. Commun. 2012;48:6019-6021.

Licht, "Co-Production of Cement and Carbon Nanotubes with a Carbon Negative Footprint," Journal of CO2 Utilization, Aug. 2016. Accessed online at https://arxiv.org/ftp/arxiv/papers/1608/1608.00946.pdf on Jan. 14, 2019.

Liu et al., Experimental study on improving cement quality with oxygen enriched combustion technology. IOP Conf. Series: Materials Science and Engineering. 2015;103:1-7.

Madrid et al., Synthesis and morphological examination of high-purity $Ca(OH)_2$ nanoparticles suitable to consolidate porous surfaces. Applied Surface Science. 2017;424:2-8. Epub Mar. 27, 2017.

Majumdar et al., Research Opportunities for $CO_2$ Utilization and Negative Emissions at the Gigatonne Scale. Joule. May 16, 2018;2(5):805-809.

Marin et al., Simulating the Impact of Oxygen Enrichment in a Cement Rotary Kiln Using Advanced Computational Methods. Combust. Sci. and Tech. 2001;164:193-207.

Mascolo et al., Influence of Polymorphism and Stabilizing Ions on the Strength of Alite. Journal of the American Ceramic Society—Discussion and Notes. Apr. 1973;56(4):222-3.

Mitlitsky et al., Regenerative Fuel Cell Systems. Energy & Fuels. Jan. 12, 1998;12(1):56-71.

Morf et al., Precious metals and rare earth elements in municipal solid waste—sources and fate in a Swiss incineration plant. Waste Manag. Mar. 2013;33(3):634-44. Epub Oct. 22, 2012. Erratum in: Waste Manag. Jun. 2013;33(6):1573.

Mujumdar et al., Rotary Cement Kiln Simulator (RoCKS): Integrated modeling of pre-heater, calciner, kiln and clinker cooler. Chemical Engineering Science. 2007;62(9):2590-607. Epub Feb. 14, 2007.

Odler et al., Polymorphism and Hydration of Picalcium Silicate Doped With ZnO. Journal of the American Ceramic Society. Jan. 1983;66(1):1-4.

Orella et al., Emerging opportunities for electrochemical processing to enable sustainable chemical manufacturing. Current Opinion in Chemical Engineering. Jun. 2018;20:159-167. doi: 10.1016/j.coche.2018.05.002.

Paidar et al., Membrane electrolysis—History, current status and perspective. Electrochimica Acta. 2016;209:737-756. Epub Jun. 2, 2016.

Pierpont et al., Flexibility: The path to low-carbon, low cost electricity grids. Climate Policy Initiative. Apr. 2017. 74 pages.

Rau et al., Electrochemical CO2 capture and storage with hydrogen generation. Energy Procedia. Feb. 1, 2009; 1(1): 823-8.

Rau et al., Enhanced carbonate dissolution: a means of sequestering waste $CO_2$ as ocean bicarbonate. Energy Conversion & Management. 1999;40:1803-1813.

Rau et al., The global potential for converting renewable electricity to negative-$CO_2$-emissions hydrogen. Nature Climate Change. Jul. 2018;8(7):621-5. Methods included. 6 pages total.

Rau, $CO_2$ Mitigation via Capture and Chemical Conversion in Seawater. Environ. Sci. Technol. 2011;45(3):1088-1092.

Rau, Electrochemical Splitting of Calcium Carbonate to Increase Solution Alkalinity: Implications for Mitigation of Carbon Dioxide and Ocean Acidity. Environ. Sci. Technol. 2008; 42: 8935-40.

Schmidt et al., Future cost and performance of water electrolysis: An expert elicitation study. International Journal of Hydrogen Energy. Nov. 22, 2017;42(52):30470-92.

Shah et al., Near Zero Emissions Oxy-Combustion $CO_2$ Purification Technology. Energy Procedia. 2011;4:988-95.

Snellings, Assessing, Understanding and Unlocking Supplementary Cementitious Materials. RILEM Technical Letters. Aug. 16, 2016;1:50-55.

Števula et al., Hydration of Polymorphic Modification $C_3S$. Cement and Concrete Research. 1981;11(2):183-190.

Šyc et al., Metal recovery from incineration bottom ash: State-of-the-art and recent developments. J Hazard Mater. Jul. 5, 2020;393:1-17. Epub Feb. 29, 2020.

Taylor, Cement chemistry, $2^{nd}$ edition. 1997. Thomas Telford Publishing. London, UK. 470 pages.

Topham et al., Carbon Dioxide. Ullmann's Encyclopedia of Industrial Chemistry. Wiley-VCH. May 2014:1-43.

Traynor et al., Dissolution of olivines from steel and copper slags in basic solution. Cement and Concrete Research. Jul. 2020; 133:106065. Author manuscript provided. 33 pages.

Vogt et al., The renaissance of the Sabatier reaction and its applications on Earth and in space. Nature Catalysis. Mar. 2019;2(3):188-97.

Voldsund et al., Comparison of Technologies for $CO_2$ Capture from Cement Production—Part 1: Technical Evaluation. Energies. Feb. 12, 2019;12:559. 33 pages.

Wei et al., Electrodepositing Pt by Modulated Pulse Current on a Nafion-Bonded Carbon Substrate as an Electrode for PEMFC. J. Phys. Chem. Oct. 2, 2007;111(42):15456-15463.

Worrell et al., Energy Efficiency Improvement and Cost Saving Opportunities for Cement Making; An Energy Star® Guide for Energy and Plant Managers. Energy Analysis Department, Environmental Energy Technologies Division, Ernest Orlando Lawrence Berkeley National Laboratory. University of California. Berkeley, CA. Mar. 2008. 75 pages.

Yan et al., Degradation of proton exchange membrane fuel cells due to CO and $CO_2$ poisoning. Journal of Power Sources. 2009;188:141-7.

Yao et al., Mobility of heavy metals and rare earth elements in incineration bottom ash through particle size reduction. Chemical Engineering Science. Oct. 18, 2014;18:214-220.

Zeman et al., The Reduced Emission Oxygen Kiln: A White Paper Report for the Cement Sustainability Initiative of the World Business Council on Sustainable Development. Lenfest Center for Sustainable Energy. Columbia University. New York, NY. Jul. 31, 2008. 77 pages.

Zeman, Oxygen combustion in cement production. Energy Procedia. 2009;1:187-94.

Zhang et al., Extraction of metals from municipal solid waste incinerator fly ash by hydrothermal process. J Hazard Mater. Aug. 25, 2006;136(3):663-70. doi: 10.1016/j.jhazmat.2005.12.052. Epub Mar. 6, 2006.

Zheng et al., Phase evolution, characterisation, and performance of cement prepared in an oxy-fuel atmosphere. Faraday Discuss. 2016;192:113-24.

Chinese Office Action mailed Feb. 6, 2024, for Application No. CN202080028904.9.

Japanese Notice of Reasons for Rejection for JP2021-540832, mailed Feb. 29, 2024.

[No Author Listed], Bioworld (Safety Data Sheet, Calcium chlordie dihydrate). 2015. Accessed from <https://www.bio-world.com/site/accounts/masterfiles-/MSDS/MS-40300016.pdf>. 8 pages.

[No Author Listed], Azo materials (Silica-Silicon Dioxide ($SiO_2$)). 2001. Accessed from: <https://www.azom.com/article/aspx?ArticleID=1114>. 5 pages.

(56) References Cited

OTHER PUBLICATIONS

[No Author Listed], Sedimentary rock. Encyclopedia Britannica. 2016. Accessed from <https://www.britannica.com/science/sedimentary-rock/Limestones-and-dolomites> and <https://web.archive.org/web/20160420201820/https://www.britan-nica.com/science/sedimentary-rock/Limestones-and-dolomites>. 1 page.

[No. Author Listed], Chapter 3: Fly ash, slag, silica fume, and natural pozzolans. Design and Control of Concrete Mixtures EB001. 2010. Accessed from <http://www.ce.memphis.edu/1101/notes/concrete/PCA_manual/Chap03.pdf> and <https://web.archive.org/web/20100629003343/http://www.ce.memphis.edu/1101/notes/concrete /PCA_manual/Chap03.pdf.>. 16 pages.

Alonso et al., Alkaline activation of metakaolin and calcium hydroxide mixtures: influence of temperature, activator concentration and solids ratio. Mater Lett. 2001; 47(1-2): 55-62.

Chen et al., Incorporation of waste materials into portland cement clinker synthesized from natural raw materials. J Mater Sci. 2009; 44: 2617-27.

Ibrahim et al., Metakaolin as an active pozzolan for cement that improves its properties and reduces its pollution hazard. J Min Mater Char Eng. 2018; 6:86-104.

Irabien et al., Thermal dehydration of calcium hydroxide. 1. kinetic model and parameters. Ind Eng Chem Res 1990; 29(8): 1599-606.

Mirghiasi et al., Preparation and characterization of CaO nanoparticles from Ca(OH)2 by direct thermal decomposition method. J Ind Eng Chem. 2014; 24(1): 113-7.

Sutkovic, Ionic chemical equations. Oct. 3, 2014. Accessed from: <https://www.ius.edu.ba/common/2014SpringChemistryProblemSample1.pdf>. 3 pages.

Japanese Notice of Reasons for Rejection for JP2021-554694, mailed Apr. 15, 2024.

Brazilian Office Action for BR 112021017931.3, mailed May 6, 2024.

Chaubey, Practical Concrete Mix Design. CRC Press. Taylor & Francis. 2020. Entire Textbook. 185 pages.

Japanese Notice of Reasons for Rejection for JP2021-554694, mailed Oct. 21, 2024.

U.S. Office Action mailed Jul. 25, 2024, for U.S. Appl. No. 17/423,467.

U.S. Final Office Action for U.S. Appl. No. 18/395,402, mailed Oct. 28, 2024.

Sano et al., Development of an electrolysis based system to continuously recover magnesium from seawater. Heliyon. Nov. 17, 2018;4(11):e00923.

Shriver et al., Redox chemistry. Chapter 5. Inorganic Chemistry. 4th Edition. 2006; 165.

Office Action for U.S. Appl. No. 18/971,207 dated Apr. 29, 2025.

Office Action for U.S. Appl. No. 17/438,888 dated Apr. 9, 2025.

Kumar Yadav et al., A novel and efficient method for the synthesis of amorphous nanosilica from fly ash tiles. Mater Today Proceedings. Jan. 2020;26(2):701-5.

Office Action for U.S. Appl. No. 18/971,207 dated Jul. 24, 2025.

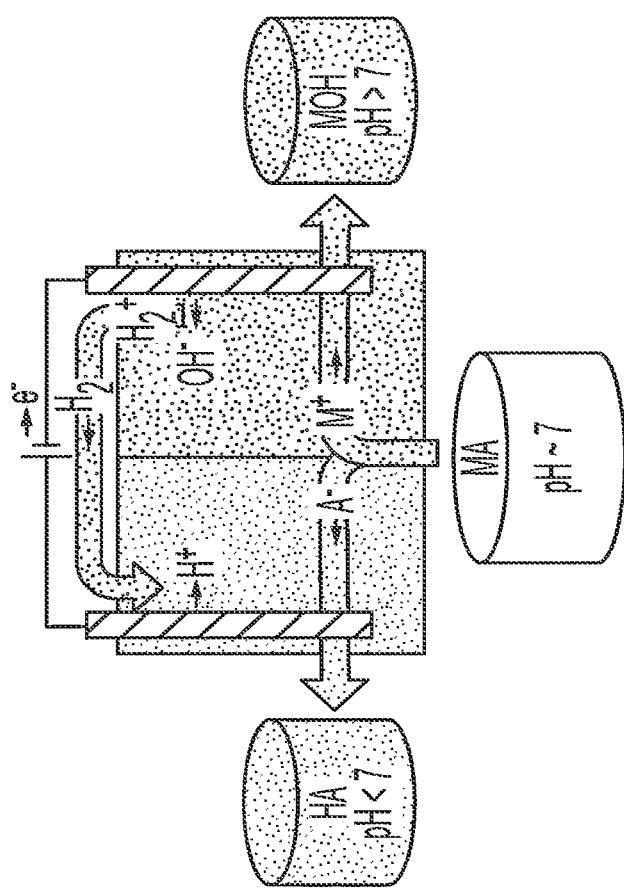
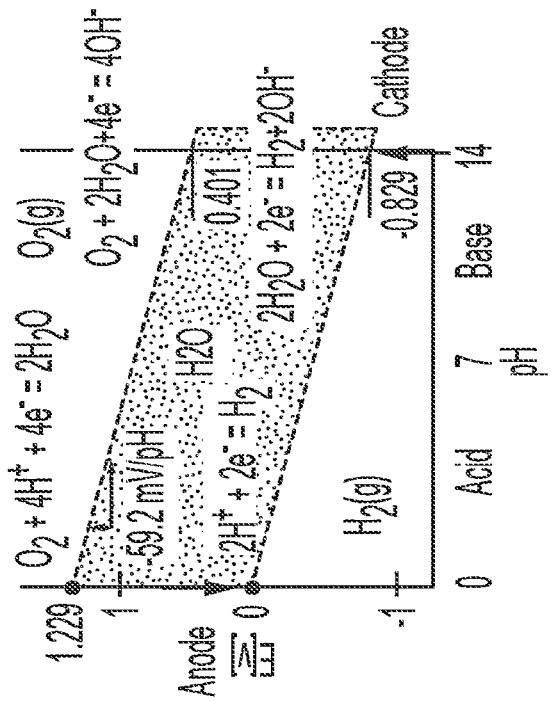
FIG. 8A
FIG. 8B

Where the dihalide is reacted with $H_2$

Where the dihalide is reacted with $H_2O$

CHEMICAL REACTION DEVICES INVOLVING ACID AND/OR BASE, AND RELATED SYSTEMS AND METHODS

RELATED APPLICATIONS

This application is a continuation of U.S. application Ser. No. 17/438,888, filed Sep. 13, 2021, which is a national stage filing under 35 U.S.C. § 371 of International Patent Application No. PCT/US2020/022672, filed Mar. 13, 2020, which claims priority under 35 U.S.C. § 119(e) to U.S. Provisional Patent Application No. 62/818,604, filed Mar. 14, 2019; U.S. Provisional Patent Application No. 62/887,143, filed Aug. 15, 2019; and U.S. Provisional Patent Application No. 62/962,061, filed Jan. 16, 2020; all of which are hereby incorporated by reference in their entireties for all purposes.

TECHNICAL FIELD

Chemical reaction devices involving acid and/or base, and related systems and methods, are generally described.

SUMMARY

Chemical reaction devices involving acid and/or base, and related systems and methods, are generally described. In some embodiments, a method comprises producing base near a first electrode (e.g., a cathode) and acid near a second electrode (e.g., anode) that is electrochemically coupled to the first electrode. In certain embodiments, the method comprises collecting the acid and/or base. In some instances, the method comprises storing the acid and/or base. In some embodiments, the method comprises reacting the acid and/or base in a chemical dissolution (e.g., reacting the acid with a metal carbonate, such as $CaCO_3$, to produce metal ions, such as calcium ions, and/or carbonate ions). In certain embodiments, the method comprises reacting the acid and/or base in a precipitation reaction (e.g., reacting the base with metal ions, such as calcium ions, to produce a metal hydroxide, such as $Ca(OH)_2$). In some embodiments, the metal hydroxide can be used in cement-making processes.

In some cases, production of the acid near the second electrode and/or production of the base near the first electrode results in production of a gas (e.g., $CO_2$, $H_2$, and/or $O_2$). In certain cases, one or more of the gases can be collected, sold, used in a downstream process, and/or fed back into the system. In some instances, production of the acid near the second electrode and/or production of the base near the first electrode produces a reduced amount of gas, does not produce a gas, and/or does not produce a net amount of gas, as any produced gas is used by the system (e.g., to increase the pH gradient between the electrodes). In certain embodiments, the acid produced near the second electrode and/or the base produced near the first electrode, for example, during periods of low electricity cost, can be used to produce hydrogen gas and/or oxygen gas, for example, in periods of high electricity cost.

Inventive systems and methods for formation of precipitates in a spatially varying chemical composition gradient (e.g., spatially varying pH gradient) are also described. Formation of precipitates in a spatially varying chemical composition gradient (e.g., spatially varying pH gradient) can be achieved, for example, by dissolving a chemical compound (e.g., a metal salt) in a first region (e.g., an acidic region) of the spatially varying chemical composition gradient (e.g., the spatially varying pH gradient) and collecting a precipitate comprising one or more elements (e.g., metal) from the chemical compound (e.g., the metal salt) in a second region (e.g., an alkaline region) of the spatially varying chemical composition gradient (e.g., spatially varying pH gradient). In certain embodiments, the spatially varying chemical composition gradient (e.g., spatially varying pH gradient) is in an electrochemical cell and is established and/or maintained by electrolysis (e.g., electrolysis of water). According to some embodiments, after the precipitate is collected, the precipitate is heated within a kiln to make cement, such as Portland cement. The subject matter of the present invention involves, in some cases, interrelated products, alternative solutions to a particular problem, and/or a plurality of different uses of one or more systems and/or articles.

Certain aspects are related to methods. In some embodiments, the method comprises running a reactor in a first mode; wherein the first mode comprises: producing base from a first electrode; producing acid from a second electrode that is electrochemically coupled to the first electrode in the reactor; and collecting the acid and/or base.

In certain embodiments, the method comprises running a reactor in a first mode; wherein the first mode comprises: producing base from a first electrode; producing acid from a second electrode that is electrochemically coupled to the first electrode in the reactor; collecting the acid and/or base; and reacting the collected acid and/or base in a chemical dissolution and/or in a precipitation reaction.

In some embodiments, the method comprises running a reactor in a first mode; wherein the first mode comprises: producing base and hydrogen gas from a first electrode; producing acid and oxygen gas from a second electrode that is electrochemically coupled to the first electrode in the reactor; and allowing the oxygen gas to diffuse and/or be transported to the first electrode and/or allowing the hydrogen gas to diffuse and/or be transported to the second electrode; and allowing the oxygen gas to be reduced by the first electrode and/or allowing the hydrogen gas to be oxidized by the second electrode.

In some embodiments, the method comprises producing a base and a dihalide in a first reactor; producing an acid in a second reactor; collecting the acid; collecting the base; performing a chemical dissolution with the acid and/or base; and performing a precipitation reaction with the acid and/or base.

Certain aspects are related to systems. In certain embodiments, the system comprises a first electrode; a second electrode that is electrochemically coupled to the first electrode; and an apparatus configured to collect an acidic output near the second electrode and/or a basic output near the first electrode.

In some embodiments, the system comprises a first electrode; a second electrode that is electrochemically coupled to the first electrode; a first apparatus configured to collect an acidic output near the second electrode and/or a basic output near the first electrode; and a second apparatus configured to react the collected acidic output and/or collected basic output.

In certain embodiments, the system comprises a first electrode configured to produce base and hydrogen gas; and a second electrode that is electrochemically coupled to the first electrode and is configured to produce acid and oxygen gas; wherein the system is configured to allow oxygen gas to diffuse and/or be transported to the first electrode and/or to allow hydrogen gas to diffuse and/or be transported to the second electrode; and wherein the system is configured to allow the oxygen gas to be reduced by the first electrode and/or to allow the hydrogen gas to be oxidized by the second electrode.

In some embodiments, the system comprises a first reactor configured to produce a base, a dihalide, and hydrogen gas; a second reactor configured to produce an acid; a first apparatus configured to collect the acid near the second reactor and perform a chemical dissolution and/or precipitation reaction with the acid; and a second apparatus configured to collect the base near the first reactor and perform a chemical dissolution and/or precipitation reaction with the base.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 8A is, in accordance with certain embodiments, a schematic illustration of operation of a reactor in low-voltage mode A.

FIG. 8B is a Pourbaix diagram illustrating low-voltage mode A.

FIG. 13A is, in accordance with certain embodiments, an illustration showing that at the first electrode (e.g., the cathode) of Reactor 1, water is reduced to give $OH^-$ (an alkali solution) and $H_{2\,(g)}$. FIG. 13B is, in accordance with certain embodiments, an illustration showing that at the first electrode (e.g., the cathode) of Reactor 1, $O_2$ is reduced to give $OH^-$ (an alkali solution).

FIG. 14A is, in accordance with certain embodiments, a schematic showing that the dihalide is reacted with hydrogen gas to produce the desired acid. FIG. 14B is, in accordance with certain embodiments, a schematic showing that the dihalide is reacted with water to produce the desired acid, and oxygen as a byproduct.

DETAILED DESCRIPTION

Figure 1A:
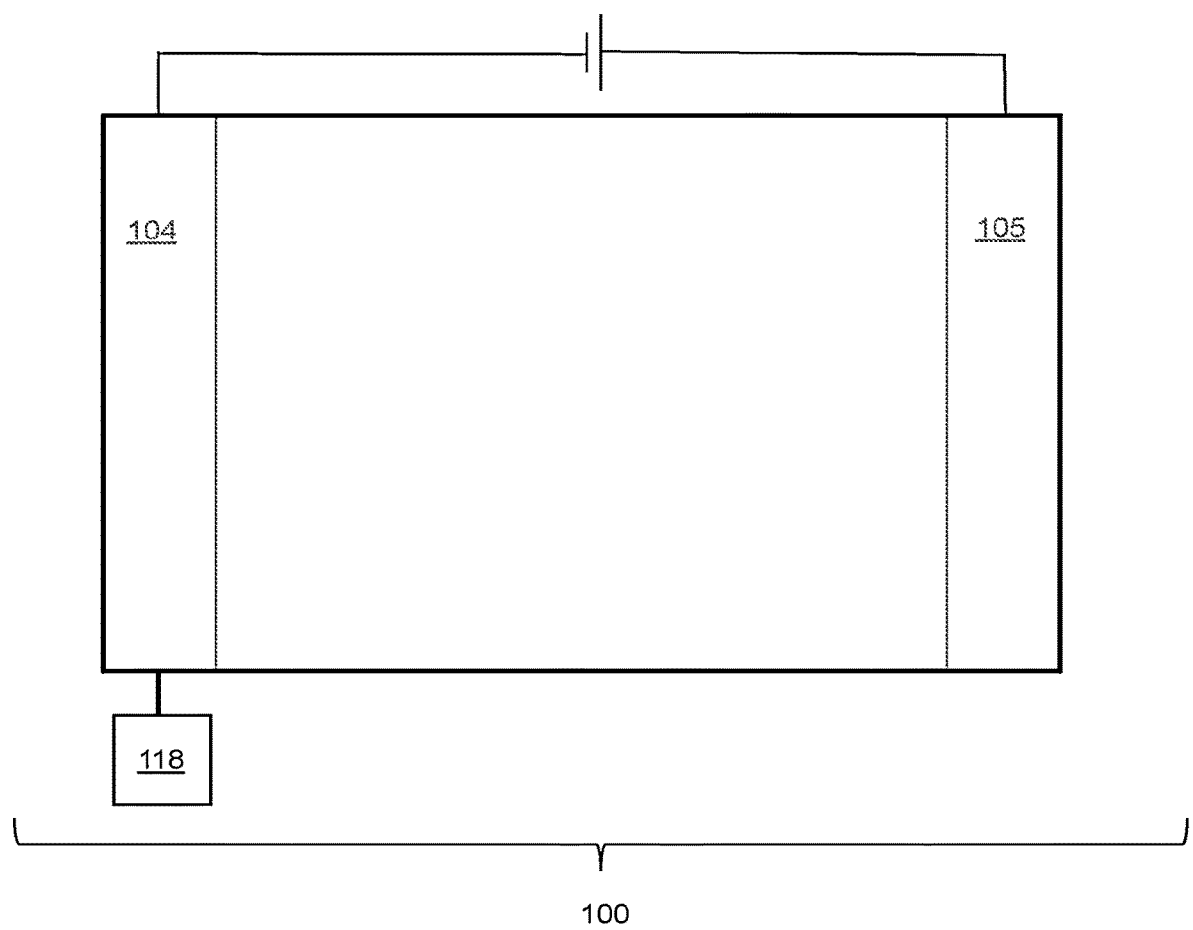
FIG. 1A is, in accordance with certain embodiments, a schematic illustration of a system comprising a first electrode, a second electrode, and an apparatus.

Chemical reaction devices involving acid and/or base, and related systems and methods, are generally described. In some embodiments, a method comprises producing base near a first electrode (e.g., cathode) and acid near a second electrode (e.g., anode) that is electrochemically coupled to the first electrode. In certain embodiments, the method comprises collecting the acid and/or base. In some instances, the method comprises storing the acid and/or base. In some embodiments, the method comprises reacting the acid and/or base in a chemical dissolution (e.g., reacting the acid with a metal carbonate, such as $CaCO_3$, to produce metal ions, such as calcium ions, and/or carbonate ions). In certain embodiments, the method comprises reacting the acid and/or base in a precipitation reaction (e.g., reacting the base with metal ions, such as calcium ions, to produce a metal hydroxide, such as $Ca(OH)_2$). In some embodiments, the metal hydroxide can be used in cement-making processes.

In some cases, production of the acid near the second electrode and/or production of the base near the first electrode results in production of a gas (e.g., $CO_2$, $H_2$, and/or $O_2$). In certain cases, one or more of the gases can be collected, sold, used in a downstream process, and/or fed back into the system. In some instances, production of the acid near the second electrode and/or production of the base near the first electrode produces a reduced amount of gas, does not produce a gas and/or does not produce a net amount of gas, as any produced gas is used by the system (e.g., to increase the pH gradient between the electrodes). In certain embodiments, the acid produced near the second electrode and/or the base produced near the first electrode, for example, during periods of low electricity cost, can be used to produce hydrogen gas and/or oxygen gas, for example, in periods of high electricity cost.

Reactors comprising spatially varying chemical composition gradients (e.g., spatially varying pH gradients), and associated systems and methods, are also described. In some embodiments, electrochemical reactors comprise spatially varying chemical composition gradients (e.g., spatially varying pH gradients). In certain embodiments, precipitates are formed using a spatially varying chemical composition gradient (e.g., spatially varying pH gradient). In some embodiments, a chemical compound (e.g., a metal salt) is dissolved in a first region (e.g., an acidic region) of the spatially varying chemical composition gradient (e.g., the spatially varying pH gradient) and a precipitate comprising one or more elements (e.g., metal) from the chemical compound (e.g., the metal salt) is formed in a second region (e.g., an alkaline region) of the spatially varying chemical composition gradient (e.g., the spatially varying pH gradient).

Some embodiments concern compositions, methods, and reactor designs in which an electrolytic reaction is used to produce a chemical composition gradient between the positive and negative electrodes of an electrochemical cell. Said electrolytically produced composition gradient is then employed, in some embodiments, to conduct a desired chemical reaction by feeding a reactant to the chemical environment near one electrode, and using the electrolytically produced chemical gradient to produce a product from said reactant as the reactant or its components diffuse toward the other electrode. In some embodiments, a desired chemical reaction is conducted by collecting solutions or suspensions of differing composition produced electrolytically, and using said solutions or suspensions to produce a product from said reactant in a portion of the reactor or in a separate apparatus. In one embodiment, such a reactor is directed to the production of a decomposed, mineral or metal salt through electrochemical and chemical means. In one embodiment, the use of fossil fuels for production of thermal energy, and the associated production of greenhouse gases or gases that are atmospheric pollutants, is reduced or avoided through the use of such a reactor in place of traditional thermal calcination that involves heating of the mineral or metal salt to decompose it. In some embodiments, the mineral or metal salt comprises a metal carbonate, and the greenhouse gases produced are at least in part carbon dioxide. In another embodiment, the electrolytically driven chemical reactor is powered by electricity from renewable sources such as solar photovoltaics or wind energy, and thereby reduces the use of greenhouse-gas-producing energy sources in carrying out the calcination or decomposition reaction.

Some embodiments are related to a process for the production of cement, such as Portland cement. Concrete is today the most widely used man-made material in the world. Cement production is also the second largest industrial emitter of $CO_2$ in the world, accounting for about 8% of global $CO_2$ emissions. Traditional methods for industrial production of cement include the calcination of $CaCO_3$ by thermal means. In current manufacturing of cement, about 60% of the $CO_2$ emissions result from the calcination of $CaCO_3$, and about 40% of the $CO_2$ emissions result from the burning of fossil fuels to carry out the calcination and sintering processes. Thus, there exists a great need for cement production processes that emit less $CO_2$. Some embodiments are related to a cement production process in which thermal calcination is replaced by herein-described electrochemical processes that produce less $CO_2$ per quantity of cement produced than current manufacturing.

Cement production systems comprising electrochemical reactors, and related methods, are also described. Certain embodiments are related to inventive systems for producing cement comprising an electrochemical reactor and a kiln. In certain embodiments, the electrochemical reactor is configured to receive $CaCO_3$. In some embodiments, the electrochemical reactor comprises a first outlet configured to discharge $Ca(OH)_2$ and/or lime (CaO). In certain cases, the electrochemical reactor comprises a second outlet configured to discharge $CO_2$, $O_2$, and/or $H_2$ gas. In accordance with certain embodiments, the kiln is configured to heat the $Ca(OH)_2$ and/or lime (and/or a reaction product thereof) as part of a cement-making process.

In some embodiments, the system is powered at least in part (e.g., at least 10%, at least 25%, at least 50%, at least 75%, at least 90%, or 100%) by renewable electricity (e.g., solar energy and/or wind energy). In certain cases, the system has lower net carbon emissions (e.g., at least 10% lower, at least 25% lower, at least 50% lower, at least 75% lower, or at least 90% lower) than substantially similar systems that use traditional thermal calcination instead of the electrochemical reactor. In some instances, the system has net-zero carbon emissions.

Certain embodiments are related to inventive methods in which $Ca(OH)_2$ and/or lime (CaO) is produced in an electrochemical reactor. In some embodiments, the $Ca(OH)_2$ and/or lime from the electrochemical reactor is then transported to a kiln, which heats the $Ca(OH)_2$ and/or lime (and/or a reaction product thereof) as part of a cement-making process. In some embodiments, the electrochemical reactor also produces $CO_2$, $O_2$, and/or $H_2$ gas. According to certain embodiments, the $CO_2$ is sequestered, used in liquid fuel, used in oxyfuel, used in enhanced oil recovery, used to produce dry ice, and/or used as an ingredient in a beverage. In some cases, the $O_2$ can be sequestered, used in oxyfuel, used in a CCS application, and/or used in enhanced oil recovery. In certain instances, the $H_2$ can be sequestered and/or used as a fuel (e.g., in a fuel cell and/or to heat the system). In some embodiments, at least a portion (e.g., at least 10%, at least 25%, at least 50%, at least 75%, at least 90%, or all) of the $CO_2$, $O_2$, and/or $H_2$ discharged from the system is fed into the kiln.

As noted above, certain aspects are related to systems. Non-limiting examples of such systems are shown in FIGS. 1A-3B.

In some embodiments, the system comprises a first electrode. In some embodiments, the first electrode comprises a cathode. For example, referring to FIG. 1A, in some embodiments, system 100 comprises first electrode 104 (e.g., cathode). Similarly, referring to FIG. 2A, in some embodiments, system 200 comprises first electrode 104 (e.g., cathode). In certain embodiments, the first electrode is selected to be an electronic conductor that is stable under relatively alkaline conditions (e.g., in an alkaline region and/or base described herein).

In certain embodiments, the first electrode comprises a metallic electrode (such as platinum, gold, nickel, iridium, copper, iron, steel, stainless steel, manganese, and/or zinc), carbon (such as graphite or disordered carbons), or a metal carbide (such as silicon carbide, titanium carbide, and/or tungsten carbide). In certain embodiments, the first electrode comprises a metal alloy (e.g. a nickel-chromium-iron alloy, nickel-molybdenum-cadmium alloy), a metal oxide (e.g. iridium oxide, nickel iron cobalt oxide, nickel cobalt oxide, lithium cobalt oxide, lanthanum strontium cobalt oxide, barium strontium ferrous oxide, manganese molybdenum oxide, ruthenium dioxide, iridium ruthenium tantalum oxide), a metal organic framework, or a metal sulfide (e.g. molybdenum sulfide). In certain embodiments, electrocatalyst or electrode material is dispersed or coated onto a conductive support.

In some embodiments, the system comprises a second electrode. In some embodiments, the second electrode comprises an anode. For example, referring back to FIG. 1A, in some embodiments, system 100 comprises second electrode 105 (e.g., an anode). Similarly, referring back to FIG. 2A, in some embodiments, system 200 comprises second electrode 105 (e.g., an anode). In some embodiments, the second electrode is electrochemically coupled to the first electrode. That is to say, the electrodes can be configured such that they are capable of participating in an electrochemical process. Electrochemical coupling can be achieved, for example, by exposing the first and second electrodes to an electrolyte that facilitates ionic transport between the two electrodes. Referring to FIG. 1A, in some embodiments, first electrode 104 is electrochemically coupled to second electrode 105. Similarly, referring to FIG. 2A, in some embodiments, first electrode 104 is electrochemically coupled to second electrode 105.

In certain embodiments, the second electrode is selected to be an electronic conductor that is stable under relatively acidic conditions (e.g., in an acidic region and/or acid described herein). In certain embodiments, the second electrode comprises a metallic electrode (such as platinum, palladium, lead, and/or tin) or a metal oxide (such as a transition metal oxide).

In certain embodiments, the first electrode and/or the second electrode comprise catalysts. In some embodiments the cathode catalyst is selected to be stable under alkaline conditions. The cathode catalyst can comprise, in some embodiments, nickel, iron, a transition metal sulfide (such as molybdenum sulfide), and/or a transition metal oxide (such as $MnO_2$, $Mn_2O_3$, $Mn_3O_4$, nickel oxide, nickel hydroxide, iron oxide, iron hydroxide, cobalt oxide), a mixed transition metal spinel oxide (such as $MnCo_2O_4$, $CoMn_2O_4$, $MnFe_2O_4$, $ZnCoMnO_4$), and the like. In some embodiments the anode catalyst is selected to be stable under acidic conditions. In some embodiments, the anode catalyst comprises platinum, iridium or their oxides.

In some embodiments, the system comprises a reactor (e.g., an electrochemical reactor). For example, referring to FIG. 1A, in some embodiments, system 100 comprises a reactor. Similarly, referring to FIG. 2A, in certain cases, system 200 comprises a reactor. In some embodiments, the reactor comprises the first electrode and the second electrode. For example, in some embodiments, the first electrode is electrochemically coupled to the second electrode in the reactor. For instance, referring to FIG. 1A, in some embodiments, first electrode 104 is electrochemically coupled to second electrode 105 in the reactor. Similarly, referring to FIG. 2A, in certain cases, first electrode 104 is electrochemically coupled to second electrode 105 in the reactor.

Certain aspects are related to methods, which can be understood in relation to FIGS. 1A-3B. In some embodiments, the method comprises running a reactor (e.g., any reactor described herein). In certain cases, running the reactor comprises applying current to an electrode of the reactor. In some embodiments, running the reactor results in at least one chemical reaction occurring within the reactor.

In certain embodiments, the method comprises running a reactor in a first mode. In some embodiments, the first mode comprises producing base near the first electrode (e.g., base is produced as a result of an electrochemical reaction in the first electrode). For example, referring to FIG. 1A, in some embodiments, the first mode comprises producing base near first electrode 104. Similarly, referring to FIG. 2A, in certain cases, the first mode comprises producing base near first electrode 104.

In certain embodiments, the first electrode (e.g., in the first mode) is configured to produce a basic output (e.g., any of the bases described herein). In some embodiments, the basic output is produced as a result of an electrochemical reaction in the first electrode. For example, referring to FIG. 1A, in some embodiments, first electrode 104 is configured to produce base. Similarly, referring to FIG. 2A, in some instances, first electrode 104 is configured to produce base.

The base may have any of a variety of suitable concentrations. In some embodiments, the base has a concentration of greater than or equal to 0.000001 M, greater than or equal to 0.00001 M, greater than or equal to 0.0001 M, greater than or equal to 0.001 M, greater than or equal to 0.01 M, greater than or equal to 0.1 M, greater than or equal to 0.5 M, greater than or equal to 1 M, greater than or equal to 3 M, greater than or equal to 5 M, greater than or equal to 7 M, greater than or equal to 10 M, greater than or equal to 15 M, or greater than or equal to 20 M. In certain embodiments, the base has a concentration of less than or equal to 25 M, less than or equal to 20 M, less than or equal to 15 M, less than or equal to 10 M, less than or equal to 7 M, less than or equal to 5 M, or less than or equal to 3 M. Combinations of these ranges are also possible (e.g., greater than or equal to 0.1 M and less than or equal to 25 M or greater than or equal to 0.1 M and less than or equal to 10 M).

In accordance with some embodiments, the production of the base by the first electrode results in an alkaline region (e.g., any alkaline region described herein) near the first electrode (e.g., within the half of the reactor compartment that is closest to the first electrode). For example, in some instances, the fluid adjacent the first electrode (e.g., the alkaline region) has a higher pH than fluid further away from the first electrode. As an example, referring to FIG. 2A, in some cases, the system comprises alkaline region 106 near first electrode 104. Similarly, referring to FIG. 1A, in certain instances, the system comprises an alkaline region near first electrode 104.

In some embodiments, the pH near (e.g., adjacent to) the first electrode is greater than or equal to 8, greater than or equal to 9, greater than or equal to 10, greater than or equal to 11, greater than or equal to 12, or greater than or equal to 13. In accordance with some embodiments, the pH near the first electrode is less than or equal to 14, less than or equal to 13, less than or equal to 12, less than or equal to 11, or less than or equal to 10. Combinations of these ranges are also possible (e.g., greater than or equal to 8 and less than or equal to 14).

In some embodiments, the second electrode is configured to produce an acidic output (e.g., any of the acids described herein). In certain embodiments, the acidic output is produced as a result of an electrochemical reaction in the second electrode. For example, referring to FIG. 1A, in some embodiments, second electrode 105 is configured to produce acid. Similarly, referring to FIG. 2A, in certain cases, second electrode 105 is configured to produce acid. In some embodiments, the first mode of the reactor comprises producing acid near the second electrode (e.g., acid is produced as a result of an electrochemical reaction in the second electrode). For example, referring to FIG. 1A, in some embodiments, the first mode comprises producing acid near second electrode 105. Similarly, referring to FIG. 2A, in certain embodiments, the first mode comprises producing acid near second electrode 105.

The acid may have any of a variety of suitable concentrations. In some embodiments, the acid has a concentration of greater than or equal to 0.000001 M, greater than or equal to 0.00001 M, greater than or equal to 0.0001 M, greater than or equal to 0.001 M, greater than or equal to 0.01 M, greater than or equal to 0.1 M, greater than or equal to 0.5 M, greater than or equal to 1 M, greater than or equal to 3 M, greater than or equal to 5 M, greater than or equal to 7 M, or greater than or equal to 10 M. In certain embodiments, the acid has a concentration of less than or equal to 12 M, less than or equal to 10 M, less than or equal to 7 M, less than or equal to 5 M, less than or equal to 3 M, or less than or equal to 1 M. Combinations of these ranges are also possible (e.g., greater than or equal to 0.000001 M and less than or equal to 12 M or greater than or equal to 0.1 M and less than or equal to 10 M).

In accordance with some embodiments, the production of the acid by the second electrode results in an acidic region (e.g., any acidic region described herein) near the second electrode (e.g., within the half of the reactor compartment that is closest to the second electrode). For example, in some instances, the fluid adjacent the second electrode (e.g., the acidic region) has a lower pH than fluid further away from the second electrode. As an example, referring to FIG. 2A, in some cases, the system comprises acidic region 107 near second electrode 105. Similarly, referring to FIG. 1A, in certain instances, the system comprises acidic region 107 near second electrode 105.

According to certain embodiments, the pH near (e.g., adjacent to) the second electrode has a pH of less than or equal to 6, less than or equal to 5, less than or equal to 4, less than or equal to 3, less than or equal to 2, or less than or equal to 1. In some embodiments, the pH near the second electrode has a pH of greater than or equal to 0, greater than or equal to 1, greater than or equal to 2, greater than or equal to 3, greater than or equal to 4, or greater than or equal to 5. Combinations of these ranges are also possible (e.g., greater than or equal to 0 and less than or equal to 6).

In certain embodiments, the first electrode (e.g., cathode) is configured to produce hydrogen gas, such that hydrogen gas can be produced near the first electrode (e.g., the hydrogen gas is produced as a result of an electrochemical reaction in the first electrode). For example, referring to FIG. 2A, in some embodiments, first electrode 104 is configured to produce hydrogen gas 108. Similarly, referring to FIG. 1A, in certain instances, first electrode 104 is configured to produce hydrogen gas. In some instances, running the reactor in the first mode comprises producing hydrogen gas (e.g., hydrogen gas and base) near the first electrode (e.g., hydrogen gas is produced as a result of an electrochemical reaction in the first electrode). In some instances, the hydrogen gas and/or base are produced near the first electrode by reduction of water near the first electrode.

In certain embodiments, the second electrode (e.g., anode) is configured to produce oxygen, such that oxygen gas can be produced near the second electrode (e.g., the oxygen gas is produced as a result of an electrochemical reaction in the second electrode). For example, referring to FIG. 2A, in some embodiments, second electrode 105 is configured to produce oxygen gas 109. Similarly, referring to FIG. 1A, in certain embodiments, second electrode 105 is configured to produce oxygen gas. In certain cases, running the reactor in the first mode comprises producing oxygen gas (e.g., oxygen gas and acid) near the second electrode (e.g., oxygen gas is produced as a result of an electrochemical reaction in the second electrode). In some instances, the oxygen gas and/or acid are produced near the second electrode by oxidation of water near the second electrode.

In some embodiments, the system is configured to allow oxygen gas to diffuse and/or be transported to a location near the first electrode (e.g., from a location near the second electrode). For example, in some cases, the system is configured to allow oxygen gas to diffuse and/or be transported to fluid near the first electrode, such that the oxygen gas could be involved in an electrochemical reaction in the first electrode, from fluid near the second electrode, after the oxygen gas was produced as a result of an electrochemical reaction in the second electrode. For example, referring to FIG. 2A, in some embodiments, system 200 is configured to allow oxygen gas 109 to diffuse and/or be transported from second electrode 105 to first electrode 104. Similarly, referring to FIG. 1A, in certain embodiments, system 100 is configured to allow oxygen gas to diffuse and/or be transported from second electrode 105 to first electrode 104.

According to certain embodiments, the system is configured to allow the oxygen gas to be reduced near the first electrode (e.g., the oxygen gas is reduced as a result of an electrochemical reaction in the first electrode). For example, referring to FIG. 2A, in certain embodiments, system 200 is configured to allow oxygen gas 109 to be reduced near first electrode 104. Similarly, referring to FIG. 1A, in some instances, system 100 is configured to allow oxygen gas to be reduced near first electrode 104. In some embodiments, reducing the oxygen gas near the first electrode comprises production of base. In certain embodiments, the production of base is advantageous because it increases the overall amount of base produced at the first electrode.

In some embodiments, the system is configured to allow hydrogen gas to diffuse and/or be transported to a location near the second electrode (e.g., from a location near the first electrode). For example, in some cases, the system is configured to allow hydrogen gas to diffuse and/or be transported to fluid near the second electrode, such that the hydrogen gas could be involved in an electrochemical reaction in the second electrode, from fluid near the first electrode, after the hydrogen gas was produced as a result of an electrochemical reaction in the first electrode. For example, referring to FIG. 2A, in certain cases, system 200 is configured to allow hydrogen gas 108 to diffuse and/or be transported from first electrode 104 to second electrode 105. Similarly, referring to FIG. 1A, in some instances, system 100 is configured to allow hydrogen gas to diffuse and/or be transported from first electrode 104 to second electrode 105.

According to certain embodiments, the system is configured to allow the hydrogen gas to be oxidized near the second electrode (e.g., hydrogen gas is oxidized as a result of an electrochemical reaction in the second electrode). For example, referring to FIG. 2A, in some embodiments, system 200 is configured to allow hydrogen gas 108 to be oxidized near second electrode 105. Similarly, referring to FIG. 1A, in certain embodiments, system 100 is configured to allow hydrogen gas to be oxidized near the second electrode. In some embodiments, oxidizing the hydrogen gas near the second electrode comprises production of acid. In certain embodiments, the production of acid is advantageous because it increases the overall amount of acid produced at the second electrode.

In some embodiments, the system comprises a separator. For example, referring to FIG. 1C, in some embodiments, system 100 comprises separator 124. Similarly, referring to FIG. 2B, in certain embodiments, system 200 comprises separator 124. In certain embodiments, the separator is configured to allow oxygen gas produced at the second electrode to diffuse to the first electrode and/or to allow hydrogen gas produced at the first electrode to diffuse to the second electrode. For example, in some embodiments, the separator is permeable to oxygen gas and/or hydrogen gas. For example, referring to FIG. 1C, in some embodiments, separator 124 is configured to allow oxygen gas produced at the second electrode to diffuse to the first electrode and/or to allow hydrogen gas produced at the first electrode to diffuse to the second electrode. Similarly, referring to FIG. 2B, in certain embodiments, separator 124 is configured to allow oxygen gas produced at the second electrode to diffuse to the first electrode and/or to allow hydrogen gas produced at the first electrode to diffuse to the second electrode.

There may be many suitable ways to transport the hydrogen gas and/or oxygen gas from one electrode to the other. For example, in some embodiments, the hydrogen gas and/or oxygen gas could be transported with a syringe (e.g., if the reactor had an inlet near one electrode for a syringe and an outlet near the other electrode for a syringe, the gas could be transported from one electrode to the other with a syringe). In certain embodiments, the hydrogen gas and/or oxygen gas could be transported via a conduit (e.g., a pipe, channel, needle, or tube). In some cases, the hydrogen gas and/or oxygen gas could be transported directly from one electrode to another, or the hydrogen gas and/or oxygen gas could be stored after removal from the reactor until it is added back into the reactor. In some embodiments, the hydrogen gas and/or oxygen gas is transported continuously or in batches. In certain embodiments, the hydrogen gas and/or oxygen gas is transported automatically or manually.

In some embodiments, hydrogen gas produced by hydrolysis may be electrochemically oxidized using the hydrogen oxidation reaction (HOR) in which one dihydrogen molecule reacts to form two protons and two electrons. In other embodiments, oxygen gas produced by hydrolysis may be electrochemically reduced in the oxygen reduction reaction (ORR) wherein one dioxygen molecule reacts with two water molecules and four electrons to form four hydroxyl ions. In some embodiments, the HOR reaction is used to lower the pH or increase the proton concentration of the acidic solution produced by the reactor. In some embodiments, the ORR reaction is used to increase the pH or increase the hydroxyl concentration of the basic solution produced by the reactor. HOR and ORR reactions as herein described may be carried out, in some cases, using separate electrodes from those used for the electrolysis reaction of the reactor. In certain embodiments, these electrodes may be located within the electrolysis reactor, for example, as a combustion electrode where the hydrogen and oxygen combustion reaction produces water that remains within the reactor. The electrodes used for combustion, or for HOR or ORR, may, in some instances, also be located in a separate vessel or reactor, to which the hydrogen or oxygen gas is each delivered. In some embodiments, the hydrogen produced at the cathode of the electrolysis reactor is delivered to an HOR electrode connected to the anode side of the reactor, where HOR is conducted and the protons produced thereby increase the acid concentration (lowering the pH) of the acidic solution that is produced by the reactor. In certain embodiments, the oxygen produced at the anode of the electrolysis reactor is delivered to an ORR electrode connected to the cathode side of the reactor, where ORR is conducted and the hydroxyl ions produced thereby increase the hydroxyl concentration (increasing the pH) of the alkaline solution that is produced by the reactor. In some instances, the HOR reaction is preferentially conducted over the ORR reaction to reduce the release of hydrogen as compared to the less reactive oxygen to the external environment. The electrodes used for hydrogen-oxygen combustion or HOR or ORR may, in some cases, comprise compounds that function as electrocatalysts. Hydrogen-oxygen combustion catalysts have been described, for example, in "Catalytic Combustion of Hydrogen—Its Role in Hydrogen Utilization," by M Haruta and H Sano, International Journal of Hydrogen Energy, Vol. 6, No. 6, pp. 601-608, 1981, which is hereby incorporated by reference. Examples of electrocatalysts for HOR and ORR include platinum group metals such as Pt, Pd, Ru, Rh, Os, and Jr, non-platinum group metals such as Mo, Fe, Ti, W, Cr, Co, Cu, Ag, Au, and Re, used individually or as alloys or mixtures; high surface area nickel-aluminum alloys known as Raney nickel, optionally coated or doped with other catalysts. Examples of electrocatalysts selective for ORR include metallic iron, iron oxides, iron sulfide, and iron hydroxide, silver alloys, oxides and nitrate, and various forms of carbons including carbon paper, carbon felt, graphite, carbon black, and nanoscale carbons.

In certain embodiments described herein, the gaseous byproducts produced by electrolysis (e.g., $CO_2$, $H_2$, and/or $O_2$) may have value and may be sold for use in other applications and processes, including combustion in a fuel cell or gas turbine or internal combustion engine for the purpose of producing energy and power, including electric power. However, in some instances, it may be desirable to reduce or eliminate the production of such gases. Accordingly, in some embodiments, one or more of the gases produced by the reactor are recombined. As used herein, recombination refers to chemical or electrochemical reactions that consume one or more of the gases produced.

Figures 6A, 6B:
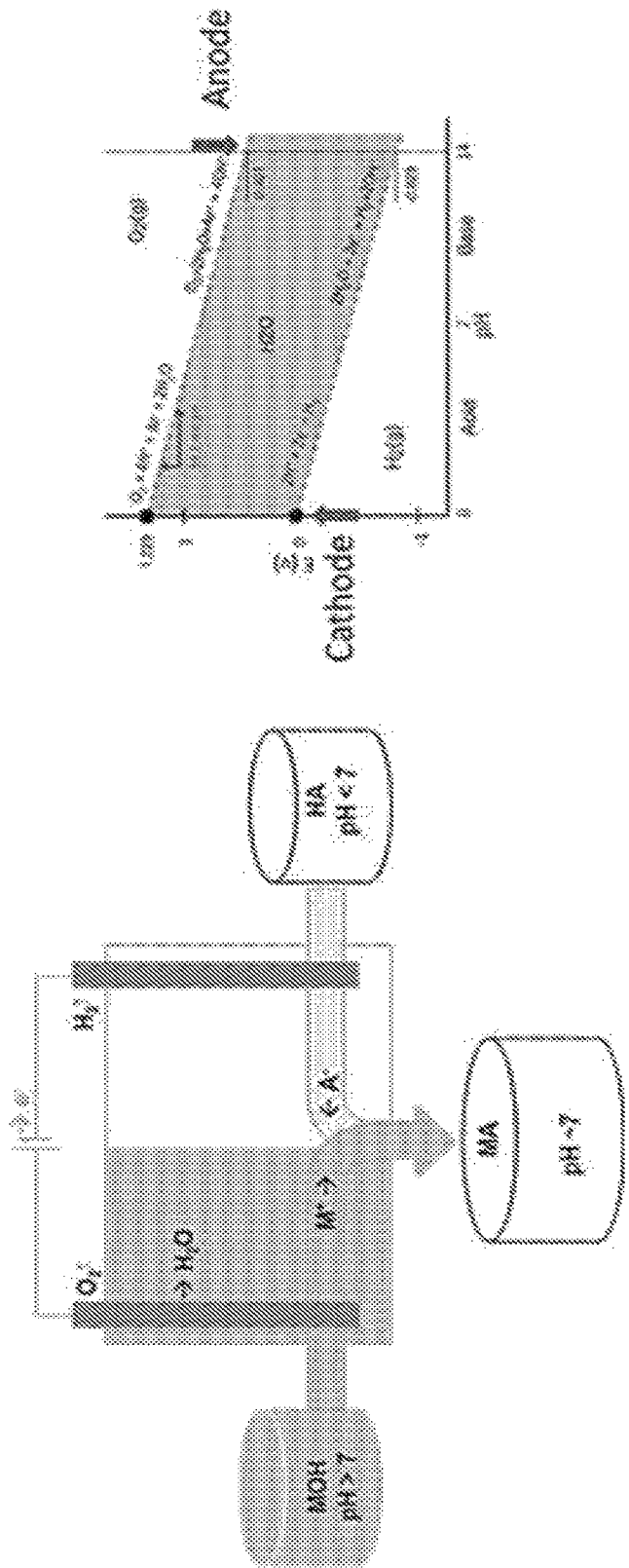
FIG. 6A is, in accordance with certain embodiments, a schematic illustration of operation of a reactor in low-voltage mode.
FIG. 6B is a Pourbaix diagram illustrating low-voltage mode.

In some embodiments, hydrogen and oxygen produced by hydrolysis are recombined using hydrogen-oxygen combustion to form water. For example, referring to FIG. 2A, in some embodiments, hydrogen gas 108 produced by first electrode 104 can be recombined with oxygen gas 109 to form water, as shown in FIG. 6A. Similarly, referring to FIG. 1A, in certain embodiments, hydrogen gas produced by first electrode 104 can be recombined with oxygen gas to form water. In accordance with certain embodiments, hydrogen-oxygen recombination may take place within or external to the reactor, and may, in some cases, use electrode materials and designs, and optionally catalysts, well-known to those skilled in the art. In certain embodiments, the method does not produce net hydrogen gas (or the net amount of hydrogen gas produced is less than 5% (e.g., less than 2% or less than 1%) of the current supplied to the reactor). For example, in some embodiments, the method does not release any hydrogen gas (or the amount of hydrogen gas released is less than 5% (e.g., less than 2% or less than 1%) of the current supplied to the reactor) to the atmosphere, as the hydrogen gas produced is recombined with oxygen to form water. Similarly, in some cases, the method does not produce net oxygen gas (or the net amount of oxygen gas produced is less than 5% (e.g., less than 2% or less than 1%) of the current supplied to the reactor). For example, in certain instances, the method does not release any oxygen gas (or the net amount of oxygen gas released is less than 5% (e.g., less than 2% or less than 1%) of the current supplied to the reactor) to the atmosphere, as the oxygen gas produced is recombined with hydrogen to form water.

In some embodiments, hydrolysis is carried out under conditions that produce a basic pH near the first electrode (e.g., the cathode), and an acidic pH near the second electrode (e.g., the anode), without liberating hydrogen gas or oxygen gas (or the amount of hydrogen gas or oxygen gas liberated is less than 5% (e.g., less than 2% or less than 1%) of the current supplied to the reactor), respectively. For example, in some embodiments, $O_2$ could diffuse (e.g., through electrolyte 235 of FIG. 2A and/or through air above the electrolyte) from the second electrode (e.g., anode), where acid and $O_2$ are produced, to the first electrode (e.g., the cathode), where base is produced and where the $O_2$ would be reduced to form $OH^-$ (½ $O_2$+$H_2O$+2$e^-$→2 $OH^-$). In certain embodiments, this reaction would occur at pH>7 and an electrode potential less than 0.8 V vs the standard hydrogen electrode. Similarly, in some cases, $H_2$ could diffuse from the first electrode (e.g., the cathode), where base is produced, to the second electrode (e.g., the anode), where acid is produced and where the $H_2$ would be oxidized to form $H^+$ ($H_2$→2$H^+$+2$e^-$). In certain instances, this would occur when the pH is <7 and when the electrode potential is greater than −0.41 V vs the standard hydrogen electrode. In other electrolyzers, such as an alkaline electrolyzer, this reaction is hindered by a separator that prevents the crossover of gases between the two electrodes. However, in some embodiments disclosed herein, the reactor comprises a separator that allows and/or promotes crossover of $H_2$ and/or $O_2$, such that they can be consumed and increase the pH gradient.

In some embodiments, acidic solutions (less than pH 7) are generated from neutral-pH electrolytes at electrode potentials greater than 0.8 V vs the standard hydrogen electrode. For example, in certain embodiments, to make an acidic solution of pH 0, the minimum electrode potential would be 1.23 V vs the standard hydrogen electrode. In some cases, basic solutions (greater than pH 7) are generated from neutral-pH electrolytes at electrode potentials less than −0.4 V vs the standard hydrogen electrode. For example, to make an alkaline solution of pH 14, the maximum electrode potential would be −0.83 V vs the standard hydrogen electrode.

The Nernst potential at the second electrode (e.g., the Nernst potential in the fluid nearest the second electrode) may be any of a variety of suitable values. In some embodiments, the Nernst potential at the second electrode (e.g., the anode) is greater than or equal to −0.4 V, greater than or equal to −0.2 V, greater than or equal to 0 V, greater than or equal to 0.5 V, greater than or equal to 0.8 V, greater than or equal to 0.9 V, greater than or equal to 1 V, greater than or equal to 1.1 V, greater than or equal to 1.2 V, greater than or equal to 1.4 V, or greater than or equal to 1.6 V vs the standard hydrogen electrode. In certain embodiments, the Nernst potential at the second electrode is less than or equal to 2 V, less than or equal to 1.7 V, less than or equal to 1.5 V, less than or equal to 1.4 V, less than or equal to 1.3 V, less than or equal to 1.2 V, less than or equal to 1.1 V, less than or equal to 1 V, less than or equal to 0.9 V, less than or equal to 0.8 V, less than or equal to 0.5 V, less than or equal to 0 V, or less than or equal to −0.2 V vs the standard hydrogen electrode. Combinations of these ranges are also possible (e.g., greater than or equal to 0.8 V and less than or equal to 2 V, greater than or equal to 1.2 V and less than or equal to 2 V, greater than or equal to −0.4 V and less than or equal to 0.5 V, or greater than or equal to 0 V and less than or equal to 0.5 V).

In certain embodiments, the suitable Nernst potential at the second electrode depends on the type of reaction at the electrode. For example, in some cases, the Nernst potential at the second electrode when hydrogen gas is oxidized to acid is greater than or equal to −0.4 V vs the standard hydrogen electrode (e.g., greater than or equal to −0.4 V and less than or equal to 0.5 V or greater than or equal to 0 V and less than or equal to 0.5 V). As another example, in certain instances, the Nernst potential at the second electrode when water is oxidized to acid and oxygen gas is greater than or equal to 0.8 V vs the standard hydrogen electrode (e.g., greater than or equal to 0.8 V and less than or equal to 2 V or greater than or equal to 1.2 V and less than or equal to 2 V).

The Nernst potential at the first electrode (e.g., the Nernst potential in the fluid nearest the first electrode) may be any of a variety of suitable values. In certain embodiments, the Nernst potential at the first electrode (e.g., cathode) is less than or equal to 0.8 V, less than or equal to 0.6 V, less than or equal to 0.4 V, less than or equal to 0 V, less than or equal to −0.4 V, less than or equal to −0.5 V, less than or equal to −0.6 V, less than or equal to −0.7 V, less than or equal to −0.8 V, less than or equal to −0.9 V, less than or equal to −1 V, less than or equal to −1.2 V, or less than or equal to −1.4 V vs the standard hydrogen electrode. In some embodiments, the Nernst potential at the first electrode is greater than or equal to −2 V, greater than or equal to −1.7 V, greater than or equal to −1.5 V, greater than or equal to −1.2 V, greater than or equal to −1 V, greater than or equal to −0.9 V, greater than or equal to −0.8 V, greater than or equal to −0.7 V, greater than or equal to −0.6 V, greater than or equal to −0.5 V, greater than or equal to −0.4 V, greater than or equal to 0 V, greater than or equal to 0.4 V, or greater than or equal to 0.6

V vs the standard hydrogen electrode. Combinations of these ranges are also possible (e.g., greater than or equal to −1.5 V and less than or equal to −0.4 V, greater than or equal to −1.5 V and less than or equal to −0.8 V, greater than or equal to −0.4 V and less than or equal to 0.8 V, or greater than or equal to −0.4 V and less than or equal to 0.4 V).

In certain embodiments, the suitable Nernst potential at the first electrode depends on the type of reaction at the electrode. For example, in some cases, the Nernst potential at the first electrode when oxygen gas is reduced to base is less than or equal to 0.8 V vs the standard hydrogen electrode (e.g., less than or equal to 0.8 V and greater than or equal to −0.4 V or less than or equal to 0.4 V and greater than or equal to −0.4 V). As another example, in certain instances, the Nernst potential at the first electrode when water is reduced to base and hydrogen gas is less than or equal to −0.4 V vs the standard hydrogen electrode (e.g., less than or equal to −0.4 V and greater than or equal to −1.5 V, or less than or equal to −0.8 V and greater than or equal to −1.5 V).

In certain embodiments, the cell voltage (e.g., the voltage applied to the cell, for example, during production of acid and/or base) is greater than or equal to 0 V, greater than or equal to 0.5 V, greater than or equal to 1 V, greater than or equal to 1.23 V, greater than or equal to 1.5 V, greater than or equal to 2 V, greater than or equal to 2.06 V, or greater than or equal to 2.5 V vs the standard hydrogen electrode. In some embodiments, the cell voltage is less than or equal to 5 V, less than or equal to 4 V, less than or equal to 3 V, less than or equal to 2.5 V, less than or equal to 2.25 V, less than or equal to 2 V, less than or equal to 1.5 V, less than or equal to 1 V, or less than or equal to 0.5 V vs the standard hydrogen electrode. Combinations of these ranges are also possible (e.g., 0-5 V or 0-2.5 V).

In some embodiments, the system comprises a reactor system for producing concentrated acid and base. In accordance with some embodiments, the system comprises a first reactor (e.g., any reactor described herein). For example, referring to FIG. 3A, in some embodiments, system 300 comprises first reactor 320. According to some embodiments, the system comprises a second reactor (e.g., any reactor described herein). For example, referring to FIG. 3A, in some embodiments, system 300 comprises second reactor 301. In certain cases, the first reactor and the second reactor are fluidically connected. For example, referring to FIG. 3A, in accordance with some embodiments, first reactor 320 is fluidically connected to second reactor 301 via conduit 330. For instance, in some cases, a fluid (e.g., a liquid or a gas) produced in the first reactor can diffuse and/or be transported to the second reactor. As a non-limiting example, in certain embodiments, the method comprises diffusing and/or transporting hydrogen gas and/or dihalide from the first reactor to the second reactor.

In some embodiments, the first reactor comprises an electrochemical reactor. In certain cases, the first reactor comprises a first electrode (e.g., any first electrode described herein). For example, referring to FIG. 3B, in some cases, first reactor 320 comprises first electrode 104. In some instances, the first reactor comprises a second electrode (e.g., any second electrode described herein). For example, referring to FIG. 3B, in some cases, first reactor 320 comprises second electrode 105. In some embodiments, the second electrode is electrochemically coupled to the first electrode (e.g., the electrodes are configured such that current may flow from one electrode to the other). That is to say, the electrodes can be configured such that they are capable of participating in an electrochemical process. Electrochemical coupling can be achieved, for example, by exposing the first and second electrodes to an electrolyte that facilitates ionic transport between the two electrodes. For example, referring to FIG. 3A, in some embodiments, first electrode 104 is electrochemically coupled to second electrode 105.

Figure 3A:
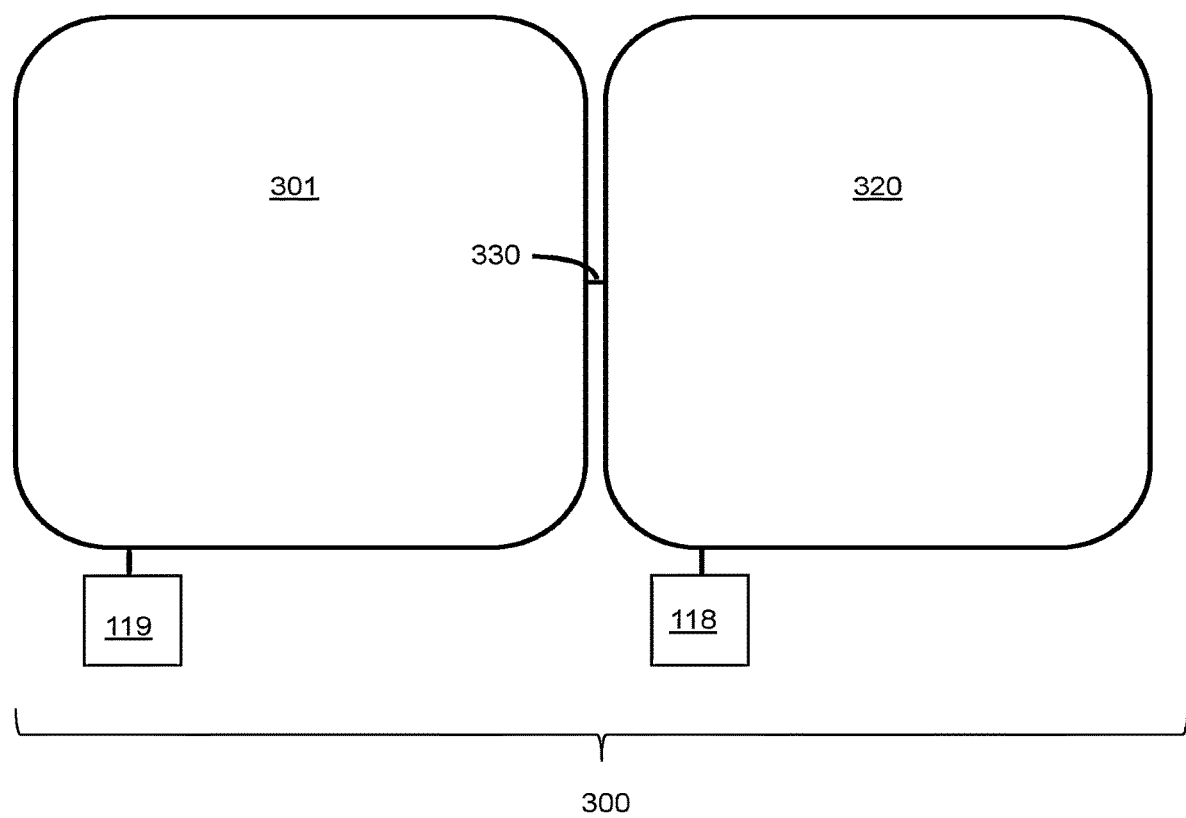
FIG. 3A is, in accordance with certain embodiments, a schematic illustration of a system comprising two reactors.
Figure 3B:
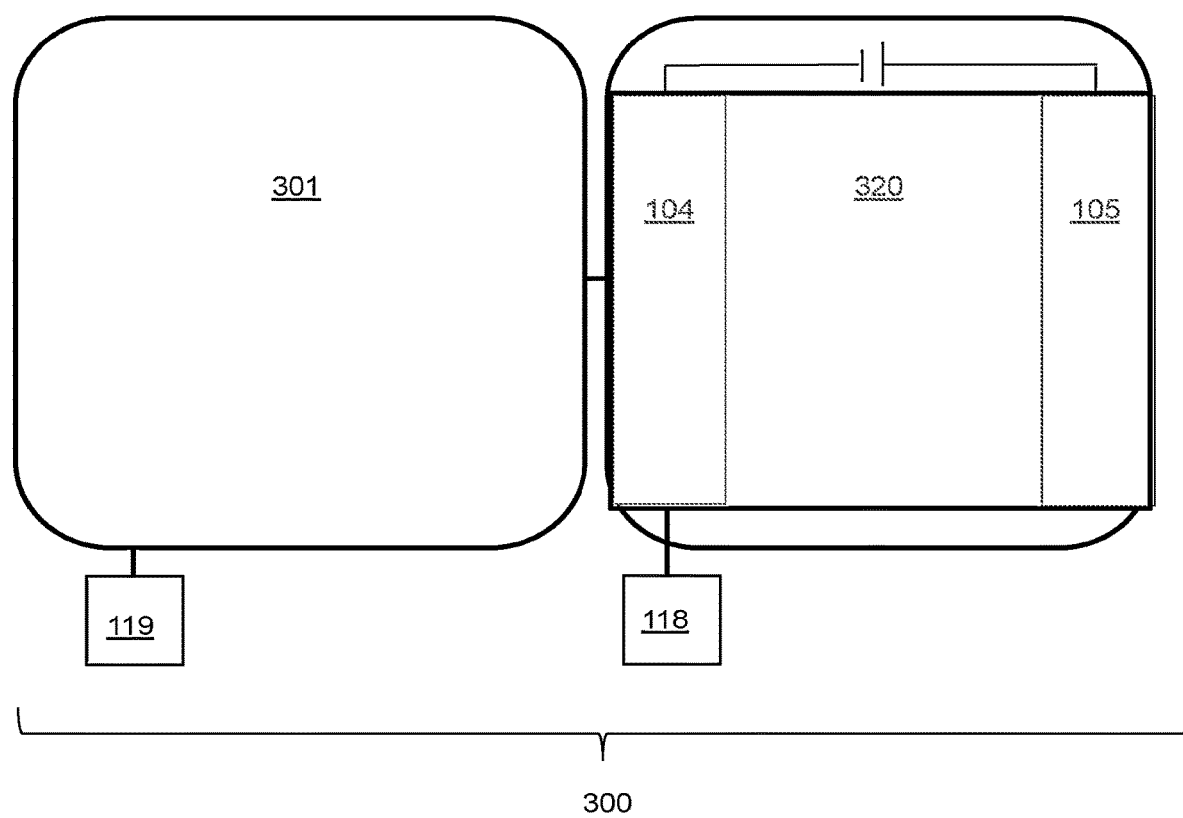
FIG. 3B is, in accordance with certain embodiments, a schematic illustration of a system comprising two reactors, wherein the first reactor comprises a first electrode and second electrode.

In certain instances, the second reactor comprises a fuel cell (e.g., an $H_2/Cl_2$ fuel cell). In some embodiments, the method comprises producing an acid in the second reactor. For instance, in certain cases, second reactor 301 in FIG. 3A is configured to produce acid (e.g., any acid described herein).

In certain embodiments, the method comprises producing a base (e.g., any base described herein), a dihalide, and/or hydrogen gas in the first reactor. For example, referring to FIG. 3A, in some cases, first reactor 320 is configured to produce a base, a dihalide, and/or hydrogen gas. In some instances, the dihalide is produced near the second electrode of the first reactor (e.g., dihalide is produced as a result of an electrochemical reaction in the second electrode of the first reactor). For instance, referring to FIG. 3B, in certain cases, dihalide is produced near second electrode 105 of first reactor 320. In some embodiments, the base and/or hydrogen gas is produced near the first electrode (e.g., base and/or hydrogen gas is produced as a result of an electrochemical reaction in the first electrode). For example, referring to FIG. 3B, in certain cases, base is produced near first electrode 104.

The Nernst potential at the second electrode of the first reactor (e.g., the Nernst potential in the fluid nearest the second electrode) may be any of a variety of suitable values. In some embodiments, the Nernst potential at the second electrode (e.g., the anode) of the first reactor is greater than or equal to 1.3 V, greater than or equal to 1.5 V, greater than or equal to 1.7 V, greater than or equal to 1.9 V, greater than or equal to 2.1 V, or greater than or equal to 2.3 V vs the standard hydrogen electrode. In certain embodiments, the Nernst potential at the second electrode of the first reactor is less than or equal to 2.5 V, less than or equal to 2.3 V, less than or equal to 2.1 V, less than or equal to 1.9 V, less than or equal to 1.7 V, or less than or equal to 1.5 V vs the standard hydrogen electrode. Combinations of these ranges are also possible (e.g., greater than or equal to 1.3 V and less than or equal to 2.5 V).

In certain embodiments, the suitable Nernst potential at the second electrode of the first reactor depends on the type of reaction at the electrode. For example, in some cases, the Nernst potential at the second electrode when dihalide is produced (e.g., chloride ions are being oxidized to form $Cl_2$) is greater than or equal to 1.3 V vs the standard hydrogen electrode (e.g., greater than or equal to 1.3 V and less than or equal to 2.5 V).

In some embodiments, $Cl_2$ is generated from Cl— at Nernst potentials above 1.36 V vs the standard hydrogen electrode (e.g., greater than or equal to 1.4 V, greater than or equal to 1.5 V, greater than or equal to 1.7 V, or greater than or equal to 2 V; less than or equal to 5 V, less than or equal to 3 V, less than or equal to 2 V, or less than or equal to 1.5 V; combinations are also possible) vs the standard hydrogen electrode.

In certain embodiments, $Br_2$ is generated from Br— at Nernst potentials greater than 1.06 V vs the standard hydrogen electrode (e.g., greater than or equal to 1.1 V, greater than or equal to 1.2 V, greater than or equal to 1.3 V, greater than or equal to 1.5 V, or greater than or equal to 1.8 V; less than or equal to 4 V, less than or equal to 3 V, less than or equal to 2 V, or less than or equal to 1.5 V; combinations are also possible).

In some cases, $I_2$ is generated from I— at Nernst potentials greater than 0.54 V vs the standard hydrogen electrode (e.g., greater than or equal to 0.6 V, greater than or equal to 0.7 V, greater than or equal to 0.8 V, greater than or equal to 0.9 V, greater than or equal to 1 V, or greater than or equal to 1.2 V; less than or equal to 3 V, less than or equal to 2 V, less than or equal to 1.5 V, less than or equal to 1.3 V, or less than or equal to 1 V; combinations are also possible).

The Nernst potential at the first electrode of the first reactor (e.g., the Nernst potential in the fluid nearest the first electrode) may be any of a variety of suitable values. In some embodiments, the Nernst potential at the first electrode (e.g., the cathode) of the first reactor is greater than or equal to −2 V, greater than or equal to −1.8 V, greater than or equal to −1.6 V, greater than or equal to −1.4 V, greater than or equal to −1.2 V, greater than or equal to −1.0 V, greater than or equal to −0.8 V, greater than or equal to −0.6 V, greater than or equal to −0.4 V, greater than or equal to −0.2 V, greater than or equal to 0 V, greater than or equal to 0.2 V, greater than or equal to 0.4 V, or greater than or equal to 0.6 V vs the standard hydrogen electrode. In certain embodiments, the Nernst potential at the first electrode of the first reactor is less than or equal to 0.8 V, less than or equal to 0.6 V, less than or equal to 0.4 V, less than or equal to 0.2 V, less than or equal to 0 V, less than or equal to −0.2 V, less than or equal to −0.4 V, less than or equal to −0.6 V, less than or equal to −0.8 V, less than or equal to −1.0 V, less than or equal to −1.2 V, less than or equal to −1.4 V, or less than or equal to −1.6 V vs the standard hydrogen electrode. Combinations of these ranges are also possible (e.g., greater than or equal to −2 V and less than or equal to 0.8 V, greater than or equal to −1.4 V and less than or equal to 0.4 V, greater than or equal to −2 V and less than or equal to −0.4 V, or greater than or equal to −2 V and less than or equal to −0.8 V).

In certain embodiments, the suitable Nernst potential at the first electrode of the first reactor depends on the type of reaction at the electrode. For example, in some cases, the Nernst potential at the first electrode when oxygen is reduced to form base is less than or equal to 0.8 V vs the standard hydrogen electrode (e.g., greater than or equal to −2 V and less than or equal to 0.8 V or greater than or equal to −1.4 V and less than or equal to 0.4 V). As another example, in certain instances, the Nernst potential at the first electrode when water is reduced to hydrogen gas and base is less than or equal to −0.4 V vs the standard hydrogen electrode (e.g., greater than or equal to −2 V and less than or equal to −0.4 V, or greater than or equal to −2 V and less than or equal to −0.8 V).

Figure 11:
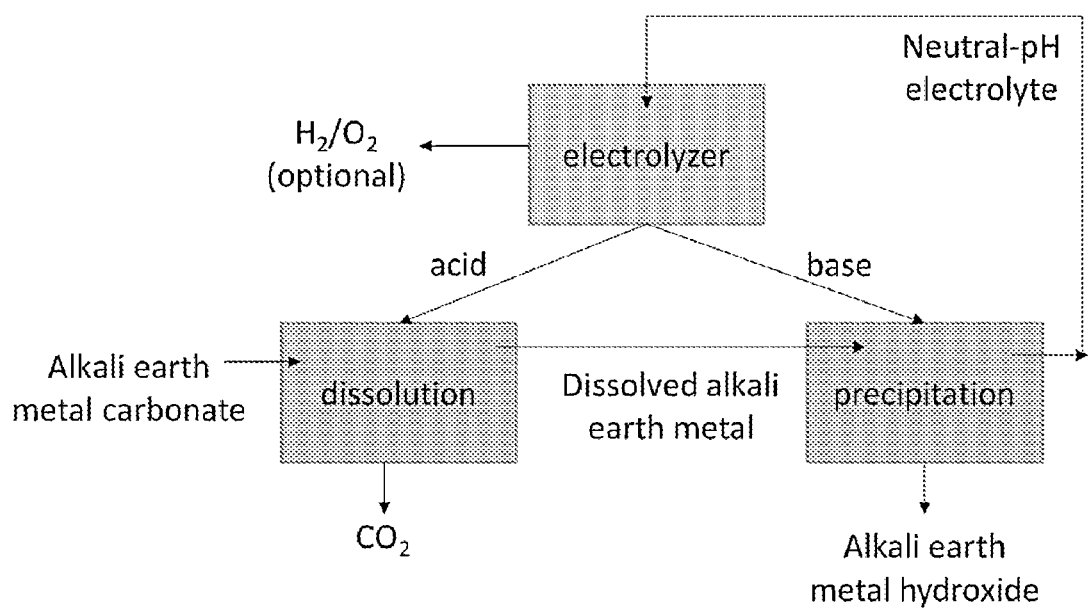
FIG. 11 is, in accordance with certain embodiments, a flow chart showing electrolysis of neutral-pH water to make acid/base for making precipitated hydroxides, in accordance with some embodiments.

In certain embodiments, the first reactor produces a base/alkaline solution, a dihalide, and hydrogen gas from an electrolyte containing a halide salt. FIG. 11 shows, in accordance with certain embodiments, a neutral water electrolyzer based reactor as disclosed herein, whereby electrolysis or hydrolysis produces an acidic solution and an alkaline solution, the acidic solution being then used to decarbonate a starting metal carbonate, and the alkaline solution being then used to precipitate a metal hydroxide from the dissolved metal ions of the starting metal carbonate. In some embodiments, the volume concentrations of reactants on which such a reactor operates are determined by the pH values produced by the electrolyzer.

Figure 12:
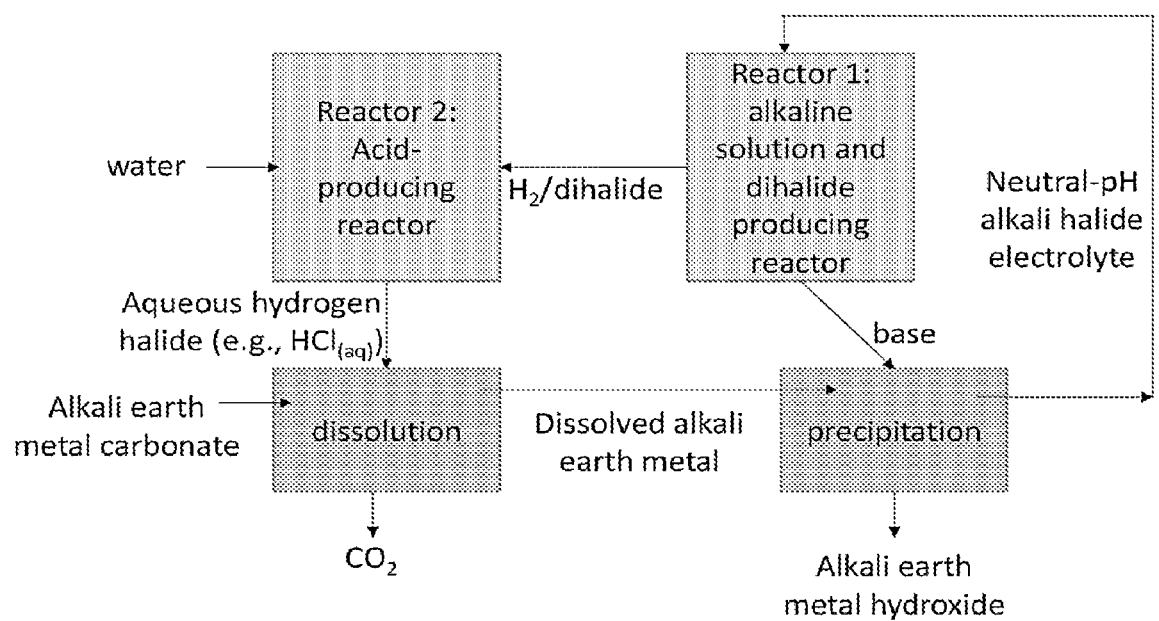
FIG. 12 is, in accordance with certain embodiments, a flow chart showing electrolysis of alkali halide electrolytes to make acid/base for making precipitated hydroxides, in accordance with certain embodiments.

In accordance with certain embodiments, an alternative reactor concept is shown in FIG. 12. According to some embodiments, this reactor is capable of producing higher concentrations of acid and base than the reactor in FIG. 11. In some embodiments, the system comprises a first reactor that electrolytically oxidizes a near-neutral solution of a dissolved metal salt to produce an alkaline solution, hydrogen, and a compound enriched in the anion of the metal salt. In some embodiments, the metal salt is an alkali halide salt or an alkaline earth halide salt, and said compound produced is a dihalide. A second reactor produces, in accordance with certain embodiments, an acidic solution by reacting said compound and hydrogen with water. Said acidic solution produced by the second reactor, and said alkaline solution produced by the first reactor, are then used, in some embodiments, to, respectively, dissolve said metal carbonate releasing $CO_2$, and precipitate said metal hydroxide. Unlike the reactor of FIG. 11, where reaching absolute $H^+$ and $OH^-$ concentrations greater than about 1 molar may be difficult, the reactor of FIG. 12 can reach concentrations of 3 molar, 5 molar, or even higher, in certain embodiments.

In certain embodiments, the first reactor comprises a second electrode (e.g., the anode), a first electrode (e.g., the cathode), a semi-permeable membrane between the two electrodes, inlets for the electrolyte, and outlets for the products of electrolysis ($H_2$, a dihalide, and an alkaline solution). In some embodiments, an additional inlet in the vicinity of the first electrode introduces $O_2$. In some cases, the electrolyte is near-neutral aqueous solution in which the metal salt is dissolved. In certain cases, the aqueous solution comprises halide anions (for example, $F^-$, $Cl^-$, $Br^-$, $I^-$) and the corresponding cations (for example, $Li^+$, $Na^+$, $K^+$, $NH_4^+$, $Mg^{2+}$, $Ca^{2+}$). In certain embodiments, the concentration of halide salt in the electrolyte may be anywhere from 0.01-50% by weight. In some embodiments, the electrolyte is introduced to the second electrode (e.g., the anode) by an inlet. In certain cases, the active material on the second electrode's surface may comprise platinum, graphite, platinized titanium, mixed metal oxides, mixed metal oxide-clad titanium, platinized metal oxides (e.g. platinized lead oxide, manganese dioxide), platinized ferrosilicon, platinum-iridium alloys, ruthenium oxides, titanium oxides, ruthenium and/or titanium mixed metal oxides.

In some cases, at the second electrode in Reactor 1, halide anions are oxidized to produce dihalides (e.g. $Cl_2$, $Br_2$, $I_2$). For example, in certain instances, oxidation of dissolved $Cl^-$ gives $Cl_2$ gas.

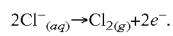

$$2Cl^-_{(aq)} \rightarrow Cl_{2(g)} + 2e^-.$$

In certain embodiments, at room temperature, oxidation of $Br^-$ gives $Br_2$, a fuming liquid, and oxidation of $I^-$ gives $I_2$, a solid. The dihalide is collected from the electrolyzer, in some cases, through an outlet and is used to make acid in a subsequent step, described below. In certain instances, the electrolyte containing a cation (e.g. $Li^+$, $Na^+$, $K^+$, $NH_4^+$) moves through the semipermeable membrane (a diaphragm, or an ion-exchange membrane) towards the first electrode (e.g., cathode). In some cases, the diaphragm or membrane prevents the alkali solution generated at the first electrode from increasing the pH at the second electrode. In certain embodiments, the first electrode's surface may comprise electrocatalytic compounds. Examples of electrocatalytic compounds include platinum, platinized titanium, mixed metal oxide-clad titanium, platinized metal oxides (e.g. platinized lead oxide, manganese dioxide), platinized ferrosilicon, platinum-iridium alloys, stainless steel, graphite, unalloyed titanium, stainless steel, nickel, nickel oxides. In certain embodiments, the second electrode comprises a metallic electrode, such as platinum, gold, nickel, iridium, copper, iron, steel, stainless steel, manganese, and zinc, or a carbon, such as graphite or disordered carbons, or a metal carbide, such as silicon carbide, titanium carbide, or tungsten carbide. In certain embodiments, the second electrode comprises a metal alloy (e.g. a nickel-chromium-iron alloy, nickel-molybdenum-cadmium alloy), a metal oxide (e.g. iridium oxide, nickel iron cobalt oxide, nickel cobalt oxide, lithium cobalt oxide, lanthanum strontium cobalt oxide, barium strontium ferrous oxide, manganese molybdenum oxide, ruthenium dioxide, iridium ruthenium tantalum oxide), a metal organic framework, or a metal sulfide (e.g. molybdenum sulfide). In certain embodiments, the electrocatalyst or electrode material is dispersed or coated onto a conductive support. In some embodiments, as shown in FIG. 13A, at the first electrode (e.g., the cathode) of Reactor 1, water is reduced to give OH⁻ (an alkali solution) and $H_{2\,(g)}$:

$$H_2O + 2e^- \rightarrow H_2 + 2OH^-$$

Figure 13A:
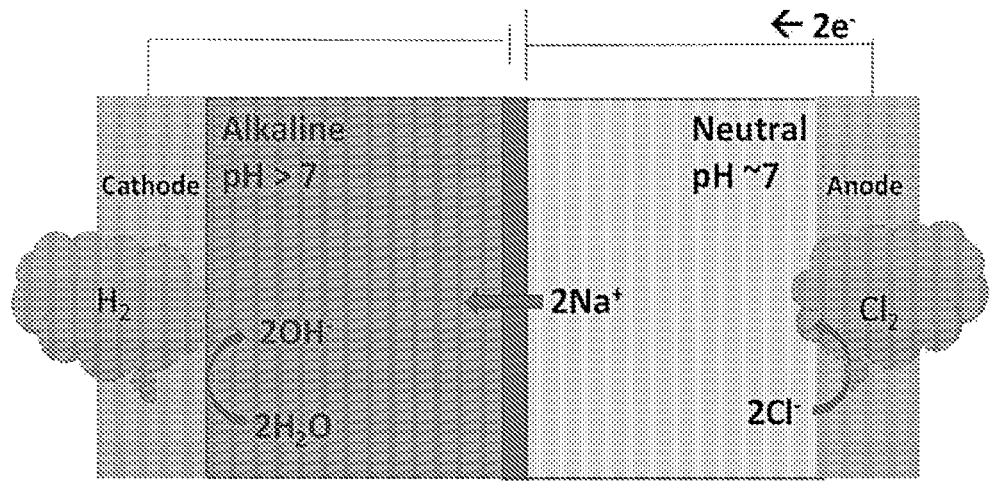
FIGS. 13A-13B show that the $OH^-$ is charge-balanced by the cation in the electrolyte that crosses the diaphragm or membrane, in accordance with certain embodiments.

In another embodiment, at the first electrode (e.g., the cathode) of Reactor 1, $O_2$ is reduced to give OH⁻ (an alkali solution); see FIG. 13A.

$$\tfrac{1}{2}O_2 + H_2O + 2e^- \rightarrow 2OH^-.$$

Figure 13B:
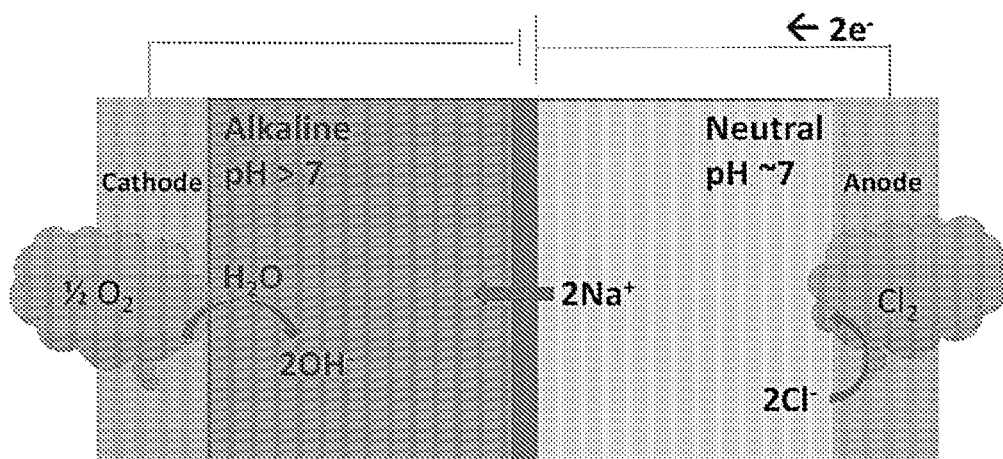

In some embodiments, the OH⁻ is charge-balanced by the cation in the electrolyte that crosses the diaphragm or membrane, as shown, for example, in FIG. 13. In certain cases, the alkali hydroxide solution (e.g. NaOH, KOH), with a pH greater than 7, with a concentration of alkali 0.01 mol/L or more, is collected from the reactor from an outlet. In certain instances, the $H_2$ is collected from the reactor from a different outlet. In some cases, Reactor 1 produces an alkaline solution at one electrode, and hydrogen and a dihalide (in the instance where the metal salt is a metal halide) at the other electrode.

Figure 14A:
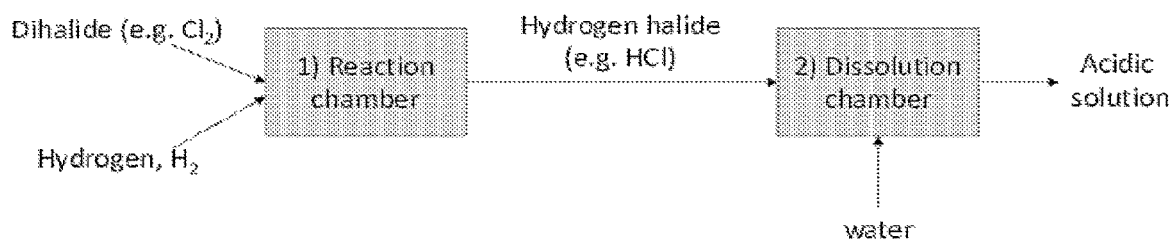
FIGS. 14A-14B show chemical dissolution and precipitation reactions, in accordance with certain embodiments.
Figure 14B:
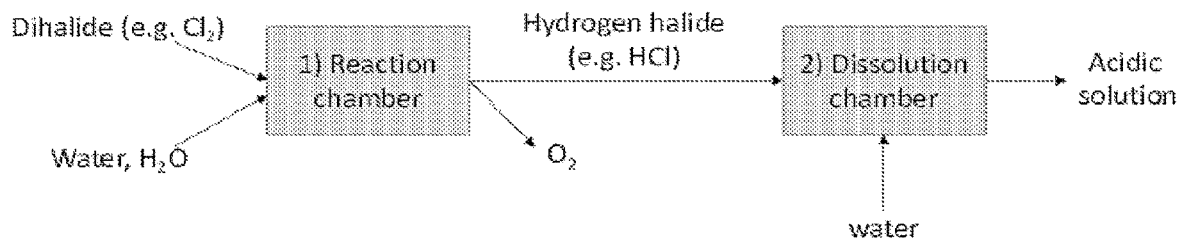

In accordance with some embodiments, in FIG. 12, Reactor 2 is a reactor that produces an acid by reacting the hydrogen gas and dihalide produced at the anode of Reactor 1, or by reacting the dihalide with water. Without being limited by the following examples, two embodiments of this reactor are shown in FIGS. 14A-14B. In accordance with certain embodiments, in FIG. 14A, the reactor comprises a first chamber, an inlet through which $H_2$ is introduced to the first chamber, a second inlet through which the dihalide is introduced to the first chamber, and an outlet through which the hydrogen halide (e.g. HCl, HBr, HI) is removed from the first chamber, an inlet through which the hydrogen halide is introduced to a second chamber, an inlet through which water is introduced to a second chamber, and an outlet through which an aqueous, acidic solution of the hydrogen halide is removed from the second chamber. In some embodiments, in the first chamber the dihalide reacts with $H_2$ to form a hydrogen halide. In certain embodiments, the reaction between $H_2$ and the dihalide may be assisted by heating or irradiation by electromagnetic waves. For example, in some embodiments, if the dihalide is $Cl_2$, the following reaction takes place in Reactor 2:

$$Cl_2 + H_2 \rightarrow 2HCl$$

In some cases, in the second chamber, the hydrogen halide is dissolved in water to make an acidic solution. For example, HCl could be dissolved in water to make protons.

In accordance with certain embodiments, in FIG. 14B, the dihalide is reacted with water to produce the desired acid, and oxygen as a byproduct. In some cases, the exemplary reactor comprises a first chamber, an inlet through which $H_2O$ is introduced to the first chamber, and a second inlet through which the dihalide is introduced to the first chamber. In certain instances, the reactor also comprises an outlet through which the hydrogen halide (e.g. HCl, HBr, HI) is removed from the first chamber, and an outlet through which $O_2$ is removed from the first chamber. In some cases, the reaction between chlorine as an exemplary dihalide and water is:

$$Cl_2 + H_2O \rightarrow 2HCl + \tfrac{1}{2}O_2.$$

In some embodiments, the relative amounts of the dihalide and water will determine whether the pure hydrogen halide, or an admixture of the hydrogen halide and water, including for example a solution of the hydrogen halide in water, is produced. Optionally, in certain embodiments, the reactor may comprise a second chamber where the hydrogen halide is dissolved in water to make an acidic solution with an inlet through which the hydrogen halide is introduced, an inlet through which water is introduced to the second chamber, and an outlet through which an aqueous, acidic solution of the hydrogen halide is removed from the reactor, as shown in FIG. 14B.

In some embodiments, the system comprises an apparatus. For example, referring to FIG. 1A, in some embodiments, the system comprises first apparatus 118. Similarly, referring to FIG. 2C, in certain cases, the system comprises first apparatus 118. Analogously, referring to FIG. 3A, in some instances, the system comprises first apparatus 118. In certain instances, the apparatus is a container (e.g., a container that is not open to the atmosphere). In accordance with certain embodiments, the apparatus is configured to collect one or more products or byproducts of the reactor (e.g., acid, base, hydrogen gas, oxygen gas, and/or carbon dioxide gas, etc.), store one or more of the one or more products or byproducts, and/or react one or more of the one or more products or byproducts (e.g., in a chemical dissolution and/or precipitation reaction).

In certain embodiments, the system comprises multiple apparatuses. In some embodiments, the system comprises greater than or equal to 1, greater than or equal to 2, greater than or equal to 3, greater than or equal to 4, or greater than or equal to 5 apparatuses. In some cases, the system comprises less than or equal to 6, less than or equal to 5, less than or equal to 4, less than or equal to 3, or less than or equal to 2 apparatuses. Combinations of these ranges are also possible (e.g., 1-6 apparatuses). In some embodiments, the system comprises a first apparatus and a second apparatus. For example, in FIG. 1B, in some embodiments, the system comprises first apparatus 118 and second apparatus 119. Similarly, referring to FIG. 2C, in certain embodiments, the system comprises first apparatus 118 and second apparatus 119. Analogously, referring to FIG. 3A, in some cases, the system comprises first apparatus 118 and second apparatus 119. Each apparatus may independently have one or more functions. Any apparatus, or configuration of apparatuses, disclosed herein may be used with any system disclosed herein.

In certain embodiments, the apparatus is fluidically connected to the reactor. For example, in some instances, the apparatus is connected to the reactor by a conduit (e.g., a pipe, channel, needle, or tube) through which fluid can flow. For example, referring to FIG. 1A, in some embodiments, apparatus 118 is fluidically connected to the reactor by a conduit. Similarly, referring to FIG. 2C, in certain embodiments, apparatus 118 is fluidically connected to the reactor by a conduit. Analogously, referring to FIG. 3A, in some instances, apparatus 118 is fluidically connected to the reactor by a conduit.

In certain cases, an apparatus is fluidically connected to one or more other apparatuses (e.g., by a conduit, such as a pipe, channel, needle, or tube). For example, referring to FIG. 1D, first apparatus 118 is fluidically connected to third apparatus 120 by a conduit. Similarly, referring to FIG. 2C, in some embodiments, first apparatus 118 could be fluidically connected to a third apparatus (e.g., by a conduit). Analogously, referring to FIG. 3A, in some cases, first apparatus 118 could be fluidically connected to a third apparatus (e.g., by a conduit). As another example, referring to FIG. 1E, in some embodiments, first apparatus 118 is fluidically connected to third apparatus 120 (e.g., by a conduit), which is fluidically connected to fifth apparatus 122 (e.g., by a conduit), while second apparatus 119 is fluidically connected to fourth apparatus 121 (e.g., by a conduit), which is fluidically connected to sixth apparatus 123 (e.g., by a conduit).

According to some embodiments, the method comprises collecting the acid and/or base. For example, in some embodiments, the method comprises removing the acid and/or base from the vessel in which it was produced (e.g., the reactor). A non-limiting example of a suitable method of collecting the acid and/or base comprises moving the acid and/or base through a conduit (e.g., a pipe, channel, needle, or tube) into a separate container. Other suitable examples of collecting the acid and/or base include moving the acid and/or base directly into a separate container (e.g., a container connected to the reactor by a panel that can be moved to block or allow diffusion of fluids). In some embodiments, the acid and/or base is collected continuously or in batches. In certain embodiments, the acid and/or base is collected automatically or manually.

In some embodiments, an apparatus is configured to collect an acid near the second electrode (and/or second reactor) and/or a base near the first electrode (and/or first reactor) (e.g., collect an acid from the acidic region and/or collect a base from the alkaline region). For example, referring to FIG. 1A, in some embodiments, the system comprises first apparatus 118, which is configured to collect a base near first electrode 104. Similarly, referring to FIG. 2C, in certain embodiments, the system comprises first apparatus 118, which is configured to collect a base near first electrode 104. Analogously, referring to FIG. 3A, system 300 comprises first apparatus 118, which is configured to collect a base near first reactor 320 (e.g., near first electrode 104 of first reactor 320). In some embodiments, first apparatus 118 could be configured to collect an acid near the second electrode (and/or second reactor), in addition to, or instead of collecting a base near the first electrode (and/or first reactor).

In certain embodiments, the second apparatus is configured to collect an acid near the second electrode (and/or second reactor) and/or a base near the first electrode (and/or first reactor). In some embodiments where the first apparatus is configured to collect a base near the first electrode, the second apparatus is configured to collect an acid near the second electrode. For example, referring to FIG. 1B, in some embodiments, the system comprises first apparatus 118 and second apparatus 119, and, in certain cases, first apparatus 118 is configured to collect a base near first electrode 104 and second apparatus 119 is configured to collect an acid near second electrode 105. Analogously, referring to FIG. 2C, in certain embodiments, the system comprises first apparatus 118 and second apparatus 119, and, in certain cases, first apparatus 118 is configured to collect a base near first electrode 104 and second apparatus 119 is configured to collect an acid near second electrode 105. Similarly, in FIG. 3A, in some instances, system 300 comprises first apparatus 118 and second apparatus 119, and, in certain cases, first apparatus 118 is configured to collect a base near first reactor 320 (e.g., first electrode 104) and apparatus 119 is configured to collect an acid near second reactor 301. Alternatively, in embodiments where the first apparatus is configured to collect an acid near the second electrode (and/or second reactor), the second apparatus may be configured to collect a base near the first electrode (and/or first reactor).

In certain embodiments, collecting the acid comprises collecting acid produced by an electrode from a vicinity close enough to the electrode that the acid has not been significantly diluted and/or reacted (e.g., the pH of the collected acid is within 1 pH unit of the acid with the lowest pH in the reactor). Similarly, in some embodiments, collecting the base comprises collecting the base produced by the electrode from a vicinity close enough to the electrode that the base has not been significantly diluted and/or reacted (e.g., the pH of the collected base is within 1 pH unit of the base with the highest pH in the reactor).

According to some embodiments, the method comprises storing the acid and/or base. For example, in certain embodiments, once the acid and/or base are collected in a separate container, the method comprises keeping the acid and/or base in the separate container for at least some period of time. In some embodiments, the method comprises storing the acid and/or base for greater than or equal to 5 minutes, greater than or equal to 15 minutes, greater than or equal to 30 minutes, greater than or equal to 1 hour, greater than or equal to 5 hours, greater than or equal to 12 hours, greater than or equal to 1 day, greater than or equal to 2 days, greater than or equal to 3 days, greater than or equal to 1 week, greater than or equal to 2 weeks, or greater than or equal to 1 month. In certain embodiments, the method comprises storing the acid and/or base for less than or equal to 1 year, less than or equal to 6 months, less than or equal to 3 months, less than or equal to 2 months, less than or equal to 1 month, less than or equal to 2 weeks, less than or equal to 1 week, less than or equal to 3 days, less than or equal to 2 days, less than or equal to 1 day, or less than or equal to 12 hours. Combinations of these ranges are also possible (e.g., greater than or equal to 5 minutes and less than or equal to 1 year, greater than or equal to 5 hours and less than or equal to 1 day, or greater than or equal to 1 week and less than or equal to 1 year).

In certain embodiments, an apparatus (e.g., the first apparatus and/or the second apparatus) is configured to store the acid and/or base. For example, referring to FIG. 1A, in some embodiments, first apparatus 118 is configured to store the base. Similarly, referring to FIG. 2C, in certain embodiments, first apparatus 118 is configured to store the base. Analogously, referring to FIG. 3A, in some cases, first apparatus 118 is configured to store the base.

Figure 1B:
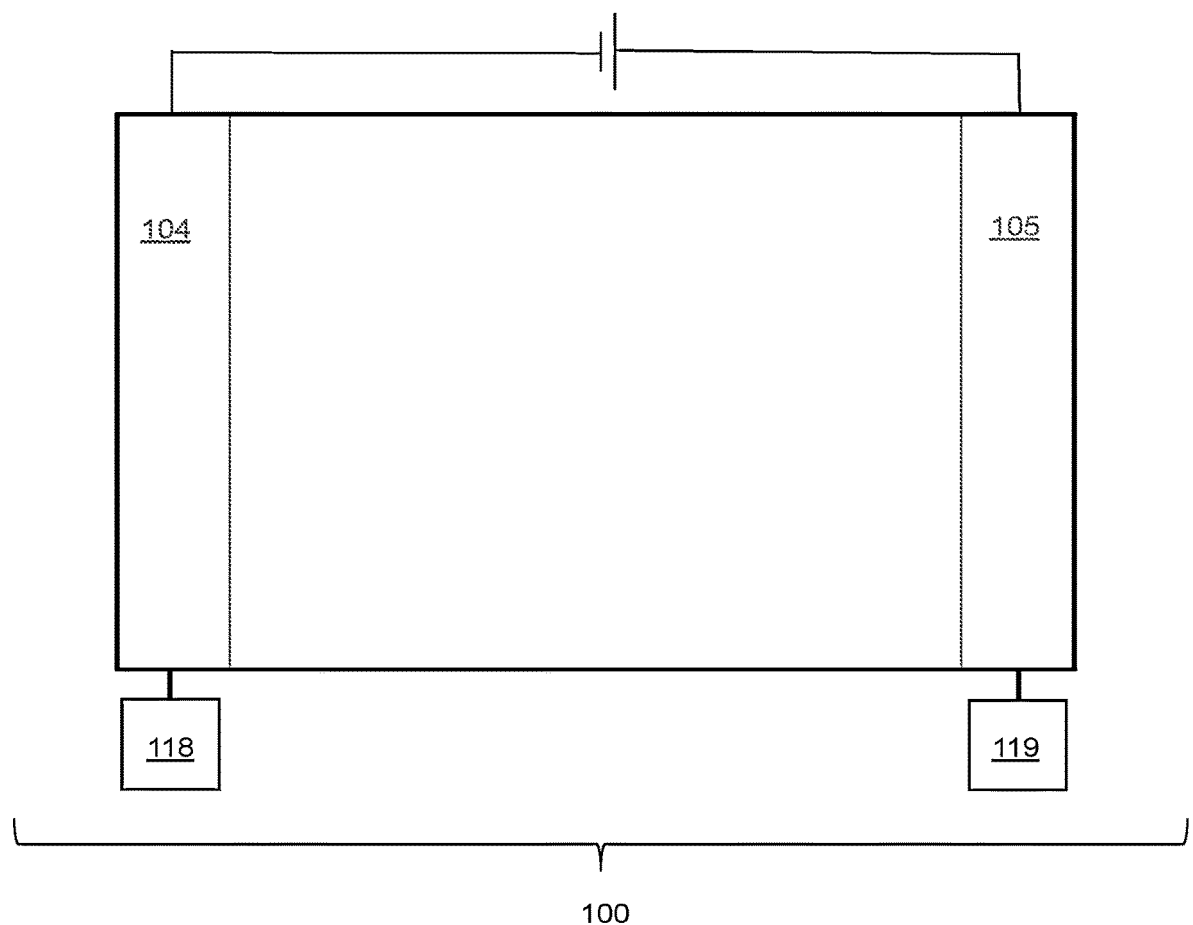
FIG. 1B is, in accordance with certain embodiments, a schematic illustration of a system comprising a first electrode, a second electrode, and two apparatuses.
Figure 1C:
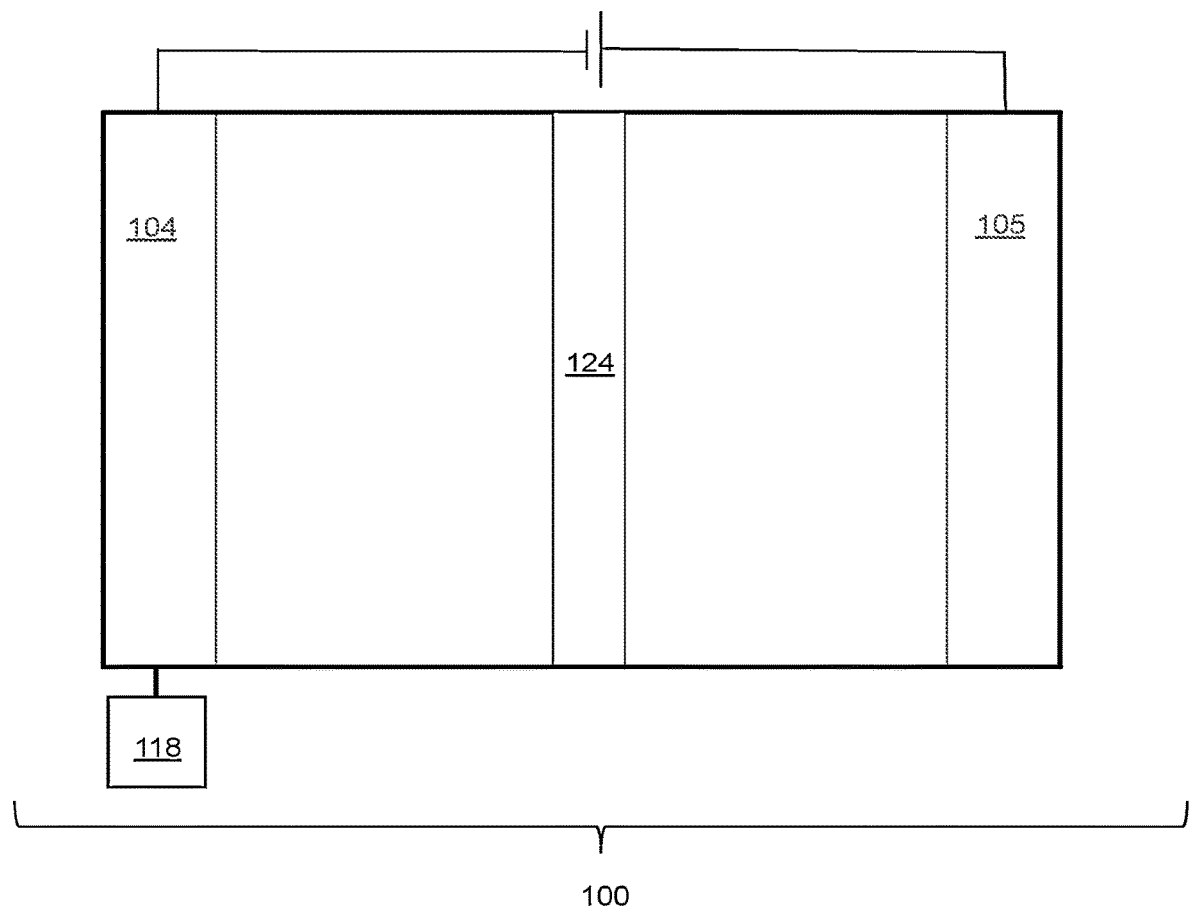
FIG. 1C is, in accordance with certain embodiments, a schematic illustration of a system comprising a first electrode, a second electrode, an apparatus, and a separator.
Figure 1D:
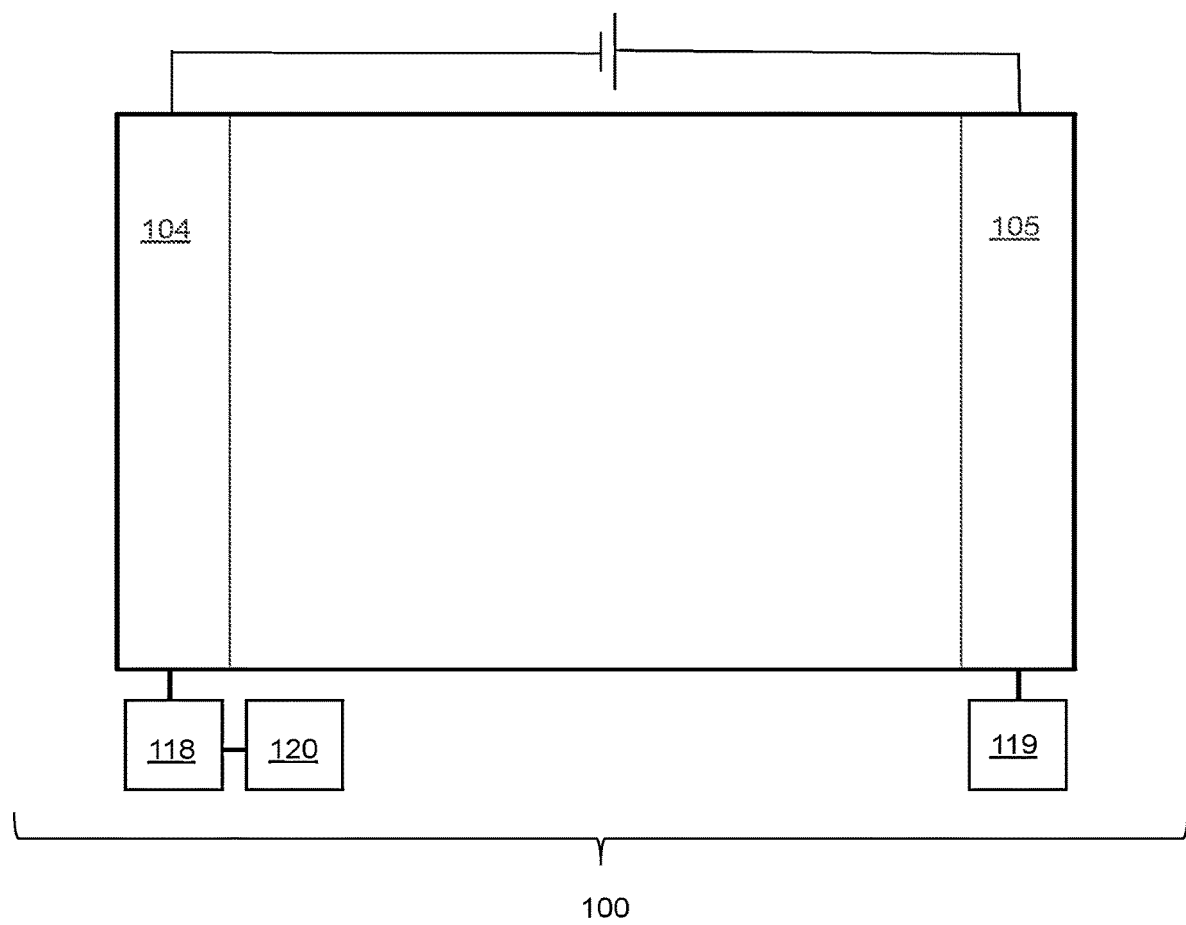
FIG. 1D is, in accordance with certain embodiments, a schematic illustration of a system comprising a first electrode, a second electrode, and three apparatuses.
Figure 1E:
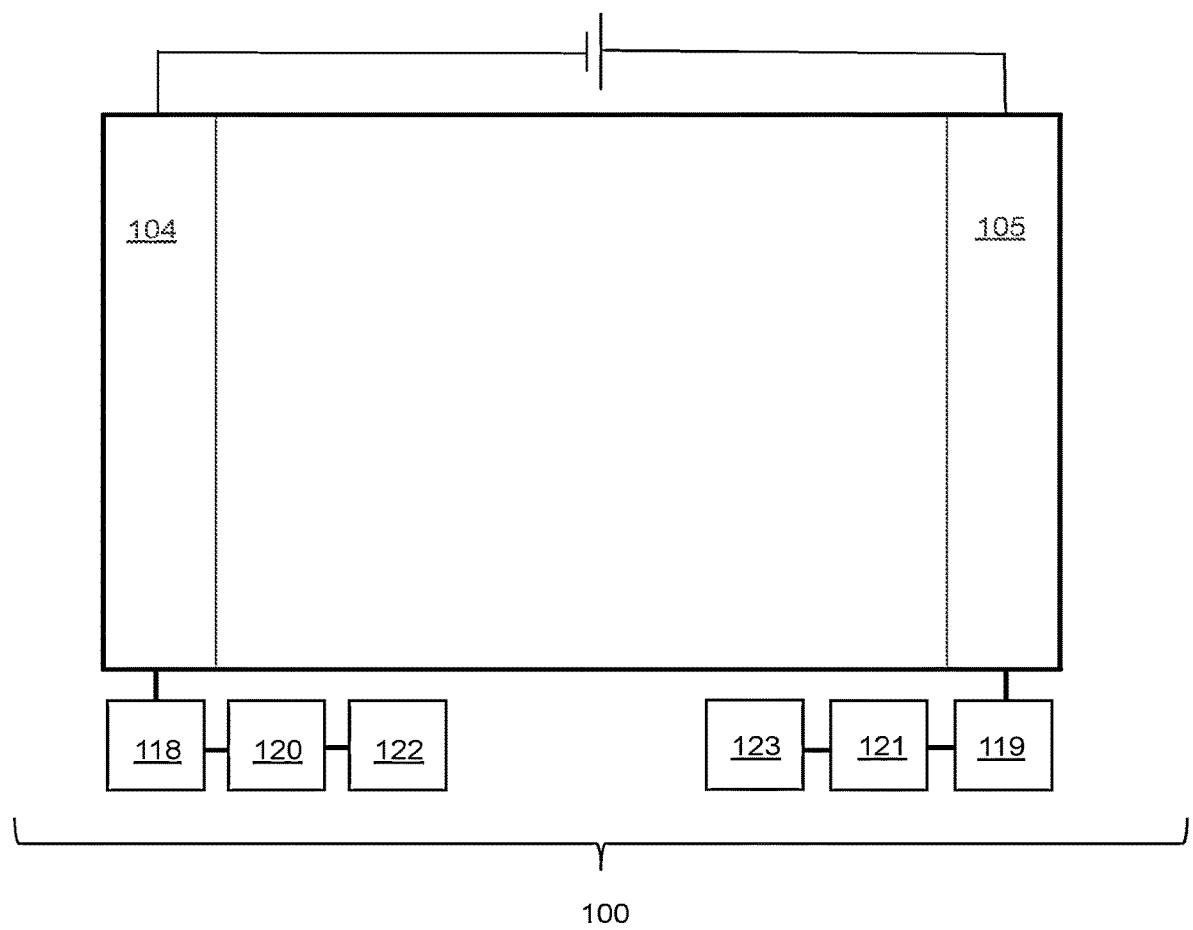
FIG. 1E is, in accordance with certain embodiments, a schematic illustration of a system comprising a first electrode, a second electrode, and six apparatuses.
Figure 1F:
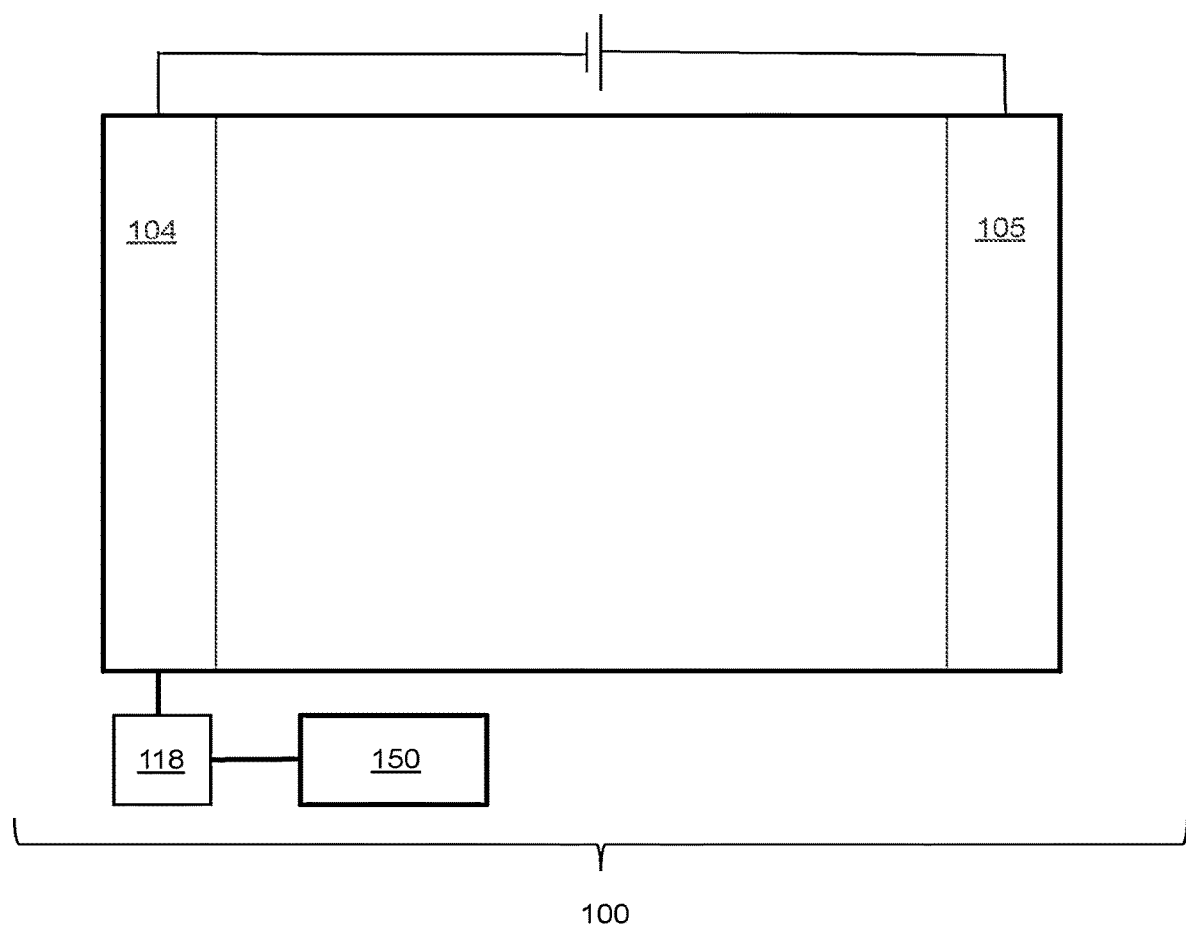
FIG. 1F is, in accordance with certain embodiments, a schematic illustration of a system comprising a first electrode, a second electrode, an apparatus, and a kiln.
Figure 2A:
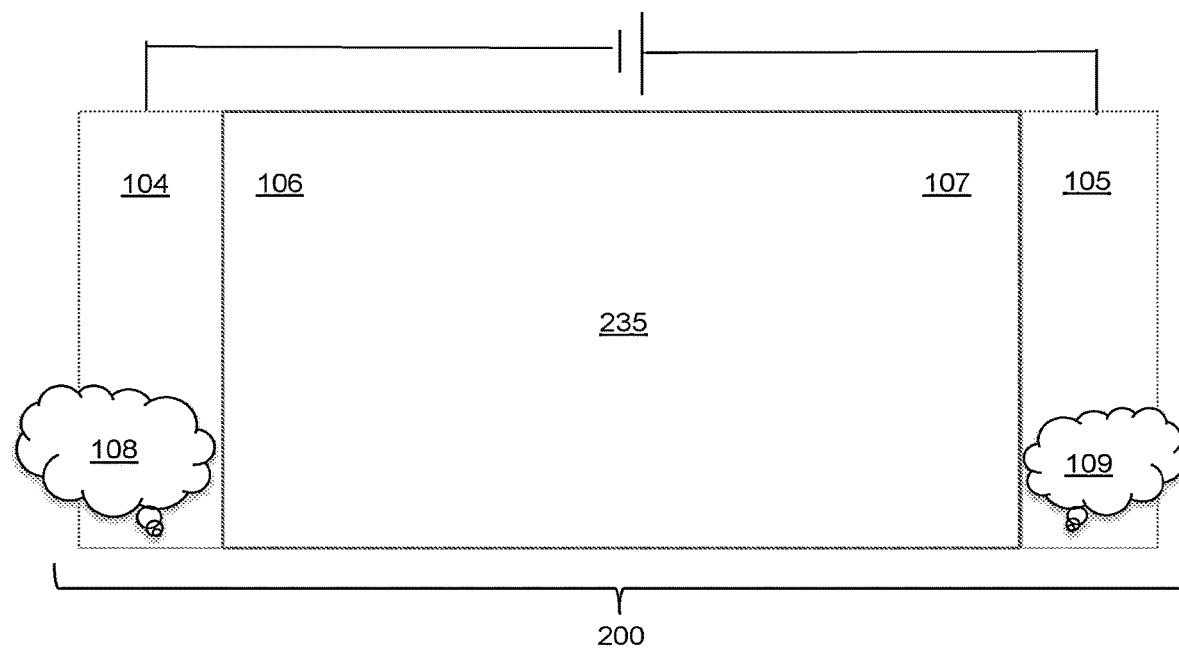
FIG. 2A is, in accordance with certain embodiments, a cross-sectional schematic illustration of a system that comprises a first electrode and a second electrode, and generates hydrogen gas and oxygen gas.
Figure 2B:
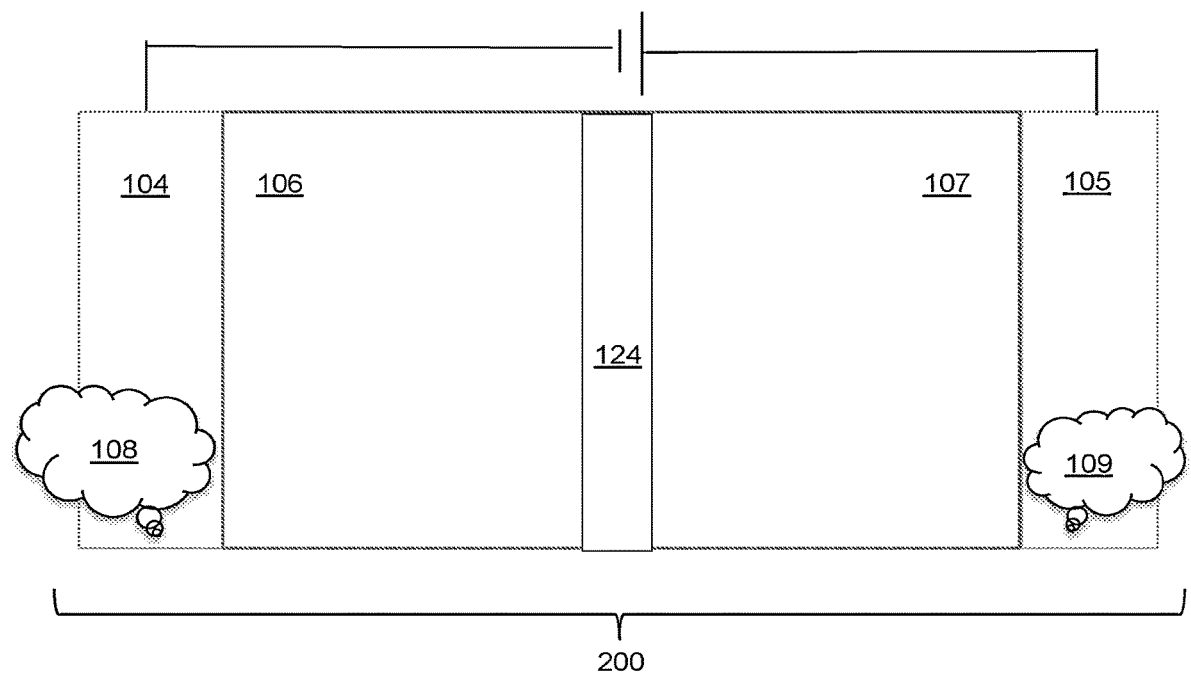
FIG. 2B is, in accordance with certain embodiments, a cross-sectional schematic illustration of a system that comprises a first electrode, a second electrode, and a separator, and generates hydrogen gas and oxygen gas.
Figure 2C:
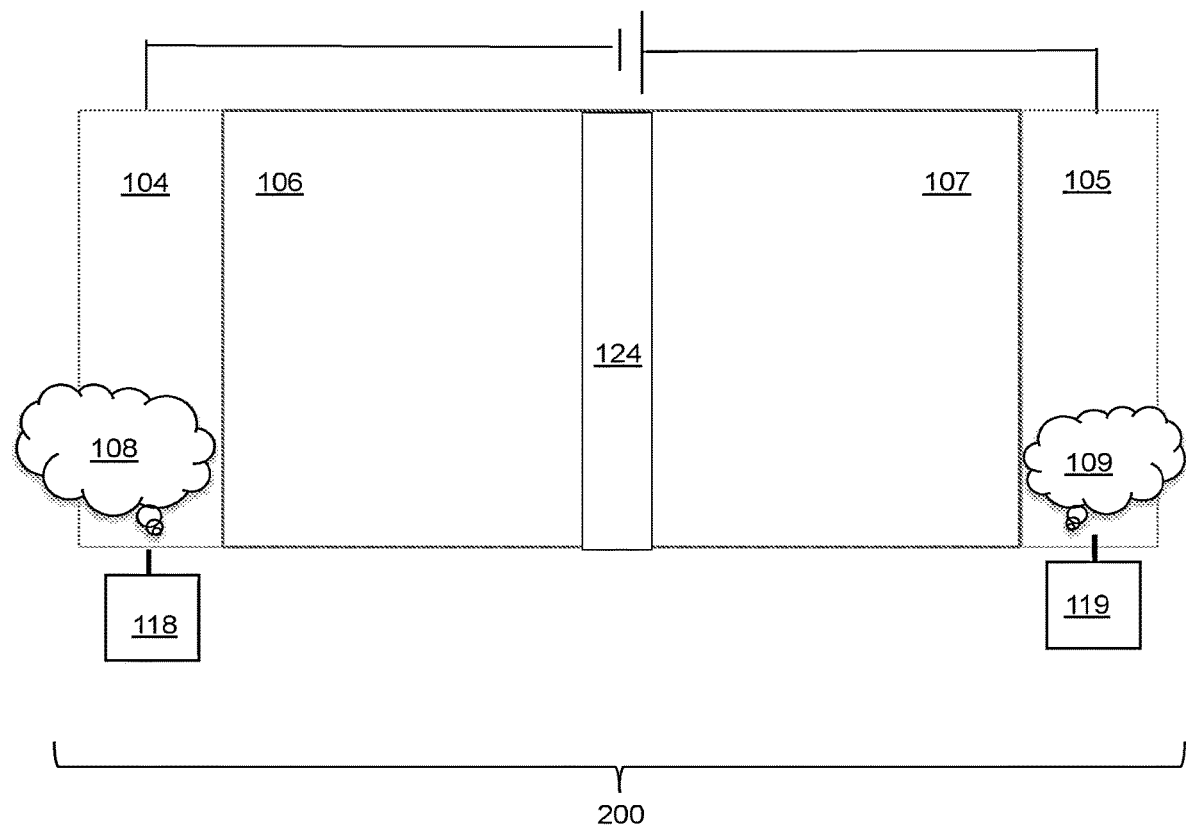
FIG. 2C is, in accordance with certain embodiments, a cross-sectional schematic illustration of a system that comprises a first electrode, a second electrode, a separator, and two apparatuses, and generates hydrogen gas and oxygen gas.
Figure 2D:
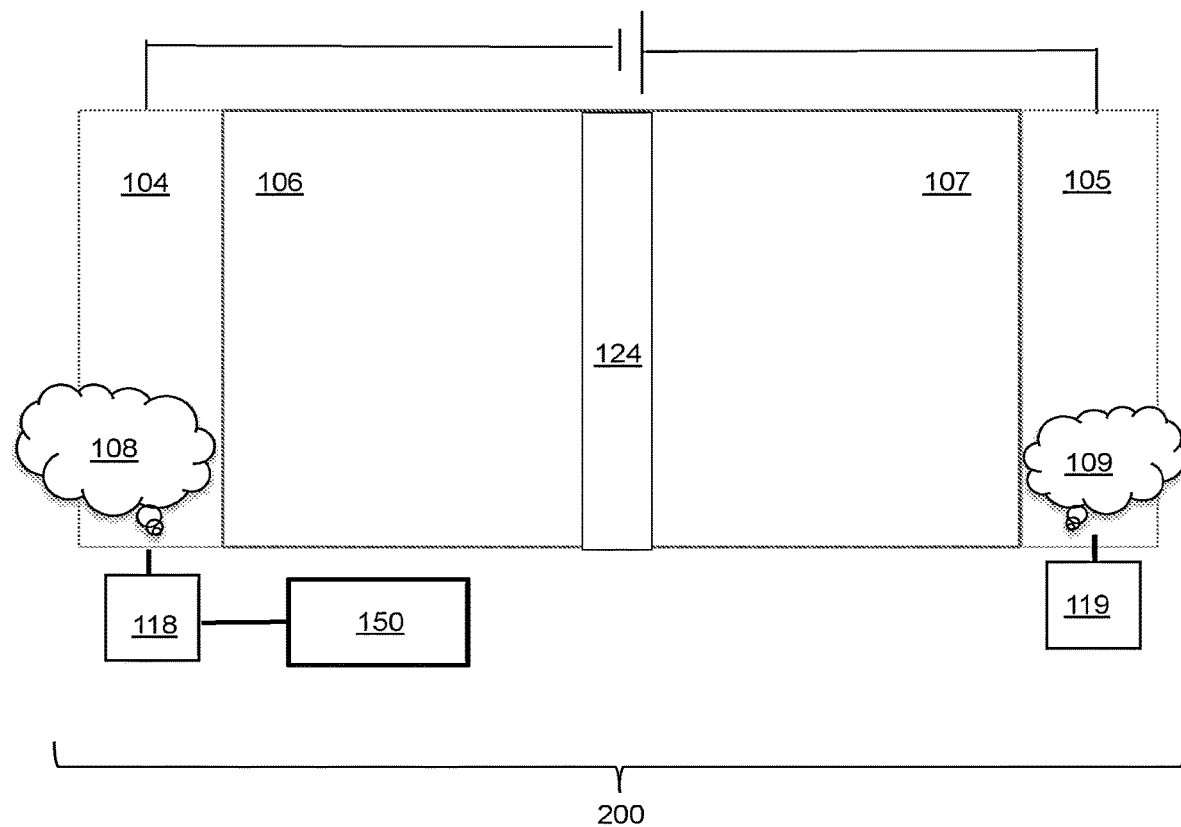
FIG. 2D is, in accordance with certain embodiments, a schematic illustration of a system that comprises a first electrode, a second electrode, a separator, two apparatuses, and a kiln, and generates hydrogen gas and oxygen gas.

As another example, referring to FIG. 1B, in some embodiments, second apparatus 119 is configured to store the acid. Similarly, referring to FIG. 2C, in certain cases, second apparatus 119 is configured to store the acid. Analogously, referring to FIG. 3A, in some instances, second apparatus 119 is configured to store the acid.

In some embodiments where the first apparatus is configured to store the base, the second apparatus is configured to store the acid. For example, referring to FIG. 1B, in some embodiments, the system comprises first apparatus 118 and second apparatus 119, and, in certain cases, first apparatus 118 is configured to store the base, and second apparatus 119 is configured to store the acid. Similarly, referring to FIG. 2C, in some instances, the system comprises first apparatus 118 and second apparatus 119, and, in certain cases, first apparatus 118 is configured to store the base, and second apparatus 119 is configured to store the acid. Analogously, referring to FIG. 3A, in accordance with certain embodiments, the system comprises first apparatus 118 and second apparatus 119, and, in certain cases, first apparatus 118 is configured to store the base, and second apparatus 119 is configured to store the acid. Alternatively, in embodiments where the first apparatus is configured to store the acid, the second apparatus may be configured to store the base.

According to some embodiments, the method comprises reacting the acid and/or base in a chemical dissolution and/or in a precipitation reaction. In certain embodiments, the chemical dissolution is before the precipitation reaction (e.g., the product of the chemical dissolution is used in the precipitation reaction). In some cases, the precipitation reaction is before the chemical dissolution (e.g., the product of the precipitation reaction is used in the chemical dissolution). In certain instances, the chemical dissolution and precipitation reaction are simultaneous and/or unrelated (e.g., the product of one is not used in the other, and vice versa).

In some embodiments, an apparatus (e.g., the first apparatus and/or the second apparatus) is configured to react the acid in a chemical dissolution and/or in a precipitation reaction. For example, referring to FIG. 1B, in some embodiments, second apparatus 119 is configured to react the acid (e.g., in a chemical dissolution and/or in a precipitation reaction). Similarly, referring to FIG. 2C, in certain embodiments, second apparatus 119 is configured to react the acid (e.g., in a chemical dissolution and/or in a precipitation reaction). Analogously, referring to FIG. 3A, in accordance with certain embodiments, second apparatus 119 is configured to react the acid (e.g., in a chemical dissolution and/or in a precipitation reaction).

In certain embodiments, an apparatus (e.g., the first apparatus and/or the second apparatus) is configured to react the base in a chemical dissolution and/or in a precipitation reaction. As another example, referring to FIG. 1A, in certain embodiments, first apparatus 118 is configured to react the base (e.g., in a chemical dissolution and/or in a precipitation reaction). Similarly, referring to FIG. 2C, in some embodiments, first apparatus 118 is configured to react the base (e.g., in a chemical dissolution and/or in a precipitation reaction). Analogously, referring to FIG. 3A, in accordance with some embodiments, first apparatus 118 is configured to react the base (e.g., in a chemical dissolution and/or in a precipitation reaction).

In some embodiments where the first apparatus is configured to react a base (e.g., in a chemical dissolution and/or in a precipitation reaction), the second apparatus is configured to react an acid (e.g., in a chemical dissolution and/or in a precipitation reaction). For example, referring to FIG. 1B, in some embodiments, the system comprises first apparatus 118 and second apparatus 119, and, in certain cases, first apparatus 118 is configured to react a base (e.g., in a chemical dissolution and/or in a precipitation reaction), and second apparatus 119 is configured to react an acid (e.g., in a chemical dissolution and/or in a precipitation reaction). Similarly, referring to FIG. 2C, in certain embodiments, the system comprises first apparatus 118 and second apparatus 119, and, in certain cases, first apparatus 118 is configured to react a base (e.g., in a chemical dissolution and/or in a precipitation reaction), and second apparatus 119 is configured to react an acid (e.g., in a chemical dissolution and/or in a precipitation reaction). Analogously, referring to FIG. 3A, in accordance with certain embodiments, the system comprises first apparatus 118 and second apparatus 119, and, in certain cases, first apparatus 118 is configured to react a base (e.g., in a chemical dissolution and/or in a precipitation reaction), and second apparatus 119 is configured to react an acid (e.g., in a chemical dissolution and/or in a precipitation reaction). Alternatively, in embodiments where the first apparatus is configured to react an acid, the second apparatus may be configured to react a base.

According to certain embodiments, an apparatus (e.g., first apparatus and/or second apparatus) may be configured to (i) collect an acid near the second electrode and/or a base near the first electrode; (ii) store the acid and/or base; and/or (iii) react the acid and/or base (e.g., in a chemical dissolution and/or in a precipitation reaction). For example, referring to FIG. 1A, in some embodiments, first apparatus 118 is configured to (i) collect a base near the first electrode; (ii) store the base; and (iii) react the base (e.g., in a chemical dissolution and/or in a precipitation reaction). Similarly, referring to FIG. 2C, in certain embodiments, first apparatus 118 is configured to (i) collect a base near the first electrode; (ii) store the base; and (iii) react the base (e.g., in a chemical dissolution and/or in a precipitation reaction). Analogously, referring to FIG. 3A, in some cases, first apparatus 118 is configured to (i) collect a base near the first electrode; (ii) store the base; and (iii) react the base (e.g., in a chemical dissolution and/or in a precipitation reaction).

As another example, referring to FIG. 1B, in some embodiments, second apparatus 119 is configured to (i) collect an acid near the second electrode; (ii) store the acid; and (iii) react the acid (e.g., in a chemical dissolution and/or in a precipitation reaction). Similarly, referring to FIG. 2C, in certain embodiments, second apparatus 119 is configured to (i) collect an acid near the second electrode; (ii) store the acid; and (iii) react the acid (e.g., in a chemical dissolution and/or in a precipitation reaction). Analogously, referring to FIG. 3A, second apparatus 119 is configured to (i) collect an acid near the second electrode; (ii) store the acid; and (iii) react the acid (e.g., in a chemical dissolution and/or in a precipitation reaction).

According to some embodiments, each apparatus may have only one function. For example, in certain embodiments, a first apparatus is configured to collect a base near the first electrode, a second apparatus is configured to collect an acid near the second electrode, and a third apparatus is configured to react the base and/or acid (e.g., in a chemical dissolution and/or in a precipitation reaction). For example, in FIG. 1D, in certain embodiments, first apparatus 118 is configured to collect a base near first electrode 104, second apparatus 119 is configured to collect an acid near second electrode 105, and third apparatus 120 is configured to react the base (e.g., in a chemical dissolution and/or in a precipitation reaction). As another non-limiting example, in some embodiments, a first apparatus is configured to collect a base near the first electrode and store the base; a second apparatus is configured to collect an acid near the second electrode, store the acid, and react the acid (e.g., in a chemical dissolution and/or in a precipitation reaction); and a third apparatus is configured to react the base (e.g., in a chemical dissolution and/or in a precipitation reaction). For example, in FIG. 1D, in some embodiments, first apparatus 118 is configured to collect a base near first electrode 104 and store the base; second apparatus 119 is configured to collect an acid near second electrode 105, store the acid, and react the acid (e.g., in a chemical dissolution and/or in a precipitation reaction); and third apparatus 120 is configured to react the base (e.g., in a chemical dissolution and/or in a precipitation reaction).

In yet another example, in some embodiments, a first apparatus is configured to collect a base near the first electrode, a second apparatus is configured to collect an acid near the second electrode, a third apparatus is configured to store the base, a fourth apparatus is configured to store the acid, a fifth apparatus is configured to react the base (e.g., in a chemical dissolution and/or in a precipitation reaction), and a sixth apparatus is configured to react the acid (e.g., in a chemical dissolution and/or in a precipitation reaction). For example, in FIG. 1E, in some instances, first apparatus 118 is configured to collect a base near first electrode 104, second apparatus 119 is configured to collect an acid near second electrode 105, third apparatus 120 is configured to store the base, fourth apparatus 121 is configured to store the acid, fifth apparatus 122 is configured to react the base (e.g., in a chemical dissolution and/or in a precipitation reaction), and sixth apparatus 123 is configured to react the acid (e.g., in a chemical dissolution and/or in a precipitation reaction).

In some embodiments, the acid and/or base described herein is reacted in a chemical dissolution and/or precipitation reaction. In certain cases, the acid and/or base is reacted in a chemical dissolution. In some embodiments, the chemical dissolution comprises the dissolution of a solid to form two solubilized ions. In some embodiments, the solid comprises a metal, metal alloy, metalloid, metal salt, a metal oxide, a metal hydroxide, and/or a silicate. In certain embodiments, the solid is crystalline, amorphous, nanocrystalline, and/or a mixture thereof. In some embodiments, the solid comprises Ag, Al, As, Au, Ba, Ca, Cd, Cl, Co, Cr, Cu, Fe, Hg, K, Mg, Mn, Mo, Na, Ni, P, Pb, S, Sb, Se, Si, Sn, Ti, Tl, V, W and/or Zn (e.g., in elemental form or as a salt).

In some embodiments, the metal and/or metal alloy comprises iron, a ferrous alloy, a stainless steel, a nonferrous metal, a nonferrous alloy, aluminum, brass, bronze, copper, zinc, tin, and/or a coin alloy.

Examples of metal salts, metal oxides, and metal hydroxides include salts, oxides, and hydroxides of calcium, magnesium, barium, strontium, manganese, iron, cobalt, zinc, cadmium, lead, and/or nickel. For example, in some embodiments, the metal salt comprises a metal carbonate. Examples of suitable metal carbonates include calcium carbonate, magnesium carbonate, barium carbonate, strontium carbonate, manganese carbonate, iron carbonate, cobalt carbonate, zinc carbonate, cadmium carbonate, lead carbonate, and/or nickel carbonate.

Examples of suitable metal oxides include calcium oxide, magnesium oxide, strontium oxide, manganese oxide, iron oxide, cobalt oxide, nickel oxide, zinc oxide, cadmium oxide, lead oxide, silicon dioxide, and/or aluminum oxide.

Examples of suitable metal hydroxides include calcium hydroxide, magnesium hydroxide, strontium hydroxide, manganese hydroxide, iron oxide, cobalt hydroxide, nickel hydroxide, zinc hydroxide, cadmium hydroxide, lead hydroxide, silicon hydroxide, and/or aluminum hydroxide.

In some embodiments, the acid is reacted in a chemical dissolution of a metal, metal alloy, metalloid, metal salt, metal oxide, and/or metal hydroxide. In certain embodiments, the base is reacted in a chemical dissolution of a metal oxide (e.g., silicon dioxide and/or aluminum oxide) and/or metal hydroxide (e.g., silicon hydroxide and/or aluminum hydroxide).

In some instances, the acid and/or base is reacted in a precipitation reaction. In certain embodiments, the precipitation reaction comprises the combination of two solubilized ions to form a solid precipitate. In some embodiments, the solid precipitate comprises a metal hydroxide. Examples of suitable metal hydroxides include calcium hydroxide, magnesium hydroxide, barium hydroxide, strontium hydroxide, manganese hydroxide, iron hydroxide, cobalt hydroxide, zinc hydroxide, cadmium hydroxide, lead hydroxide, and/or nickel hydroxide.

In accordance with some embodiments, the base is reacted in a precipitation reaction to form a metal hydroxide. In certain embodiments, the acid is reacted in a precipitation reaction to form a metal hydroxide.

In certain embodiments, the reactor is intermittently run when in the first mode (e.g., as described above). In some cases, the reactor is continuously run in the first mode. In certain instances, the reactor is run intermittently in a first mode, while the reactions with the collected acid and or base (e.g., the chemical dissolution and/or precipitation reaction) are run continuously. For example, in some embodiments, the reactor produces enough acid and/or base when run in the first mode that it only needs to be run intermittently to produce enough acid and/or base to continuously perform the reactions (e.g., the chemical dissolution and/or precipitation reaction).

Figure 4A:
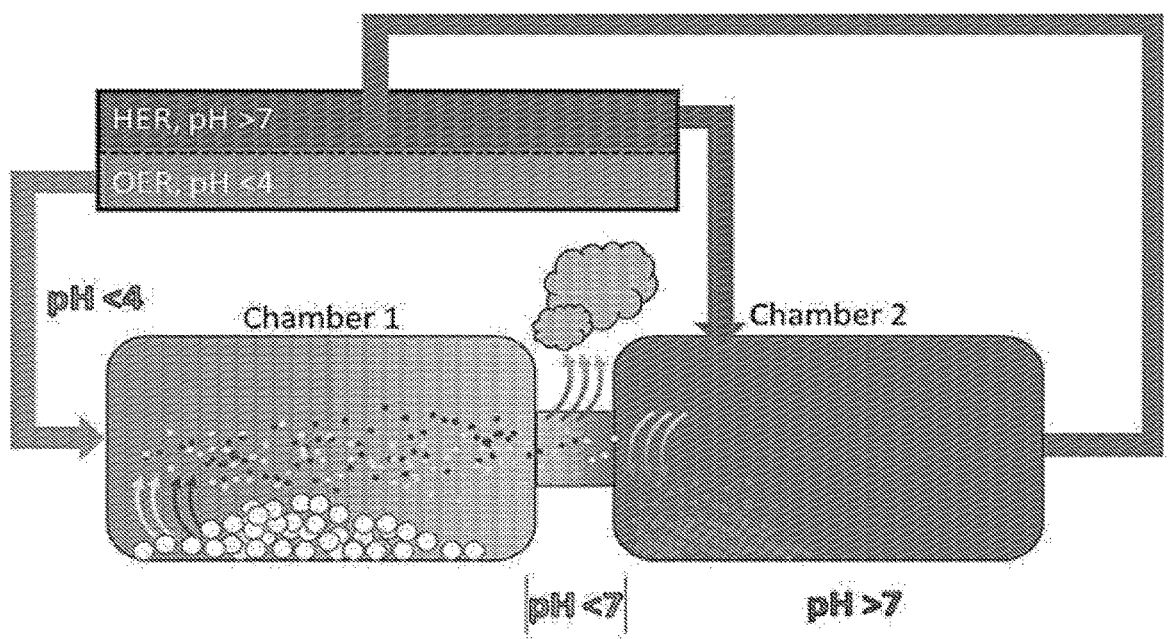
FIG. 4A is, in accordance with certain embodiments, a schematic illustration of a system comprises two chambers.
Figure 4B:
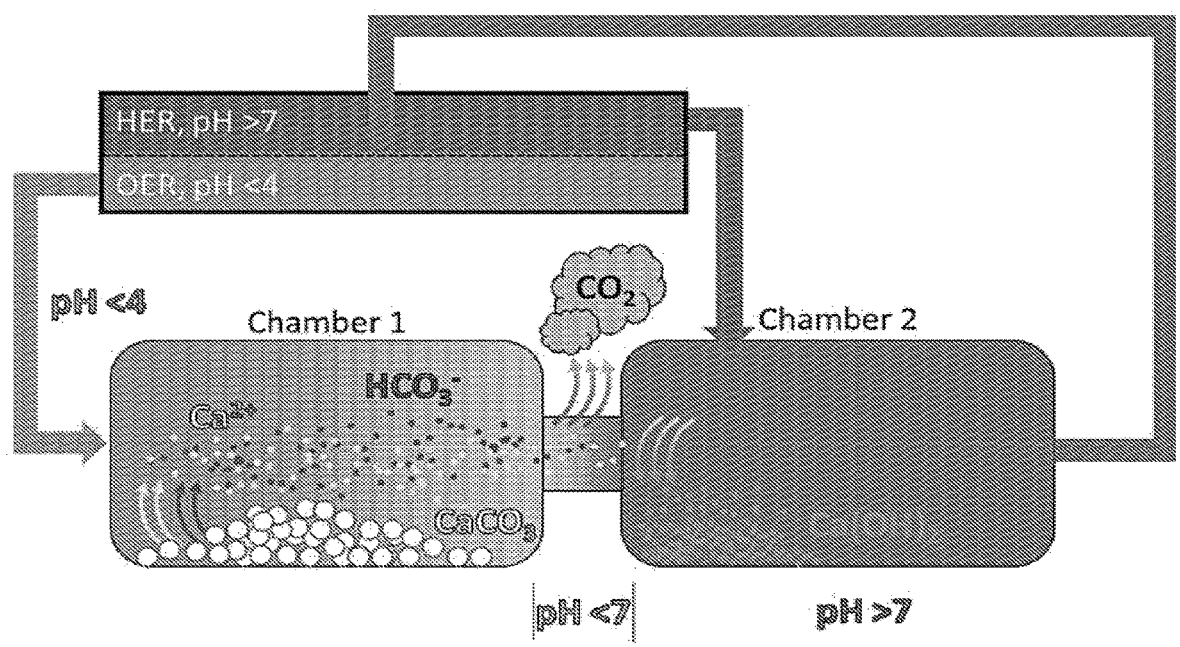
FIG. 4B is, in accordance with certain embodiments, a schematic illustration of a system comprising two chambers where $CaCO_3$ is dissolved in one chamber and $Ca(OH)_2$ is precipitated in the other chamber.

In some embodiments, a desired chemical reaction is conducted by collecting solutions or suspensions of differing compositions produced electrolytically, and using said solution or solutions to produce a product from said reactant in a portion of the reactor or in a separate apparatus. For example, FIGS. 4A-4B shows, in accordance with certain embodiments, a reactor in which an electrolyzer produces solutions of low and high pH that are directed to a separate zone of the reactor or to a separate reactor. In accordance with some embodiments, the acidic solution is used to dissolve $CaCO_3$ in a first chamber, releasing $CO_2$ gas in the process (see FIG. 4B). In a second chamber, in some embodiments, the dissolved solution reacts with the alkaline solution produced by the electrolyzer to produce $Ca(OH)_2$ (see FIG. 4B). In some embodiments, the two chambers are storage tanks for acidic and for alkaline solutions. In certain embodiments, the acid storage tank comprises a polymer material, or a glass lining. In some embodiments, the alkaline storage tank comprises a polymer material, or a metal. In some embodiments, the metal tank comprises iron or steel.

In certain cases, a byproduct of the precipitation reaction is fed back into the system (e.g., first reactor). In some instances, the system is configured to feed a byproduct from the precipitation reaction into the system (e.g., first reactor). In some embodiments, the byproduct has a neutral pH. For example, in certain cases, the byproduct has a pH of greater than 6, greater than or equal to 6.25, greater than or equal to 6.5, greater than or equal to 6.75, or greater than or equal to 6.9. In some instances, the byproduct has a pH of less than 8, less than or equal to 7.75, less than or equal to 7.5, less than or equal to 7.25, or less than or equal to 7.1. Combinations of these ranges are also possible (e.g., greater than 6 and less than 8 or greater than or equal to 6.9 and less than or equal to 7.1). In some embodiments, the byproduct has a pH of 7.

In some instances, the byproduct comprises an alkali halide (e.g., the byproduct in the precipitation of an alkali hydroxide) (e.g., NaCl). In certain cases, the byproduct comprises an alkali salt (e.g., $NaClO_4$, $NaNO_3$, sodium triflate, and/or sodium acetate).

In some embodiments, the method comprises running the reactor in a second mode. In certain cases, the polarity of the reactor is reversed in the second mode compared to the polarity of the reactor in the first mode. According to some embodiments, running the reactor in the first mode uses more electricity than running the reactor in the second mode.

For example, in certain embodiments, running the reactor in the first mode uses at least 10%, at least 20%, at least 30%, or at least 40% more electricity than running the reactor in the second mode. In some cases, running the reactor in the first mode uses less than or equal to 50%, less than or equal to 40%, less than or equal to 30%, or less than or equal to 20% more electricity than running the reactor in the second mode. Combinations of these ranges are also possible (e.g., at elast 10% and less than or equal to 50%) Any embodiment related to the second mode can be applied to any of the systems described herein.

In some embodiments, running the reactor in the second mode comprises adding base to the reactor near the second electrode. For example, in certain embodiments, running the reactor in the second mode comprises adding base to the reactor in such a way that the base can be used in an electrochemical reaction in the second electrode. For example, referring to FIG. 1A, in some embodiments, running the reactor in the second mode comprises adding base near second electrode 105. Similarly, referring to FIG. 2A, in certain embodiments, running the reactor in the second mode comprises adding base near second electrode 105. According to some embodiments, the base added to the reactor was collected from near the first electrode when the reactor was run in the first mode and stored until the reactor was run in the second mode. In certain embodiments, running the reactor in the second mode comprises oxidizing the added base (e.g., the base that had been stored) near the second electrode to produce oxygen gas. For example, in some cases, running the reactor in the second mode comprises oxidation of the added base to oxygen gas by the second electrode.

In certain embodiments, running the reactor in the second mode comprises adding acid to the reactor near the first electrode. For example, in certain embodiments, running the reactor in the second mode comprises adding acid to the reactor in such a way that the acid can be used in an electrochemical reaction in the first electrode. For example, referring to FIG. 1A, in some embodiments, running the reactor in the second mode comprises adding acid near first electrode 104. Similarly, referring to FIG. 2A, in certain embodiments, running the reactor in the second mode comprises adding acid near first electrode 104. According to some embodiments, the acid added to the reactor was collected from near the second electrode when the reactor was run in the first mode and stored until the reactor was run in the second mode. In certain embodiments, running the reactor in the second mode comprises reducing the added acid (e.g., the acid that had been stored) near the first electrode to produce hydrogen gas. For example, in some cases, running the reactor in the second mode comprises reduction of the added acid to hydrogen gas by the first electrode.

In contrast, in some embodiments, running the reactor in the first mode comprises adding a near-neutral input solution to the reactor. In certain cases, the near-neutral input solution has a pH of greater than 6, greater than or equal to 6.25, greater than or equal to 6.5, greater than or equal to 6.75, or greater than or equal to 6.9. In some instances, the near-neutral input solution has a pH of less than 8, less than or equal to 7.75, less than or equal to 7.5, less than or equal to 7.25, or less than or equal to 7.1. Combinations of these ranges are also possible (e.g., greater than 6 and less than 8 or greater than or equal to 6.9 and less than or equal to 7.1). In some embodiments, the near-neutral input solution has a pH of 7. In certain embodiments, the near-neutral input solution comprises a salt. Examples of suitable salts include an alkali sulfate, alkali chlorate, alkali halide, alkali nitrate, alkali perchlorate, alkali acetate, alkali nitrite, and/or alkali triflate.

In some embodiments, it may be advantageous to run the reactor in the second mode rather than the first mode when the cost of electricity is high and/or when electricity is scarce. For example, in certain embodiments, if the electricity is being purchased from a power provider, the cost of electricity and/or availability of electricity from the power provider may fluctuate, and it may be advantageous to run the reactor in the first mode when the cost of electricity is low and/or the availability of electricity is high and then run the reactor in the second mode when the cost of electricity is high and/or the availability of electricity is low. As another example, if the electricity is from a renewable source, such as solar energy or wind energy, in certain embodiments, there may be fluctuations in the availability of electricity, such that it may be advantageous to run the reactor in the first mode when the availability of electricity is high (e.g., during the day and/or during the summer for solar energy or during windy periods for wind energy) and then run the reactor in the second mode when the availability of electricity is low (e.g., during the night and/or during the winter for solar energy or during periods without significant wind). In some cases, the reactor is run in the first mode when the cost of electricity is a first cost and the availability of electricity is a first availability, and the reactor is run in the second mode when the cost of electricity is a second cost and the availability of electricity is a second availability, wherein the second cost is greater than the first cost (e.g., at least 10%, 25%, 50%, or 100% greater) and/or the first availability is greater than the second availability (e.g., at least 10%, 25%, 50%, or 100% greater).

In some embodiments, the acidic and/or basic solutions produced by the electrolysis reactor are at least partially collected and/or stored during periods of high electricity availability and/or low electricity cost, permitting the chemical dissolution reaction in the acid producing $CO_2$ and the chemical precipitation reaction occurring in the base to be conducted during periods of reduced or low electrolyzer operation or electricity availability and/or high electricity cost. In some embodiments, the storage of acidic and basic solutions functions as chemical storage, allowing the output of the chemically reacted product, which may generally be solid, liquid or gaseous, to be less variable, or to be smoothed, compared to the output rate of the electrolyzer. In some embodiments, the stored acidic or basic solutions are of a size or volume permitting the chemically reacted product to be produced at a rate that does not fully deplete the stored acidic or basic solutions during periods of reduced or low electrolyzer operation or electricity availability and/or high electricity cost. In some embodiments, a system comprises a source of variable electricity, said electrolyzer, and said chemical storage tanks and chemical reactor. In some embodiments, a method comprises operating such a system so as to produce a less variable, or constant or relatively constant, flow of a chemical reaction product from a more variable or intermittent electricity source.

In certain embodiments, the method comprises producing acid and base in a low-voltage mode (e.g., at a lower voltage than a high-voltage mode described herein). Any embodiment related to the low voltage mode may be used with any system disclosed herein. In some embodiments, the method does not produce oxygen gas and/or hydrogen gas. For example, in certain embodiments, the electrolytic reactions occurring in the low-voltage mode may be the oxidation of hydrogen at the second electrode ($H_2 \rightarrow 2H^+ + 2e^-$) and the reduction of water at the first electrode ($2H_2O+2e^-\rightarrow H_2+2OH^-$), such that oxygen gas is not produced. In another example, in certain embodiments, the electrolytic reactions occurring in the low-voltage mode may be the oxidation of water at the first electrode ($2H_2O\rightarrow O_2+4H^++4e^-$) and the reduction of oxygen at the second electrode ($O_2+2H_2O+4e^-\rightarrow 4OH^-$), such that hydrogen gas is not produced.

For illustration, some exemplary systems are described below.

System 1: Exemplary Systems for Producing Low-Cost $H_2$ at a Constant Rate Using Intermittent Renewable Energy In accordance with some embodiments, the system may comprise a reactor comprising a region comprising a spatially varying chemical composition gradient (e.g., a spatially varying pH gradient). In some embodiments, the reactor may comprise a first electrode and a second electrode, one or more inlets supplying liquids and/or a gas that undergoes an electrolytic reaction or reactions, and a portion of the reactor or a separate apparatus in which the solutions are stored after undergoing electrolytic reactions.

Figures 5A, 5B:
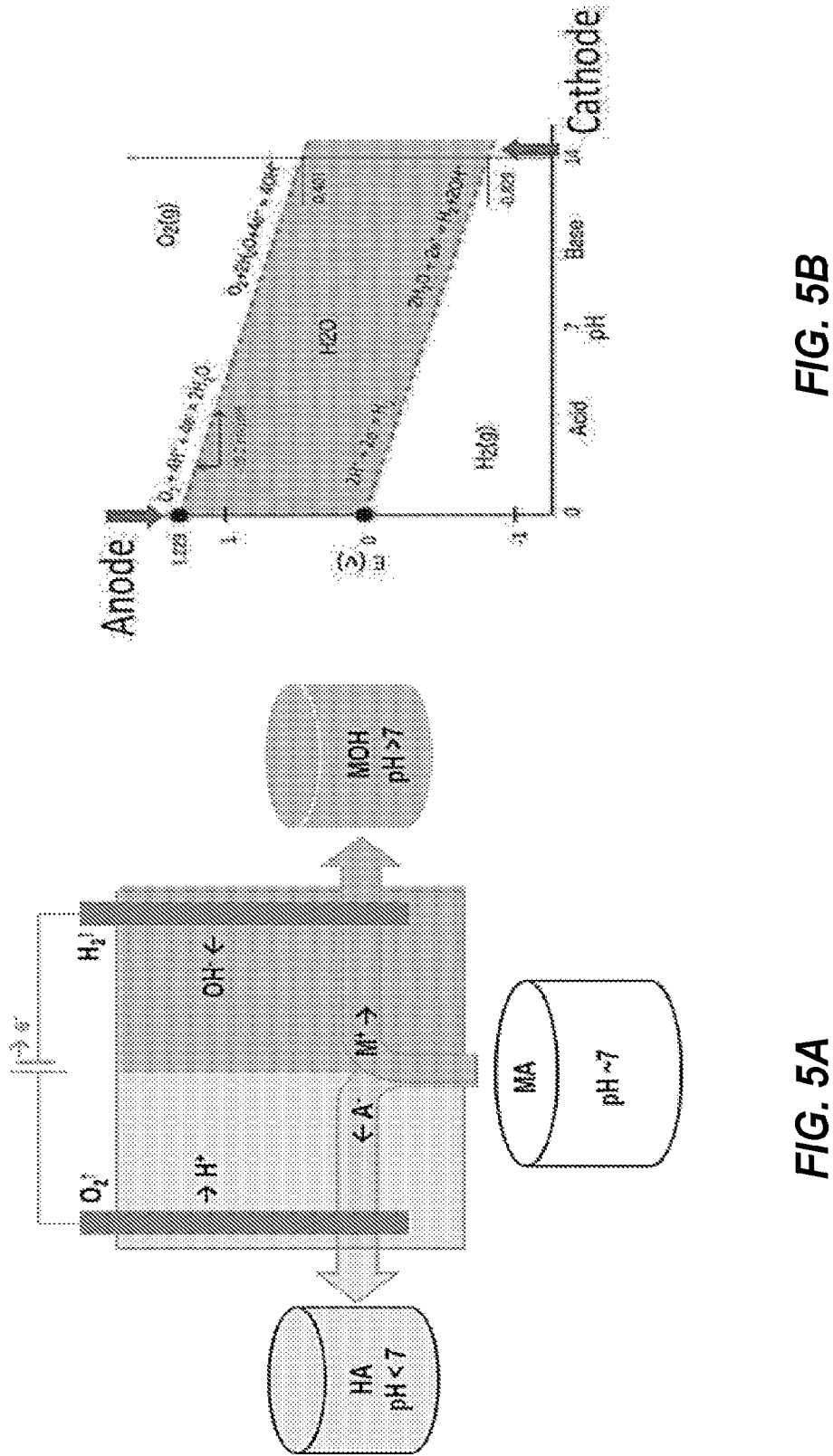
FIG. 5A is, in accordance with certain embodiments, a schematic illustration of operation of a reactor in high-voltage mode.
FIG. 5B is a Pourbaix diagram illustrating high-voltage mode.

In certain embodiments, the method comprises running a reactor in a first mode (e.g., a high-voltage mode, as shown in FIGS. 5A-5B); wherein the first mode comprises: producing base near a first electrode; producing acid near a second electrode that is electrochemically coupled to the first electrode in the reactor; collecting the acid and/or base; and reacting the collected acid and/or base in a chemical dissolution and/or in a precipitation reaction.

In certain embodiments, the electrolytic reactions may produce $H_2$, $O_2$, an acidic solution, and a basic solution. This is an example of a high-voltage mode, which requires a higher voltage than a low-voltage mode. A non-limiting example of an electrolytic reaction occurring in the high-voltage mode is the oxidation of water at the second electrode ($2H_2O\rightarrow O_2+4H^++4e^-$) and the reduction of water at the first electrode ($2H_2O+2e^-\rightarrow H_2+2OH^-$); this reaction requires a minimum voltage of 2 V when the pH at the second electrode is 0 and the pH at the first electrode is 14 (see FIGS. 5A-5B). In certain embodiments, the acidic and basic solutions produced at the electrodes may be collected and stored separately.

In certain embodiments, the method comprises running the reactor in a second mode (e.g., a low-voltage mode, as shown in FIGS. 6A-6B). In some embodiments, the polarity of the reactor is reversed in the second mode compared to the polarity of the reactor in the first mode. In some embodiments, the second mode comprises adding the collected and/or stored base to the reactor near the second electrode. In certain embodiments, the second mode comprises oxidizing the added base near the second electrode to produce oxygen gas. In some embodiments, the second mode comprises adding the collected and/or stored acid to the reactor near the first electrode. In certain embodiments, the second mode comprises reducing the added acid near the first electrode to produce hydrogen gas.

In certain embodiments, the electrolytic reactions may neutralize an acidic and a basic solution while producing $H_2$ and $O_2$. This is an example of a low-voltage mode, which requires a lower voltage than the aforementioned high-voltage mode. A non-limiting example of an electrolytic reaction occurring in the low-voltage mode is the oxidation of hydroxide ions at the second electrode (e.g., anode) ($4OH^-\rightarrow O_2+2H_2O+4e^-$) and the reduction of protons at the first electrode (e.g., cathode) ($2H^++2e^-\rightarrow H_2$); this reaction requires a minimum voltage of 0.4 V when the pH at the second electrode is 14 and the pH at the first electrode is 0 (see FIGS. 6A-6B). In certain embodiments, the inlets of the reactor may supply a solution of pH greater than 8 to the second electrode and a solution of pH less than 6 to the first electrode.

In certain embodiments, different reactors may be operated in high-voltage and low-voltage modes. In another embodiment, a single reactor may be configured such that it can be operated in the high-voltage mode or in the low-voltage mode. In some embodiments, the reactor may be switched from the high-voltage mode to the low-voltage mode by changing the pH of the liquid that flows to the electrode. For example, to switch to low-voltage mode from high-voltage mode an alkaline solution could be introduced to the second electrode, while an acidic solution could be introduced to the first electrode.

In some embodiments, the decision to switch between a high-voltage mode (e.g., producing $H_2/O_2$ while creating acid/base) and the low voltage mode (e.g., producing $H_2/O_2$ while neutralizing acid/base) may be based on the cost or availability of electricity, which may fluctuate throughout a day, month or year. In certain embodiments, when the cost of electricity is below a certain value, a reactor may be run in high-voltage mode (e.g., consuming more power while producing $H_2$, $O_2$, acid and base); when the cost of electricity is above a certain value, the reactor may be run in low-voltage mode (e.g., consuming less power, while using the acidic and basic solutions to produce $H_2$ and $O_2$). In some embodiments, the system may effectively arbitrage the electricity cost of producing $H_2$: when electricity is inexpensive the system uses more of it by operating in high-voltage mode, in which some of the inexpensive electrical energy is converted into chemical energy that may be physically stored (e.g., in the form of acidic and basic solutions); when electricity is expensive the system may use less of it by operating in low-voltage mode, in which the stored chemical energy (e.g., the acidic and basic solutions) may be used to lower the energy requirement for producing $H_2$ and $O_2$. In some embodiments, the system may serve to decrease the electricity cost of producing $H_2$ and $O_2$. In some embodiments, the system may serve to produce hydrogen and oxygen at a constant rate using electricity that fluctuates in price or availability.

Figure 7:
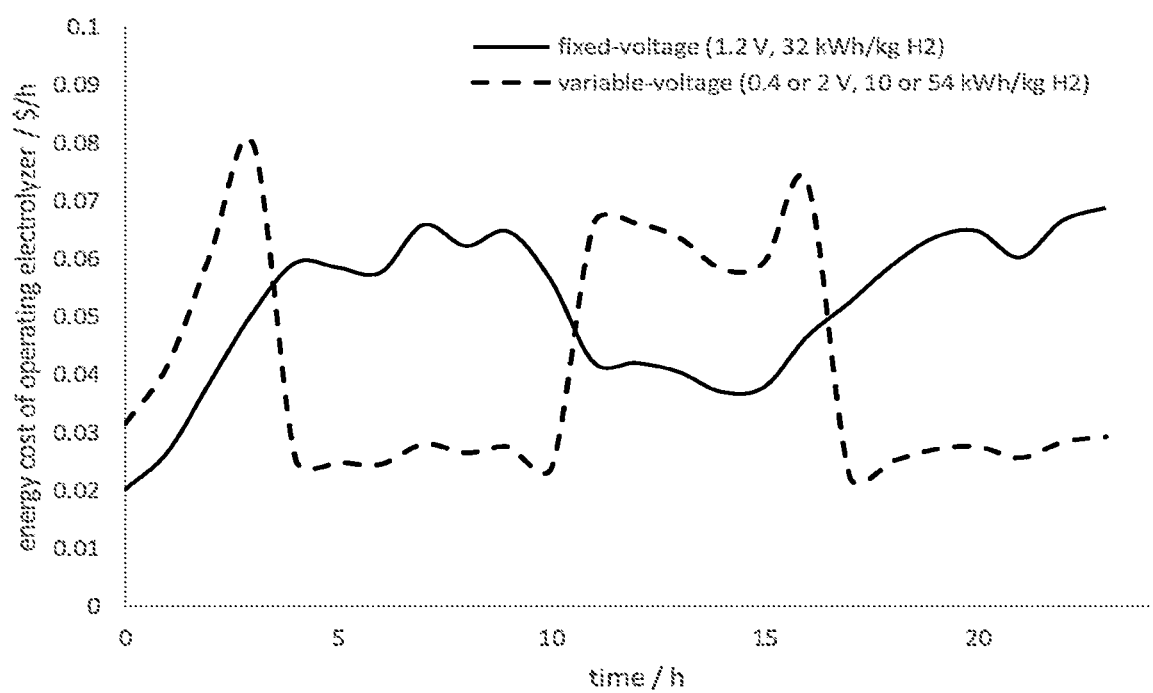
FIG. 7 is a plot of electricity cost versus time for a 1 kW alkaline electrolyzer operating at 1.2 V (solid line) and for an electrolyzer (dotted line) consuming the same amount of current operating at 2 V when the cost of electricity is >0.05 \$/kWh and at 0.4 V when the cost of electricity is <0.05 \$/kWh.

FIG. 7 illustrates a non-limiting example in which a system reduces the energy cost of producing $H_2$ using intermittent renewable electricity by 20%. In this example, the cost of renewable energy fluctuates between 0.02 $/kWh and 0.07 $/kWh (according to the energy-production rate of a typical wind turbine on a typical day). Electricity cost vs. time for a 1 kW alkaline or PEM electrolyzer, operating at fixed voltage (1.2 V, 32 kWh/kg $H_2$) is shown in FIG. 7. FIG. 7 also shows the energy cost of a variable-voltage electrolyzer that operates in high-voltage mode (2 V, 54 kWh/kg $H_2$) when the cost of electricity is below average (0.05 $/kWh) and in low-voltage mode (0.4 V, 10 kWh/kg $H_2$) when the cost of electricity is above average, in accordance with some embodiments. In this example, both electrolyzers produce $H_2$ at the same rate and use the same amount of energy on average (32 kWh/kg $H_2$), however, the energy costs of running the two cells are different. In this example, the variable-voltage electrolyzer uses less of the expensive electricity (by operating in low-voltage mode) and more of the inexpensive electricity (by operating in high-voltage mode). In this example, the average energy cost for the fixed-voltage electrolyzer is 0.05 $/kWh, and the average energy cost for the variable-voltage electrolyzer is 0.04 $/kWh (20% less). Note that, in accordance with some embodiments, the amount of cost savings possible with the variable-voltage electrolyzer is proportional to the magnitude of the cost fluctuations: the larger the variation in the electricity cost, the larger the cost savings.

System 2: Exemplary Systems for Co-Producing Low-Cost Hydrogen and Acidic/Basic Solutions Using Intermittent Renewable Electricity In accordance with some embodiments, the system may comprise a reactor comprising a region comprising a spatially varying chemical composition gradient (e.g., a spatially varying pH gradient). In some embodiments, the reactor may comprise a first electrode and a second electrode, one or more inlets supplying a liquid and/or a gas that undergoes electrolytic reaction or reactions, and a portion of the reactor or a separate apparatus in which the solutions are stored after undergoing electrolytic reactions. In some embodiments, the electrolytic reactions may produce a pH less than about six in the vicinity of the second electrode and a pH greater than about eight in the vicinity of the first electrode; the solutions of high and low pH may be collected and stored separately. In some embodiments, the electrodes may be configured to perform one or more of the electrolytic reactions to produce high or low pH solutions.

In certain embodiments, the electrolytic reactions may produce $H_2$, $O_2$, an acidic solution, and a basic solution. This is an example of a high-voltage mode, which requires a higher voltage than a low-voltage mode. A non-limiting example of an electrolytic reaction occurring in the high-voltage mode is the oxidation of water at the second electrode (e.g., anode) ($2H_2O \rightarrow O_2 + 4H^+ + 4e^-$) and the reduction of water at the first electrode (e.g., cathode) ($2H_2O + 2e^- \rightarrow H_2 + 2OH^-$); this reaction requires a minimum voltage of 2 V when the pH at the second electrode is 0 and the pH at the first electrode is 14 (see FIGS. 5A-5B). In certain embodiments, the acidic and basic solutions produced at the electrodes may be collected and stored separately.

In certain embodiments, the reactor at times may produce acidic and basic solutions in a low-voltage mode that requires a lesser voltage than the high-voltage mode. Non-limiting examples of electrolytic reactions producing acidic and basic solutions in the low-voltage mode include the following.

In certain embodiments, the electrolytic reactions occurring in the low-voltage mode may be the oxidation of hydrogen at the second electrode (e.g., anode) ($H_2 \rightarrow 2H^+ + 2e^-$) and the reduction of water at the first electrode (e.g., cathode) ($2H_2O + 2e^- \rightarrow H_2 + 2OH^-$) (e.g., HRR/HER reactions); this reaction requires a minimum voltage of 0.8 V when the pH at the second electrode is 0 and the pH at the first electrode is 14 (see FIGS. 8A-8B).

Figure 9B:
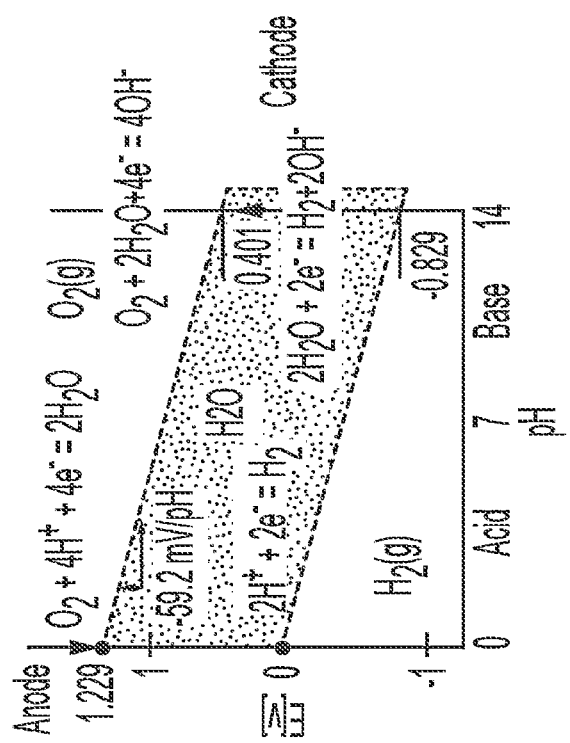
FIG. 9B is a Pourbaix diagram illustrating low-voltage mode B.
Figure 9A:
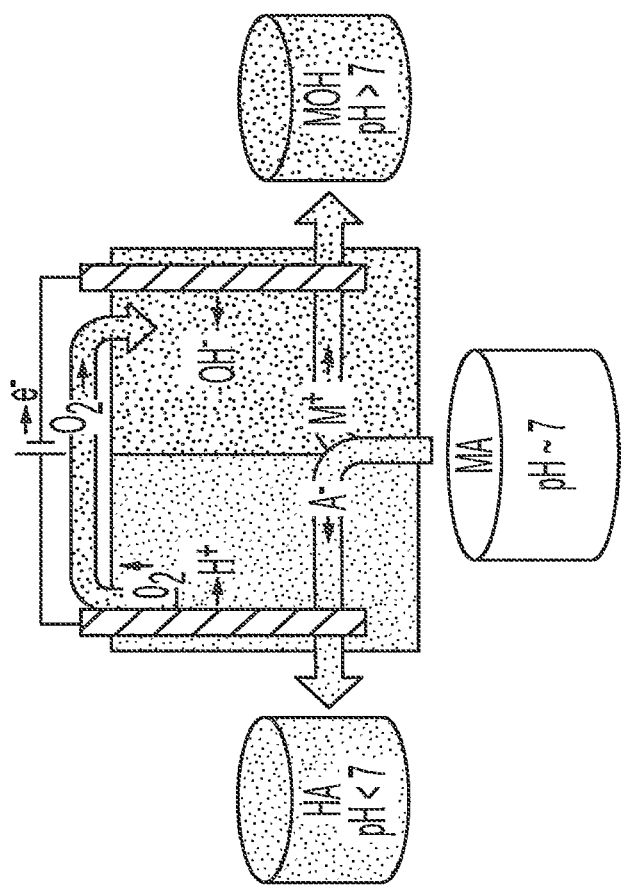
FIG. 9A is, in accordance with certain embodiments, a schematic illustration of operation of a reactor in low-voltage mode B.

In certain embodiments, the electrolytic reactions occurring in the low-voltage mode may be the oxidation of water at the second electrode (e.g., anode) ($2H_2O \rightarrow O_2 + 4H^+ + 4e^-$) and the reduction of oxygen at the first electrode (e.g., cathode) ($O_2 + 2H_2O + 4e^- \rightarrow 4OH^-$) (e.g., OER/ORR reactions); this reaction requires a minimum voltage of 0.8 V when the pH at the second electrode is 0 and the pH at the first electrode is 14 (see FIGS. 9A-9B).

In some embodiments, the decision to switch between the high-voltage mode (e.g., creating acid/base with the co-generation of $H_2/O_2$) or a low voltage mode (e.g., creating acid/base without producing a net amount of gas) may be based on the cost or availability of electricity, which may fluctuate throughout a day, month or year. In certain embodiments, when the cost of electricity is below a certain value, a reactor may be run in the high-voltage mode (e.g., consuming more power while producing $H_2$, $O_2$, acid and base). In certain embodiments, when the cost of electricity is above a certain value the reactor may be run in the low-voltage mode (e.g., consuming less power, producing acid and base only).

In some embodiments, the system may take advantage of low electricity prices by co-producing $H_2$ and $O_2$ along with the acidic and basic solutions: when electricity is inexpensive the system may use more of it by operating in high-voltage mode, which produces acid, base, $H_2$ and $O_2$; when electricity is expensive the system may use less of it by operating in the low-voltage modes, which produce acid and base, but do not produce a net amount of $H_2$ or $O_2$. In some embodiments, the system serves to decrease the electricity cost of producing $H_2$ and $O_2$.

System 3: Exemplary Systems for Producing Low-Cost Acid/Base at a Constant Rate Using Intermittent Renewable Energy In accordance with some embodiments, the system may comprise a reactor comprising a region comprising a spatially varying chemical composition gradient (e.g., a spatially varying pH gradient). In some embodiments, the reactor may comprise a first electrode and a second electrode, one or more inlets supplying a liquid and/or a gas that undergoes electrolytic reaction or reactions, and a portion of the reactor or a separate apparatus in which the solutions are stored after undergoing electrolytic reactions. In some embodiments, the electrolytic reactions may produce a pH less than about six in the vicinity of the second electrode and a pH greater than about eight in the vicinity of the first electrode; the solutions of high and low pH may be collected and stored separately. In some embodiments, the electrodes may be configured to perform one or more of the electrolytic reactions to produce high or low pH solutions.

In certain embodiments, the electrolytic reactions may produce $H_2$, $O_2$, an acidic solution, and a basic solution. This is an example of an electrolytic mode, as it requires a higher voltage than the fuel cell mode which will be described later. A non-limiting example of an electrolytic reaction occurring in the electrolytic mode is the oxidation of water at the second electrode (e.g., anode) ($2H_2O \rightarrow O_2 + 4H^+ + 4e^-$) and the reduction of water at the first electrode (e.g., cathode) ($2H_2O + 2e^- \rightarrow H_2 + 2OH^-$); this reaction requires a minimum voltage of 2 V when the pH at the second electrode is 0 and the pH at the first electrode is 14 (see FIGS. 5A-5B). In certain embodiments, the acidic and basic solutions produced at the electrodes may be collected and stored separately.

Figure 10B:
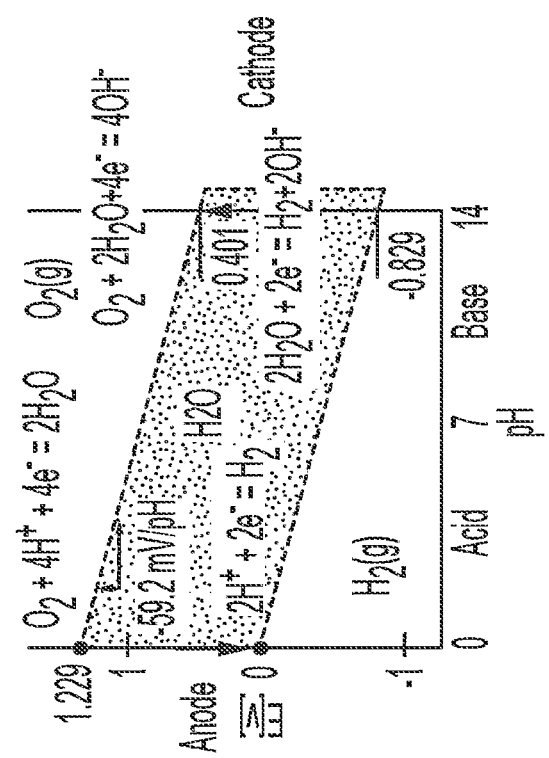
FIG. 10B is a Pourbaix diagram illustrating fuel cell mode.
Figure 10A:
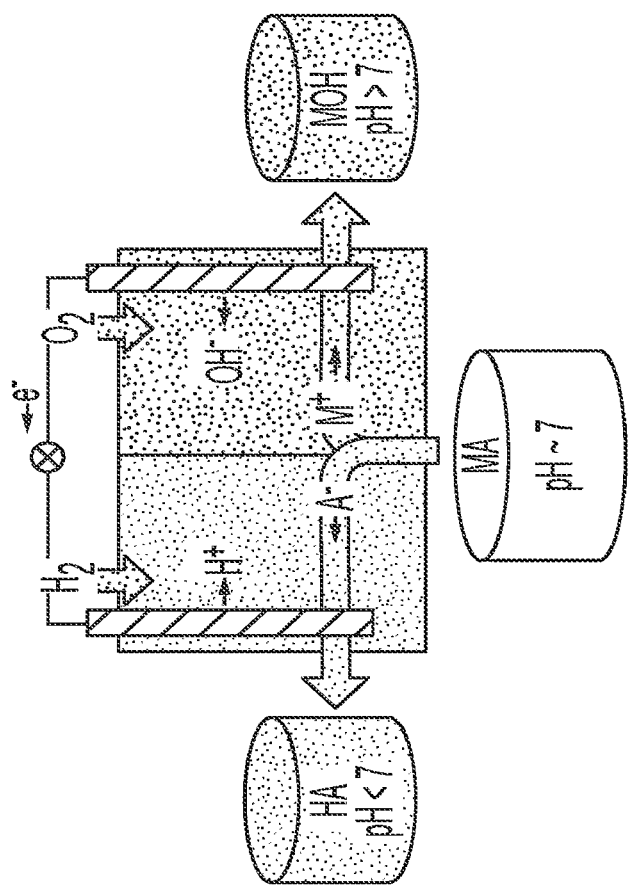
FIG. 10A is, in accordance with certain embodiments, a schematic illustration of operation of a reactor in fuel cell mode.

In certain embodiments, the reactions occurring in the fuel cell mode may be the oxidation of hydrogen at the second electrode (e.g., anode) ($H_2 \rightarrow 2H^+ + 2e^-$) and the reduction of oxygen at the first electrode (e.g., cathode) ($O_2 + 2H_2O + 4e^- \rightarrow 4OH^-$) (e.g., HRR/ORR reactions); this results in a spontaneous reaction that produces energy (see FIGS. 10A-10B).

In some embodiments, the system may effectively arbitrage the electricity cost of producing acidic and basic solutions: when electricity is inexpensive the system uses more of it by operating in electrolytic mode, in which some of the inexpensive electrical energy is converted into chemical energy that may be physically stored (in the form of $H_2$ and $O_2$ gases); when electricity is expensive the system may use less of it by operating in fuel cell mode, in which the stored chemical energy ($H_2$ and $O_2$ gases) may be used for creating acid, base and electricity. In some embodiments, the system serves to decrease the electricity cost of producing solutions of acid and base. In some embodiments, this system serves to produce acidic and basic solutions at a constant rate using electricity that fluctuates in price or availability.

In some embodiments, the chemical dissolution and/or precipitation reaction occur inside of the reactor.

According to certain embodiments, the reactor comprises a spatially varying chemical composition gradient between the first electrode and the second electrode. In some embodiments, the spatially varying chemical composition gradient comprises a spatially varying pH gradient. For example, referring to FIG. 2B, in some cases, system 200 comprises alkaline region 106 near first electrode 104 and acidic region 107 near second electrode 105; thus, system 200 comprises a spatially varying chemical composition gradient (e.g., spatially varying pH gradient) between the first electrode and the second electrode. In some embodiments, a first region comprises the acidic region. In certain embodiments, a second region comprises the alkaline region. In other embodiments, the first region comprises an alkaline region and the second region comprises an acidic region.

In some embodiments, the reactor is configured such that the spatially varying chemical composition gradient (e.g., the spatially varying pH gradient) is established and/or maintained, at least in part, by electrolysis. For example, referring to FIG. 2B, in certain instances, system 200 comprises a spatially varying chemical composition gradient (e.g., a spatially varying pH gradient) comprising alkaline region 106 and acidic region 107. In some such embodiments, this spatially varying chemical composition gradient (e.g., spatially varying pH gradient) is established and/or maintained by electrolysis. Electrolysis of a neutral electrolyte can produce, in accordance with some embodiments, a spatially varying chemical composition gradient (e.g., spatially varying pH gradient) between electrodes, such as first electrode 104 and second electrode 105. In some embodiments, an electrolysis reaction is used to produce a chemical composition gradient between the positive and negative electrodes of an electrochemical cell.

In accordance with certain embodiments, the electrolytically produced chemical composition gradient can be employed to conduct a desired chemical reaction by feeding a reactant to the chemical environment near one electrode, and using the electrolytically produced chemical composition gradient to produce a product from said reactant as the reactant or its components diffuse towards the other electrode.

In some embodiments, the electrolysis comprises hydrolysis. As used herein, hydrolysis refers to the electrolysis of water. For example, in some embodiments, the reaction taking place in the cathode converts $2H_2O$ molecules and 2 electrons to $H_2$ and $2OH^-$, while the reaction taking place in the anode converts $2H_2O$ molecules to 4 electrons, $O_2$, and 4 protons. In some embodiments, the generation of hydroxide ions near first electrode 104 establishes and/or maintains an alkaline pH near first electrode 104, establishing and/or maintaining alkaline region 106, while the generation of protons near second electrode 105 establishes an acidic pH near second electrode 105, establishing and/or maintaining acidic region 107. Thus, in certain embodiments, the reactor is configured such that the spatially varying chemical composition gradient (e.g., spatially varying pH gradient) is established and/or maintained, at least in part, by hydrolysis.

In accordance with certain embodiments, the reactor comprises an inlet connected to a first region (e.g., an acidic region) of the spatially varying chemical composition gradient (e.g., spatially varying pH gradient). In certain embodiments, the electrochemical reactor and/or inlet is configured to receive a solid (e.g., $CaCO_3$).

In some embodiments, the reactor comprises a reactor outlet. In some embodiments, the reactor outlet is configured to discharge $Ca(OH)_2$ (e.g., solid calcium hydroxide) and/or lime (CaO). In some embodiments, the reactor comprises an outlet connected to a second region (e.g., an alkaline region) of the spatially varying chemical composition gradient (e.g., spatially varying pH gradient). In certain embodiments, the outlet is configured such that solids can be expelled from the reactor. In some embodiments, the reactor comprises a solids handling apparatus associated with the outlet and configured to remove solid from the reactor. For example, in some embodiments, solids handling apparatus is configured to remove solids (such as solid metal hydroxides, such as solid nickel hydroxide, solid calcium hydroxide, or solid magnesium hydroxide) from the reactor. Examples of solids handling apparatuses include, but are not limited to, conveyor belts, augers, pumps, chutes, or any other device capable of transporting solids away from the reactor. In some embodiments the solids handling apparatus separates the solid from the liquid using one or a combination of fluid flow, filtering, sedimentation, centrifugal force, electrophoresis, dielectrophoresis, or magnetic separation.

In some embodiments, the reactor comprises more than one reactor outlet (e.g., at least 1, at least 2, at least 3, at least 4, less than or equal to 5, less than or equal to 4, less than or equal to 3, or less than or equal to 2; combinations of these ranges are also possible). In certain embodiments, the reactor comprises a second outlet.

In certain embodiments, the second outlet is configured to discharge a gas (e.g., $CO_2$, $O_2$, and/or $H_2$). In some instances, the $CO_2$ is to be sequestered, used in a liquid fuel, used in an oxyfuel, used in enhanced oil recovery, used to produce dry ice, and/or used as an ingredient in a beverage. In some embodiments, the $O_2$ is to be sequestered, used as oxyfuel, used in a CCS application, and/or used in enhanced oil recovery. In certain cases, the $H_2$ is to be sequestered and/or used as a fuel (e.g., in a fuel cell and/or to heat the system). In some embodiments, at least a portion (e.g., at least 10%, at least 25%, at least 50%, at least 75%, at least 90%, or all) of the $CO_2$, $O_2$, and/or $H_2$ discharged from the system is fed into a kiln.

In some embodiments, the reactor comprises a third outlet and/or a fourth outlet. In some cases, the second outlet, third outlet, and/or fourth outlet is configured to discharge $CO_2$, $O_2$, and/or $H_2$. For example, in some cases, the second outlet is configured to discharge $CO_2$ and $O_2$ while the third outlet is configured to discharge $H_2$. In certain instances, the second outlet is configured to discharge $CO_2$, the third outlet is configured to discharge $O_2$, and the fourth outlet is configured to discharge $H_2$.

According to some embodiments, the reactor further comprises one or more membranes selectively permeable to ions between the first electrode and the second electrode. In certain embodiments, the one or more membranes selectively permeable to ions comprises two membranes selectively permeable to ions. In certain embodiments, the two membranes selectively permeable to ions are different from each other.

In some embodiments, the one or more membranes selectively permeable to ions is configured to prevent solid from precipitating on the first electrode, prevent solid from passivating the first electrode, and/or prevent two different solids from contaminating each other. According to certain embodiments, a membrane selectively permeable to ions allows ions to pass through while restricting (or eliminating)

the passage of solids. For example, in some embodiments, a metal ion (e.g., $Ca^{2+}$) may pass through while a solid metal salt (e.g., a solid metal carbonate, such as solid $CaCO_3$) or a precipitate (e.g., solid metal hydroxide, such as solid $Ca(OH)_2$) is restricted (or does not pass through at all).

In some embodiments, the membrane selectively permeable to ions allows ions to pass through but restricts (or eliminates) the passage of non-ionic compounds. In certain embodiments, the membrane selectively permeable to ions allows ions to pass through at a first rate and allows non-ionic compounds to pass through at a second rate, which is slower than the first rate. In some embodiments, the membrane selectively permeable to ions allows certain ions to pass through but restricts (or eliminates) the passage of other ions. In certain embodiments, the membrane selectively permeable to ions allows certain ions to pass through at a first rate and allows other ions to pass through at a second rate, which is slower than the first rate. In some embodiments, membranes selectively permeable to ions may allow certain metal ions to pass through but restricts (or eliminates) the passage of others (or allows certain metal ions to pass through faster than others), may allow $H^+$ to pass through but restricts (or eliminates) the passage of $OH^-$ (or allows $H^+$ to pass through faster than $OH^-$) may allow $OH^-$ to pass through but restricts (or eliminates) the passage of $H^+$ (or allows $OH^-$ to pass through faster than $H^+$), may allow metal ions to pass through but restricts (or eliminates) the passage of $H^+$ and/or $OH^-$ (or allows metal ions to pass through faster than $H^-$ and/or $OH^-$), and/or may allow $H^+$ and/or $OH^-$ ions to pass through but restricts (or eliminates) the passage of metal ions (or allows $H^+$ and/or $OH^-$ ions to pass through faster than metal ions).

For example, in some embodiments, the membrane selectively permeable to ions is permeable to $OH^-$ ions but relatively less permeable to $Ca^{2+}$ ions, while the membrane selectively permeable to ions is permeable to $Ca^{2+}$ ions but relatively less permeable to $OH^-$ ions. In this example, $Ca^{2+}$ from the first region (e.g., acidic region) could diffuse through the membrane selectively permeable to ions into the separate chamber, but could not diffuse through the membrane selectively permeable to ions into the second region (e.g., alkaline region). Additionally, in this example, $OH^-$ ions from the second region (e.g., alkaline region) could diffuse through the membrane selectively permeable to ions into the separate chamber, but could not diffuse through the membrane selectively permeable to ions. Thus, in this example, $Ca^{2+}$ and $OH^-$ would only be able to react, forming solid $Ca(OH)_2$, in the separate chamber, preventing solid $Ca(OH)_2$ from forming on the cathode or anode. Accordingly, in some embodiments, the one or more membranes selectively permeable to ions could prevent solid (e.g., solid metal hydroxide, such as solid $Ca(OH)_2$) from precipitating on the first electrode (e.g., cathode), prevent solid (e.g., solid metal hydroxide, such as solid $Ca(OH)_2$) from passivating the first electrode (e.g., cathode); and/or prevent two different solids—the chemical compound (e.g., a metal salt, such as a solid metal carbonate, such as solid calcium carbonate) and the precipitate (e.g., a solid hydroxide, such as a solid metal hydroxide, such as solid $Ca(OH)_2$) from contaminating each other.

In certain embodiments, the reactor is directed toward the production of a calcined, or decomposed, mineral or metal salt (e.g., metal carbonate) through electrochemical and chemical means. In some embodiments, the use of fossil fuels for production of thermal energy, and the associated production of greenhouse gases (e.g., $CO_2$) or gases that are atmospheric pollutants, is reduced or avoided through the use of such a reactor in place of traditional thermal calcination that involves heating of the mineral or metal salt to decompose it.

Certain aspects are related to systems for producing cement. In some embodiments, the system comprises a reactor. In certain embodiments, the reactor comprises any of the reactor embodiments disclosed above or elsewhere herein, or combinations thereof.

In certain embodiments, the system (e.g., any system described herein) comprises a kiln. For example, referring to FIG. 1F, in some embodiments, the system comprises an electrochemical reactor and kiln 150. Similarly, referring to FIG. 2D, in certain embodiments, the system comprises an electrochemical reactor and kiln 150. In some embodiments, the kiln comprises a kiln inlet. In accordance with some embodiments, the kiln is attached directly to the reactor and/or to an apparatus (e.g., an apparatus configured to react acid and/or base in a precipitation reaction). A kiln (e.g., any kiln described herein) may be used in any system described herein.

According to some embodiments, the kiln is downstream from the reactor, reactor outlet, and/or one or more apparatuses. According to certain embodiments, the system further comprises a heater between the reactor, reactor outlet, and/or one or more apparatuses and the kiln inlet. Examples of heaters include devices that heat or dehydrate the substance placed inside it. In some embodiments, the reactor outlet is attached directly to the kiln inlet.

As used herein, a direct attachment exists between a first unit and a second unit (and the two units are said to be "attached directly to" each other) when they are connected to each other and the composition of the material being transferred between the units does not substantially change (i.e., no component changes in relative abundance by more than 5%) as it is transported from the first unit to the second unit. As an illustrative example, a conduit that connects first and second units, and in which the pressure and temperature of the contents of the conduit are adjusted but the composition of the contents is not altered, would be said to directly attach the first and second units. If, on the other hand, a separation step is performed and/or a chemical reaction is performed that substantially alters the composition of the contents of the conduit during passage from the first unit to the second unit, the conduit would not be said to directly connect the first and second units. In some embodiments, two units that are attached directly to each other are configured such that there is no phase change of the material as it is transported from the first unit to the second unit.

In certain embodiments, the kiln inlet is configured to receive at least a portion of the solid calcium hydroxide and/or solid calcium oxide derived from at least a portion of the solid calcium hydroxide. For example, in some embodiments, calcium hydroxide is collected from the reactor, reactor outlet, and/or more apparatuses and the reactor, reactor outlet, and/or more apparatuses is attached directly to the kiln inlet, such that the kiln inlet is configured to receive at least a portion of the solid calcium hydroxide. In certain embodiments, calcium hydroxide is collected from the reactor, reactor outlet, and/or more apparatuses, and is transported to the heater. In some embodiments, the heater converts the calcium hydroxide to calcium oxide, in full or in part. In some embodiments, the kiln inlet is configured to receive at least a portion of the solid calcium hydroxide and/or solid calcium oxide derived from at least a portion of the solid calcium hydroxide from the heater.

In accordance with some embodiments, the kiln is configured to heat the $Ca(OH)_2$ (e.g., solid calcium hydroxide)

and/or lime (e.g., solid calcium oxide) and/or a reaction product thereof as part of a cement-making process. In some embodiments, heating the $Ca(OH)_2$ and/or lime as part of a cement-making process comprises heating the $Ca(OH)_2$ and/or lime in the kiln with other compounds. For example, the $Ca(OH)_2$ and/or lime could be heated in the kiln with $SiO_2$ or other minerals.

In certain cases, the system has lower net carbon emissions (e.g., at least 10% lower, at least 25% lower, at least 50% lower, at least 75% lower, or at least 90% lower) than substantially similar systems that use traditional thermal calcination instead of the electrochemical reactor. In some instances, the system has net-zero carbon emissions.

Certain aspects are related to methods of forming precipitates in a spatially varying chemical composition gradient (e.g., spatially varying pH gradient). According to some embodiments, the method is performed in a reactor and/or system as described in association with any of the embodiments disclosed above or elsewhere herein, or combinations thereof.

In accordance with some embodiments, the method comprises transporting a chemical compound (e.g., a metal salt) to a first region (e.g., an acidic region) of the spatially varying chemical composition gradient (e.g., the spatially varying pH gradient). In certain embodiments, the metal salt comprises metal carbonate. According to some embodiments, the metal carbonate comprises calcium carbonate, magnesium carbonate, and/or nickel carbonate. For example, in accordance with some embodiments, the method comprises transporting calcium carbonate to a first region (e.g., an acidic region) of the spatially varying pH gradient.

In accordance with certain embodiments, the chemical compound (e.g., the metal salt) is dissolved and/or reacted in a liquid within the spatially varying chemical composition gradient (e.g., spatially varying pH gradient). Non-limiting examples of liquids include non-aqueous or aqueous solutions. Examples of non-aqueous solutions include solutions comprising a non-aqueous solvent and an electrolyte salt and/or solutions comprising an ionic liquid. Examples of aqueous solutions include solutions comprising water and an electrolyte salt. Examples of electrolyte salts include $NaSO_4$ and $NaClO_4$. In some embodiments, the chemical compound (e.g., the metal salt) is dissolved and reacted within the liquid within the spatially varying chemical composition gradient (e.g., the spatially varying pH gradient). For example, in some embodiments, calcium carbonate is dissolved and/or reacted in a liquid within the spatially varying chemical composition gradient (e.g., the spatially varying pH gradient). In some embodiments, calcium carbonate is dissolved and reacted within the liquid within the spatially varying chemical composition gradient (e.g., the spatially varying pH gradient). For example, the chemical compound (e.g., metal salt) (e.g., calcium carbonate) is added to the first region (e.g., acidic region), and the chemical compound (e.g., metal salt) (e.g., calcium carbonate) reacts with the protons in the first region (e.g., acidic region), such that the chemical compound (e.g., metal salt) (e.g., calcium carbonate) is dissolved, forming one or more elements, such as a metal (e.g., forming $Ca^{2+}$ and $HCO_3^-$, or $Ca^{2+}$ and $H_2CO_3$). In some embodiments, the one or more elements (e.g., a metal, such as $Ca^{2+}$) moves to the second region (e.g., alkaline region), where it reacts with the hydroxide ions in the second region (e.g., alkaline region), forming a precipitate (e.g., a metal precipitate, such as $Ca(OH)_2$).

In some embodiments, the first region comprises an acidic region. In certain embodiments, the second region comprises an alkaline region. According to some embodiments, the chemical compound (e.g., metal salt) is dissolved in the acidic region and the one or more elements (e.g., a metal, such as $Ca^{2+}$) reacts in the alkaline region. In other embodiments, the first region comprises an alkaline region. In some embodiments, the second region comprises an acidic region. In accordance with certain embodiments, the chemical compound (e.g., metal salt) is dissolved in the alkaline region and the one or more elements (e.g., a metal, such as $Ca^{2+}$) reacts in the acidic region.

According to some embodiments, the method comprises collecting a precipitate from a second region (e.g., an alkaline region) of the spatially varying chemical composition gradient (e.g., spatially varying pH gradient). In certain embodiments, the precipitate comprises a metal precipitate, such as a metal hydroxide. Non-limiting examples of metal hydroxides include nickel hydroxide, calcium hydroxide, and magnesium hydroxide. For example, in the example given above, the one or more elements (e.g., a metal, such as $Ca^{2+}$) moves to the second region (e.g., alkaline region), where it reacts with the hydroxide ions in the second region (e.g., alkaline region), forming a precipitate (e.g., a metal precipitate, such as $Ca(OH)_2$). Accordingly, in some embodiments, the method comprises collecting solid calcium hydroxide from an alkaline region of the spatially varying chemical composition gradient (e.g., spatially varying pH gradient). Non-limiting examples of ways in which the one or more elements (e.g., the metal) can move to the second region (e.g., alkaline region) include diffusion, transportation by convection, and/or transportation by flow.

In accordance with certain embodiments, the precipitate comprises one or more elements (e.g., metal) from the chemical compound (e.g., the metal salt) dissolved and/or reacted within the spatially varying chemical composition gradient (e.g., spatially varying pH gradient). In some embodiments, the one or more elements comprises a metal element. Metal, as used herein, refers to metallic metal or a metal ion. In some embodiments, the precipitate comprises a metal cation from the metal salt that was dissolved and/or reacted within the spatially varying chemical composition gradient (e.g., spatially varying pH gradient), and that metal cation is ionically bonded to an anion within the precipitate. For example, in certain embodiments, the solid calcium hydroxide comprises calcium from the calcium carbonate dissolved and/or reacted within the spatially varying chemical composition gradient (e.g., spatially varying pH gradient).

According to certain embodiments, the method is a method of making cement.

According to certain embodiments, the method comprises heating the $Ca(OH)_2$ (e.g., solid calcium hydroxide) and/or lime (e.g., solid calcium oxide) and/or a reactant product thereof within a kiln to make cement. In some embodiments, this comprises taking the calcium hydroxide from the reactor and placing it directly in the kiln Alternatively, in certain embodiments, there are steps in between collecting the calcium hydroxide and heating in the kiln (e.g., a heater). In some embodiments, the heater converts the calcium hydroxide to its calcium oxide, and then the calcium hydroxide and/or the oxide calcium oxide are heated in the kiln. In some embodiments, the heater converts 100% (by weight) of the calcium hydroxide to its calcium oxide and only the calcium oxide is heated in the kiln. In other embodiments, the heater converts 10% or more, 20% or more, 30% or more, 40% or more, 50% or more, up to 90%, up to 95%, or up to 99% (by weight) of the calcium hydroxide to calcium oxide. Combinations of these ranges are also possible (e.g., 10% to 100% (by weight) inclusive). In some embodiments, both the calcium hydroxide and calcium oxide are heated in the kiln Examples of heaters include devices that heat or dehydrate the substance placed inside it.

In some embodiments, heating the $Ca(OH)_2$ (e.g., solid calcium hydroxide) and/or lime (e.g., solid calcium oxide) and/or a reactant product thereof within a kiln to make cement comprises heating the s $Ca(OH)_2$ (e.g., solid calcium hydroxide) and/or lime (e.g., solid calcium oxide) and/or a reactant product thereof in the kiln with other compounds. For example, the $Ca(OH)_2$ (e.g., solid calcium hydroxide) and/or lime (e.g., solid calcium oxide) and/or a reactant product thereof could be heated in the kiln with $SiO_2$ or other minerals.

In certain embodiments, there are subsequent steps after heating the $Ca(OH)_2$ (e.g., solid calcium hydroxide) and/or lime (e.g., solid calcium oxide) and/or a reactant product thereof within a kiln before the cement is made. For example, in certain embodiments, there is a cooling step after the kiln.

According to some embodiments, the method is part of a batch process. In certain embodiments, the precipitate (e.g., a metal hydroxide, such as $Ca(OH)_2$) is periodically collected from the reactor. According to certain embodiments, the method is performed continuously. In some embodiments, the chemical compound (e.g., a metal salt, such as a metal carbonate, such as $CaCO_3$) is added continuously or periodically at the anode and/or first region (e.g., acidic region). In certain embodiments, the precipitate (e.g., a metal hydroxide, such as $Ca(OH)_2$) is collected continuously or periodically. Non-limiting examples of collecting the precipitate (e.g., a metal hydroxide, such as $Ca(OH)_2$) include collecting it with a flow stream and/or allowing it to deposit on a surface from which it is continuously or periodically collected.

In accordance with some embodiments, the method produces a byproduct different from the precipitate. For example, in some embodiments, the method produces a byproduct different from the solid calcium hydroxide and/or the solid calcium oxide. In some embodiments, the byproduct comprises $CO_2$, $O_2$, and/or $H_2$. For example, in some embodiments, hydrolysis is performed in the reactor, and the reaction taking place in the cathode converts $2H_2O$ molecules and 2 electrons to $H_2$ (g) and 2 $OH^-$, while the reaction taking place in the anode converts $2H_2O$ molecules to $O_2$ (g), 4 electrons, and 4 protons. In certain embodiments, the chemical compound (e.g., metal salt) (e.g., a metal carbonate, such as calcium carbonate) is added to the first region (e.g., acidic region), and the chemical compound (e.g., metal salt) (e.g., a metal carbonate, such as calcium carbonate) reacts with the protons in the first region (e.g., acidic region), such that the chemical compound (e.g., metal salt) (e.g., a metal carbonate, such as calcium carbonate) is dissolved forming one or more elements (e.g., metal). In some embodiments, the net reaction between $CaCO_3$ and two protons results in the formation of $H_2O$, $Ca^{2+}$, and $CO_2$ (g).

According to certain embodiments, the method further comprises collecting the byproduct. For example, in some embodiments, the byproduct comprises $CO_2$, $O_2$, and $H_2$. In certain embodiments, collecting the byproduct comprises collecting each of the $CO_2$, $O_2$, and $H_2$; collecting only the $CO_2$; collecting only the $O_2$; collecting only the $H_2$; collecting $CO_2$ and $O_2$; collecting $CO_2$ and $H_2$, or collecting $O_2$ and $H_2$. For example, in certain embodiments, the byproduct comprises $CO_2$ and the collecting the byproduct comprises sequestering the $CO_2$.

In accordance with some embodiments, the byproduct is used as fuel. In some embodiments, the $H_2$ can be used as a fuel. Non-limiting examples include burning the $H_2$ directly or using it with a fuel, such as natural gas. In some embodiments, the $O_2$ and $CO_2$ are used to support combustion of a fuel, such as a fossil fuel. In some embodiments, the byproducts are used as fuel for a kiln. For example, in some embodiments, the $O_2$ and $CO_2$ are fed into the kiln to support combustion of a fuel, such as a fossil fuel. In certain embodiments, the $H_2$, $O_2$, and $CO_2$ are reacted in a fuel cell, such as a solid oxide fuel cell. In certain embodiments, $H_2$ and $O_2$ are reacted in a fuel cell to produce electric power.

According to some embodiments, the reactors, systems, and methods described herein display one or more beneficial properties and have one or more applications. For example, some embodiments of the reactors, systems, and methods described herein may be used for producing cement (e.g., Portland cement). For example, in some embodiments, the reactor is used in place of calcination in a traditional cement production process.

Moreover, certain embodiments of the reactors, systems, and methods described herein may be used for producing cement with reduced production of atmospheric pollutants or greenhouse gases, such as $CO_2$, than traditional cement production processes. Traditional cement production processes include calcination of $CaCO_3$ by thermal means, which accounts for about 60% of the $CO_2$ emissions while about 40% of the $CO_2$ emissions results from the burning of fossil fuels to carry out the calcination and sintering processes.

In some embodiments, $Ca(OH)_2$ produced by the methods, reactors, and/or systems described herein can be used to produce CaO for cement making, instead of traditional calcination of $CaCO_3$ to CaO. The thermal dehydration of $Ca(OH)_2$ to CaO has a 25% lower minimum energy requirement (71.2 kJ/mol) than thermal calcination of $CaCO_3$ to CaO (97.0 kJ/mol).

In accordance with certain embodiments, the reactor and/or system is powered, in part or in full, by renewable electricity (e.g., solar energy, wind energy, and/or hydroelectric power).

In accordance with certain embodiments, byproducts such as $CO_2$, $H_2$, and/or $O_2$ are generated, which have many possible uses, including for oxy-combustion, improved kiln efficiency, reduced $NO_x$ emissions, and/or as flue gas suitable for carbon capture and sequestration (CCS). Thus, in some embodiments, the byproducts could be sold or used.

In one embodiment, the electrolytically-driven chemical reactor comprises an electrolysis cell for the electrolysis of water. In some embodiments, such a cell, when performing electrolysis, produces a high pH at the cathode, where a hydrogen evolution reaction (HER) is taking place and producing $OH^-$, and produces a low pH at the anode, where an oxygen evolution reaction (OER) is taking place and producing $H^+$. A gradient in pH is therefore produced, in accordance with certain embodiments, between the cathode and anode. In other such electrolytic cells, a gradient in other species may be produced depending on the nature of the electrolysis reaction.

In one embodiment, said pH gradient is used to dissolve a metal carbonate at low pH in the vicinity of the anode, and to precipitate a metal hydroxide as the metal ion diffuses towards the higher pH environment at the cathode. In some such embodiments, as the metal carbonate is dissolved near the anode, $CO_2$ gas is produced, and metal cations of the carbonate are produced in solution. These then diffuse, in accordance with some such embodiments, or are optionally transported by convection or flow, toward the high pH environment produced by HER at the cathode. In accordance with some embodiments, reaction of the metal ion with OH⁻ ions produced at the cathode results in the precipitation of the metal hydroxide. The electrochemical and chemical reactions occurring at each electrode, in accordance with some embodiments, and the overall reaction. Almost any metal carbonate or mixtures of metal carbonates may be converted to its hydroxide or hydroxides through such a process, with non-limiting examples of metal carbonates including $CaCO_3$, $MgCO_3$, and $NiCO_3$. In some such embodiments, concurrently with the production of the metal hydroxide from the starting metal carbonate, hydrogen gas is liberated at the cathode and a mixture of oxygen gas and carbon dioxide gas is liberated at the anode.

In one or more embodiments, the reactor is operated in a batch manner whereby the product metal hydroxide is periodically collected. In one or more embodiments, the reactor is operated in a continuous manner such that additional metal carbonate is added continuously or periodically at the anode, and the precipitated metal hydroxide is continuously or periodically removed from the reaction zone. For example, precipitated metal hydroxide may be removed from the reaction zone using a flow stream and collected, or the precipitate may be allowed to deposit on a surface from which it is continuously or periodically removed while the reactor continues to operate.

In some embodiments, the hydrogen and/or oxygen gas produced by the electrochemical reactor is beneficially used or sold. In some embodiments, the hydrogen and oxygen are reacted in a fuel cell to produce electric power. In some embodiments, the hydrogen is combusted as a fuel or as a component of a fuel for the purpose of heating a reactor or kiln or furnace.

In some embodiments, the electric power to carry out said electrolytically-driven chemical reactor is produced from renewable resources, including but not limited to solar energy, wind energy, or hydroelectric power.

In one embodiment, said electrochemically-driven chemical reactor is used to decarbonize $CaCO_3$ and produce $Ca(OH)_2$ as a precursor for the production of cement, such as Portland cement. It is useful to compare both the total energy consumption, and to consider the form of the energy consumed and its carbon intensity. For simplicity, it is assumed that the high temperature heat treatment that reacts CaO with aluminosilicates and other components to form Portland cement is identical for the two processes. The energy consumption to bring CaO produced by thermal calcination of $CaCO_3$, and by electrochemical decarbonization followed by thermal dehydration of $Ca(OH)_2$, to the same starting temperature of 900 C has been considered. The energy per mole input to heat the reactant or product to a given temperature has been calculated from its heat capacity. The energy per mole to carry out the decomposition reactions has been given as the standard free energy of reaction (i.e., gas partial pressures are 1 atm).

Comparing, in this example, the energy per mole for thermal calcination of $CaCO_3$ with that for thermal dehydration of $Ca(OH)_2$, the latter has a 25% lower minimum energy requirement of 72.1 kJ/mole vs 97.0 kJ/mole. In this example, the electrochemical process also includes the decarbonation reaction in which $CaCO_3$ is converted to $Ca(OH)_2$ with a standard free energy of 74.3 kJ/mole; this is an additional energy consumption for the electrochemical process. However, this exemplary process, as well as the electrolysis reaction, can be powered by electricity from low or zero-carbon renewable resources at nearly zero marginal cost of electricity.

The electrolysis reaction necessary to operate the reactor, in this exemplary process, requires 237.1 kJ/mole; however, this energy firstly can be generated by low carbon sources as well, and secondly, yields hydrogen and oxygen that can be used remotely as a value-added product, or can be used to power the cement production process, for example by using a fuel cell to provide electrical power, or through a combustion process to provide reaction heat. The energy produced may be used to operate the electrolyser, or to heat the high temperature kiln.

In some embodiments, the calcium hydroxide, also known as slaked lime, and/or calcium oxide, which is reacted with water to produce slaked lime, produced herein (e.g., from a precipitation reaction) can be used in applications including but not limited to paper making, flue gas treatment carbon capture, plaster mixes and masonry (including Pozzolan cement), soil stabilization, pH adjustment, water treatment, waste treatment, and sugar refining. The following are non-limiting examples of uses of calcium hydroxide (also known as slake lime) and/or calcium oxide (also known as lime).

1. Metallurgical Uses a) Ferrous Metals

In some embodiments, slaked lime and/or lime produced by the reactors, systems, and/or methods disclosed herein is used in the making of iron and/or steel. For example, in the making of iron and/or steel, lime can be used as a flux, to form slag that prevents the iron and/or steel from oxidizing, and to remove impurities such as silica, phosphates, manganese and sulfur. In some cases, slaked lime (dry, or as a slurry) is used in the making of iron and/or steel as a lubricant for drawing wires or rods through dies, as a coating on casting molds to prevent sticking, and/or as a coating on steel products to prevent corrosion. In some instances, lime or slaked lime is also used to neutralize acidic wastes.

b) Non-Ferrous Metals

In some embodiments, slaked lime and/or lime produced by the reactors, systems, and/or methods disclosed herein is used in the making of nonferrous metals including, but not limited to, copper, mercury, silver, gold, zinc, nickel, lead, aluminum, uranium, magnesium and/or calcium. Lime may be used, in some cases, as a fluxing agent, to remove impurities (such as silica, alumina, phosphates, carbonates, sulfur, sulfates) from ores. For example, lime and slaked lime can be used in the flotation or recovery of non-ferrous ores. In certain cases, lime acts as a settling aid, to maintain proper alkalinity, and/or to remove impurities (such as sulfur and/or silicon). In some instances, in the smelting and refining of copper, zinc, lead and/or other non-ferrous ores, slaked lime is used to neutralize sulfurous gases and/or to prevent the formation of sulfuric acid. In certain instances, lime and/or slaked lime is also used as a coating on metals to prevent the reaction with sulfurous species. In certain cases, in the production of aluminum, lime and/or slaked lime is used to remove impurities (such as silica and/or carbonate) from bauxite ore, and/or is used to regulate pH. In some instances, lime is used to maintain alkaline pH for the dissolution of gold, silver, and/or nickel in cyanide extraction. In the production of zinc, lime is used as a reducing agent in certain cases. In some cases, in the production of metallic calcium and/or magnesium, magnesium and/or calcium oxides are reduced at high temperatures to form magnesium and/or calcium metal.

2. Construction a) Masonry (Other than Portland Cement)

In some embodiments, slaked lime and/or lime produced by the reactors, systems, and/or methods disclosed herein is used for making masonry mortars, plasters, stuccos, whitewashes, grouts, bricks, boards, and/or non-Portland cements. In these applications, in certain embodiments, lime and/or slaked lime may be mixed with other additives and exposed to carbon dioxide to produce calcium carbonate, lime and/or slaked lime may be reacted with other additives (such as aluminosilicates) to form a cementitious material, and/or lime and/or slaked lime may be used as a source of calcium. In the instance of mortars, plasters, stuccos and whitewashes, in some cases, lime and/or slaked lime is mixed with additives and/or aggregates (such as sand) to form a paste/slurry that hardens as water evaporates and as the lime and/or slaked lime reacts with atmospheric carbon dioxide to form calcium carbonate. In the case of hydraulic pozzolan cements, in certain cases, lime and/or slaked lime is reacted with aluminates, silicates, and/or other pozzolanic materials (e.g., pulverized fuel ash, volcanic ash, blast furnace slag, and/or calcined clay), to form a water-based paste/slurry that hardens as insoluble calcium aluminosilicates are formed. In the case of other hydraulic cements, in some instances, lime and/or slaked lime is reacted at high temperature with sources of silica, alumina, and/or other additives such that cementitious compounds are formed, including dicalcium silicate, calcium aluminates, tricalcium silicate, and/or mono calcium silicate. In some cases, sandlime bricks are made by reacting slaked lime with a source of silica (e.g., sand, crushed siliceous stone, and/or flint) and/or other additives at temperatures required to form calcium silicates and/or calcium silicate hydrates. In some cases, lightweight concrete (e.g., aircrete) is made by reacting lime and/or slaked lime with reactive silica, aluminum powder, water, and/or other additives; the reaction between slaked lime and silicates/aluminates causes calcium silicates/aluminates and/or calcium silicate hydrates to form, while the reaction between water, slaked lime and aluminum causes hydrogen bubbles to form within the hardening paste. Whitewash is a white coating made from a suspension of slaked lime, which hardens and sets as slaked lime reacts with carbon dioxide from the atmosphere. Calcium silicate boards, concrete, and other cast calcium silicate products are formed, in some cases, when calcium silicate-forming materials (e.g., lime, slaked lime, silica, and/or cement) and additives (e.g., cellulose fiber and/or fire retardants) and water are mixed together, cast or pressed into shape. In some cases, high temperatures are used to react the lime, slaked lime, and/or silica, and/or to hydrate the cement.

b) Soil Stabilization

In some embodiments, slaked lime and/or lime produced by the reactors, systems, and/or methods disclosed herein is used to stabilize, harden, and/or dry soils. For example, lime and/or slaked lime may be applied to loose or fine-grained soils before the construction of roads, runways, and/or railway tracks, and/or to stabilize embankments and/or slopes. In some cases, when lime is applied to clay soils a pozzolanic reaction may occur between the clay and the lime to produce calcium silicate hydrates, and/or calcium aluminate hydrates, which strengthen and/or harden the soil. In certain instances, lime and/or slaked lime applied to soils may also react with carbon dioxide to produce solid calcium carbonate, which may also strengthen and/or harden soil. In some cases, lime may also be used to dry wet soils at construction sites, as lime reacts readily with water to form slaked lime.

c) Asphalt Additive and Asphalt Recycling

In some embodiments, slaked lime and/or lime produced by the reactors, systems, and/or methods disclosed herein is used to make and/or recycle asphalt. For example, in some cases, slaked lime is added to hot mix asphalt as a mineral filler and/or antioxidant, and/or to increase resistance to water stripping. In certain instances, slaked lime can react with aluminosilicates and/or carbon dioxide to create a solid product that improves the bond between the binder and aggregate in asphalt. As a mineral filler, in some instances, lime may increase the viscosity of the binder, the stiffness of the asphalt, the tensile strength of the asphalt, and/or the compressive strength of the asphalt. As a hydraulic road binder, in certain cases, lime may reduce moisture sensitivity and/or stripping, stiffen the binder so that it resists rutting, and/or improve toughness and/or resistance to fracture at low temperature. In some instances, lime and/or slaked lime added to recycled asphalt results in greater early strength and/or resistance to moisture damage.

3. Waste Treatment, Water Treatment, Gas Treatment a) Gas Treatment

In some embodiments, slaked lime and/or lime produced by the reactors, systems, and/or methods disclosed herein is used for the removal of acid gases (such as hydrogen chloride, sulfur dioxide, sulfur trioxide, and/or hydrogen fluoride) and/or carbon dioxide from a gas mixture (e.g. flue gas, atmospheric air, air in storage rooms, and/or air in closed breathing environments such as submarines). For example, in some cases, lime and/or slaked lime is exposed to flue gas, causing the reaction of lime and/or slaked lime with components of the flue gas (such as acid gases, including hydrogen chloride, sulfur dioxide and/or carbon dioxide), resulting in the formation of non-gaseous calcium compounds (such as calcium chloride, calcium sulfite, and/or calcium carbonate). In certain embodiments, exposure of gas to slaked lime is done by spraying slaked lime solutions and/or slurries onto gas, and/or by reacting gas streams with dry lime and/or slaked lime. In certain embodiments, the gas stream containing acid gas or gases is first reacted with a solution of alkali metal hydroxides (e.g. sodium hydroxide and/or potassium hydroxide), to form a soluble intermediate species (such as potassium carbonate), which is subsequently reacted with lime and/or slaked lime to produce a solid calcium species (such as calcium carbonate) and regenerate the original alkali metal hydroxide solution. In some embodiments, the calcium carbonate formed from the reaction of lime and/or slaked lime with carbon dioxide or alkali carbonate is returned to the reactors, systems, and/or methods disclosed herein, so that the lime and/or slaked lime can be regenerated and/or so that the carbon dioxide can be sequestered.

b) Non-Gaseous Waste Treatment

In some embodiments, slaked lime and/or lime produced by the reactors, systems, and/or methods disclosed herein is used to treat wastes such as biological wastes, industrial wastes, wastewaters, and/or sludges. In some cases, lime and/or slaked lime may be applied to the waste to create an alkaline environment, which serves to neutralize acid waste, inhibit pathogens, deter flies or rodents, control odors, prevent leaching, and/or stabilize and/or precipitate pollutants (such as heavy metals, chrome, copper, and/or suspended/dissolved solids) and/or dissolved ions that cause scaling (calcium and/or magnesium ions). In certain instances, lime may be used to de-water oily wastes. In some cases, slaked lime may be used to precipitate certain species, such as phosphates, nitrates, and/or sulfurous compounds, and/or prevent leaching. In certain instances, lime and/or slaked lime may be used to hasten the decomposition of organic matter, by maintaining alkaline conditions that favor hydrolysis.

c) Water Treatment

In some embodiments, slaked lime and/or lime produced by the reactors, systems, and/or methods disclosed herein is used to treat water. For instance, lime and/or slaked lime may be used, in some cases, to create an alkaline environment, which serves to disinfect, remove suspended/colloidal material, reduce hardness, adjust pH, precipitate ions contributing to water hardness, precipitate dissolved metals (such as iron, aluminum, manganese, barium, cadmium, chromium, lead, copper, and/or nickel), and/or precipitate other ions (such as fluoride, sulfate, sulfite, phosphate, and/or nitrate).

4. Agriculture and Food

Agriculture

In some embodiments, slaked lime and/or lime produced by the reactors, systems, and/or methods disclosed herein is used for agriculture. For example, lime and/or slaked lime may be used alone, or as an additive in fertilizer, to adjust the pH of the soil and/or of the fertilizer mixture to give optimum growing conditions and/or improve crop yield, in some cases.

Sugar

In some embodiments, slaked lime and/or lime produced by the reactors, systems, and/or methods disclosed herein is used to refine sugar. For example, in some cases, lime and/or slaked lime is used to raise the pH of raw sugar juice, destroy enzymes in the raw sugar juice, and/or react with inorganic and/or organic species to form precipitates. Excess calcium may be precipitated with carbon dioxide, in certain instances. In certain cases, the precipitated calcium carbonate that results may be returned to the reactors, systems, and/or methods disclosed herein, to regenerate slaked lime.

Leather

In some embodiments, slaked lime and/or lime produced by the reactors, systems, and/or methods disclosed herein is used to make leather and/or parchment. In the leather making process, lime is used, in some cases, to remove hair and/or keratin from hides, split fibers, and/or remove fat.

Glue, Gelatin

In some embodiments, slaked lime and/or lime produced by the reactors, systems, and/or methods disclosed herein is used to make glue and/or gelatin. In the process of making glue and/or gelatin, in some cases, animal bones and/or hides are soaked in slaked lime, causing collagen and other proteins to hydrolyze, forming a mixture of protein fragments of different molecular weights.

Dairy Products

In some embodiments, slaked lime and/or lime produced by the reactors, systems, and/or methods disclosed herein is used to make dairy products. In some cases, slaked lime is used to neutralize acidity of cream before pasteurization. In certain cases, slaked lime is used to precipitate calcium caseinate from acidic solutions of casein. In some instances, slaked lime is added to fermented skim milk to produce calcium lactate.

Fruit Industry

In some embodiments, slaked lime and/or lime produced by the reactors, systems, and/or methods disclosed herein is used in the fruit industry. For example, slaked lime and/or lime is used, in some cases, to remove carbon dioxide from air in fruit storage. In some instances, slaked lime is used to neutralize waste citric acid and to raise the pH of fruit juices.

Insecticides/Fungicides

In some embodiments, slaked lime and/or lime produced by the reactors, systems, and/or methods disclosed herein is used as an additive in fungicides and/or insecticides. For example, slaked lime may be mixed with coper sulfate to form tetracupric sulfate, a pesticide. In some cases, lime may also be used as a carrier for other kinds of pesticides, as it forms a film on foliage as it carbonates, retaining the insecticide on the leaves. In some instances, slaked lime is used to control infestations of starfish on oyster beds.

Food Additive

In some embodiments, slaked lime and/or lime produced by the reactors, systems, and/or methods disclosed herein is used as a food additive. In some cases, lime and/or slaked lime may be used as an acidity regulator, as a pickling agent, to remove cellulose (e.g. from kernels such as maize), and/or to precipitate certain anions (such as carbonates) from brines.

5. Chemicals

In some embodiments, slaked lime and/or lime produced by the reactors, systems, and/or methods disclosed herein is used to make chemicals. For example, lime and/or slaked lime may be used as a source of calcium and/or magnesium, an alkali, a desiccant, causticizing agent, saponifying agent, bonding agent, flocculant and/or precipitant, fluxing agent, glass-forming product, degrader of organic matter, lubricant, filler, and/or hydrolyzing agent, among other things.

a) Inorganic Calcium Compounds

Precipitated Calcium Carbonate

In some embodiments, slaked lime and/or lime produced by the reactors, systems, and/or methods disclosed herein is used to make precipitated calcium carbonate. In some instances, a solution and/or slurry of slaked lime, and/or a solution of calcium ions, is reacted with carbon dioxide, and/or an alkali carbonate, so that a precipitate of calcium carbonate and/or magnesium carbonate forms. In certain instances, the precipitated alkali metal carbonate may be used as a filler, to reduce shrinkage, improve adhesion, increase density, modify rheology and/or to whiten/brighten plastics (such as PVC and latex), rubber, paper, paints, inks, cosmetics, and/or other coatings. Precipitated carbonates, in some cases, may be used as flame retarders or dusting powder. In certain cases, precipitated calcium carbonate may be used as an alkalizer, for agriculture, as an antiseptic agent, flour additive, brewing additive, digestive aid, and/or additive for bituminous products), an abrasive (in cleaners, detergents, polishes and/or toothpastes), a dispersant in pesticides, and/or a desiccant.

Calcium Hypochlorite

In some embodiments, slaked lime and/or lime produced by the reactors, systems, and/or methods disclosed herein is used to make calcium hypochlorite, a bleach, by reacting chlorine with lime and/or slaked lime.

Calcium Carbide

In some embodiments, slaked lime and/or lime produced by the reactors, systems, and/or methods disclosed herein is used to make calcium carbide, a precursor to acetylene, by reacting lime with carbonaceous matter (e.g. coke) at high temperature.

Calcium Phosphates

In some embodiments, slaked lime and/or lime produced by the reactors, systems, and/or methods disclosed herein is used to make calcium phosphates (monocalcium phosphate, dicalcium phosphate, and/or tricalcium phosphate) by reacting phosphoric acid with slaked lime, and/or aqueous calcium ions, in the appropriate ratios. In some cases, monocalcium phosphate may be used as an additive in self-rising flour, mineral enrichment foods, as a stabilizer for milk products and/or as a feedstuff additive. In some instances, dicalcium phosphate dihydrate is used in toothpastes, as a mild abrasive, for mineral enrichment of foodstuffs, as a pelletizing aid and/or as a thickening agent. In certain instances, tricalcium phosphate is used in toothpastes, and/or as an anti-caking agent in foodstuffs and/or fertilizers.

Calcium Bromide

In some embodiments, slaked lime and/or lime produced by the reactors, systems, and/or methods disclosed herein is used to make calcium bromide. This is done, in some cases, by reacting lime and/or slaked lime with hydrobromic acid and/or bromine and a reducing agent (e.g. formic acid and/or formaldehyde).

Calcium Hexacyanoferrate

In some embodiments, slaked lime and/or lime produced by the reactors, systems, and/or methods disclosed herein is used to make calcium hexacyanoferrate, by reacting lime and/or slaked lime with hydrogen cyanide in an aqueous solution of ferrous chloride. Calcium hexacyanoferrate can then be converted to the alkali metal salt, or hexacyanoferrates. These are used as pigments and anti-caking agents.

Calcium Silicon

In some embodiments, slaked lime and/or lime produced by the reactors, systems, and/or methods disclosed herein is used to make calcium silicon, by reacting lime, quartz and/or carbonaceous material at high temperatures. In some cases, calcium silicon is used as a de-oxidizer, as a de-sulfurizer, and/or to modify non-metallic inclusions in ferrous metals.

Calcium Dichromate

In some embodiments, slaked lime and/or lime produced by the reactors, systems, and/or methods disclosed herein is used to make calcium dichromate, by roasting chromate ores with lime.

Calcium Tungstate

In some embodiments, slaked lime and/or lime produced by the reactors, systems, and/or methods disclosed herein is used to make calcium tungstate, by reacting lime and/or slaked lime with sodium tungstate, to be used in the production of ferrotungsten and/or phosphors for items such as lasers, fluorescent lamps and/or oscilloscopes.

b) Organic Calcium Compounds

Calcium Citrate

In some embodiments, slaked lime and/or lime produced by the reactors, systems, and/or methods disclosed herein is used to make calcium citrate, by reacting lime and/or slaked lime with citric acid. In some cases, the calcium citrate may be reacted with sulfuric acid to regenerate pure citric acid.

Calcium Soaps

In some embodiments, slaked lime and/or lime produced by the reactors, systems, and/or methods disclosed herein is used to make calcium soaps, by reacting slaked lime with aliphatic acids, wax acids, unsaturated carboxylic acids (e.g. oleic acid, linoleic acid, ethylhexanoate acids), napthenic acids, and/or resin acids. In some cases, calcium soaps are used as lubricants, stabilizers, mold-release agents, waterproofing agents, coatings, and/or additives in printing inks.

Calcium Lactate

In some embodiments, slaked lime and/or lime produced by the reactors, systems, and/or methods disclosed herein is used to make calcium lactate, by reacting slaked lime with lactic acid. In certain instances, the lactic acid may be reacted in a second step with sulfuric acid to produce pure lactic acid. In some instances, these chemicals act as coagulants and foaming agents. In some cases, calcium lactate is used as a source of calcium in pharmaceutical agents and/or foodstuffs, and/or as a buffer.

Calcium Tartarate

In some embodiments, slaked lime and/or lime produced by the reactors, systems, and/or methods disclosed herein is used to make calcium tartrate, by reacting slaked lime with alkali bitartarates. In some cases, the calcium bitartarate may be reacted in a second step with sulfuric acid to produce pure tartaric acid. In certain instances, tartaric acid is used in foodstuffs, pharmaceutical preparations, and/or as an additive in plaster and/or metal polish.

c) Inorganic Chemicals

Aluminum Oxide

In some embodiments, slaked lime and/or lime produced by the reactors, systems, and/or methods disclosed herein is used to make aluminum oxide. Lime is used to precipitate impurities (e.g., silicates, carbonates, and/or phosphates) from processed bauxite ore in the preparation of aluminum oxide.

Alkali Carbonates and Bicarbonates

In some embodiments, slaked lime and/or lime produced by the reactors, systems, and/or methods disclosed herein is used to make alkali carbonates and/or bicarbonates from alkali chlorides in the ammonia-soda process. In this process, in some cases, lime and/or slaked lime is reacted with ammonium chloride (and/or ammonium chlorides, such as isopropylammonium chloride) to regenerate ammonia (and/or amines, such as isopropyl amine) after the reaction of ammonia (and/or the amine) with an alkali chloride. In some cases, the resulting calcium chloride can be reacted with the alkaline stream from the reactors, systems, and/or methods disclosed herein, to regenerate the slaked lime.

Strontium Carbonate

In some embodiments, slaked lime and/or lime produced by the reactors, systems, and/or methods disclosed herein is used to make strontium carbonate. In some instances, lime and/or slaked lime is used to re-generate ammonia from ammonium sulfate, which forms after the ammonia has been carbonated and reacted with strontium sulfate.

Calcium Zirconate

In some embodiments, slaked lime and/or lime produced by the reactors, systems, and/or methods disclosed herein is used to make calcium zirconate. In some cases, lime and/or slaked lime reacts with zircon, $ZrSiO_4$, to produce a calcium silicate and zirconate, which is further purified.

Alkali Hydroxides

In some embodiments, slaked lime and/or lime produced by the reactors, systems, and/or methods disclosed herein is used to make alkali hydroxides from alkali carbonates, in a process often called causticizing or re-causticizing. In some cases, slaked lime is reacted with alkali carbonates to produce alkali hydroxides and calcium carbonate. The process of causticizing alkali carbonates is a feature of several other processes, in some instances, including the purification of bauxite ore, the processing of carbolic oil, and the Kraft liquor cycle (in which "green liquor", containing sodium carbonate, reacts with slaked lime to form "white liquor", containing sodium hydroxide).

Magnesium Hydroxide

In some embodiments, slaked lime and/or lime produced by the reactors, systems, and/or methods disclosed herein is used to make magnesium hydroxide. In some cases, the addition of slaked lime to solutions containing magnesium ions (e.g. seawater and/or brine solutions) causes magnesium hydroxide to precipitate from solution.

d) Organic Chemicals

Alkene Oxides.

In some embodiments, slaked lime and/or lime produced by the reactors, systems, and/or methods disclosed herein is used to make alkene oxides. In some instances, lime is used to saponify or dehydrochlorinate propylene and/or butene chlorohydrins to produce the corresponding oxides. The oxides may then be converted to the glycols by acidic hydrolysis, in some instances.

Diacetone Alcohol.

In some embodiments, slaked lime and/or lime produced by the reactors, systems, and/or methods disclosed herein is used to make diacetone alcohol. In some cases, slaked lime is used as an alkaline catalyst to promote the self-condensation of acetone to form diacetone alcohol, which is used as a solvent for resins, and/or as in intermediate in the production of mesityl oxide, methyl isobutyl ketone and/or hexylene glycol.

Hydroxypivalic Acid Neopentyl Glycol Ester, Pentaerythritol.

In some embodiments, slaked lime and/or lime produced by the reactors, systems, and/or methods disclosed herein is used as a basic catalyst to make hydroxypivalic acid neopentyl glycol ester, and/or pentaerythritol.

Anthraquinone Dyes and Intermediates.

In some embodiments, slaked lime and/or lime produced by the reactors, systems, and/or methods disclosed herein is used as a basic reagent, to replace a sulfonic acid group with a hydroxide, in the making of anthraquinone dyes and/or intermediates.

Trichloroethylene

In some embodiments, slaked lime and/or lime produced by the reactors, systems, and/or methods disclosed herein is used to remove a chlorine from tetrachloroethane to form trichloroethylene.

6. Miscellaneous Uses

Silica, Silicon Carbide and Zirconia Refractories.

In some embodiments, slaked lime and/or lime produced by the reactors, systems, and/or methods disclosed herein is used as a binder, bonding and/or stabilizing agent in the fabrication of silica, silicon carbide and/or zirconia refractories.

Lime Glass.

In some embodiments, slaked lime and/or lime produced by the reactors, systems, and/or methods disclosed herein is used as a source of lime in the fabrication of soda-lime glass. In some instances, lime and/or slaked lime is heated to high temperatures with other raw materials, including silica, sodium carbonate and/or additives such as alumina and/or magnesium oxide. In some instances, the molten mixture forms a glass upon cooling.

Whiteware Pottery and Vitreous Enamels.

In some embodiments, slaked lime and/or lime produced by the reactors, systems, and/or methods disclosed herein is used to make whiteware pottery and/or vitreous enamels. In certain cases, slaked lime is blended with clays to act as a flux, a glass-former, to help bind the materials, and/or to increase the whiteness of the final product.

Lubricant for Casting and Drawing.

In some embodiments, slaked lime and/or lime produced by the reactors, systems, and/or methods disclosed herein is used as a lubricant for casting and/or drawing of materials (such as iron, aluminum, copper, steel and/or noble metals). In some instances, calcium-based lubricants can be used at high temperature to prevent the metal from sticking to the mold. In certain cases, lubricants can be calcium soaps, blends of lime and other materials (including silicilic acid, aluminia, carbon and/or fluxing agents such as fluorospar and/or alkali oxides). Slaked lime is used as a lubricant carrier, in some cases. In certain instances, the slaked lime bonds to the surface of the wire, increases surface roughness and/or improves adhesion of the drawing compound.

Drilling Muds.

In some embodiments, slaked lime and/or lime produced by the reactors, systems, and/or methods disclosed herein is used in drilling mud formulations to maintain high alkalinity and/or to keep clay in a non-plastic state. Drilling mud may, in some cases, be pumped through a hollow drill tube when drilling through rock for oil and gas. In certain instances, the drilling mud carries fragments of rock produced by the drill bit to the surface.

Oil Additives and Lubricating Greases.

In some embodiments, slaked lime and/or lime produced by the reactors, systems, and/or methods disclosed herein is used as an oil additive and/or lubricating grease. In some instances, lime is reacted with alkyl phenates and/or organic sulfonates to make calcium soaps, which are blended with other additives to make oil additives and/or lubricating greases. In some cases, the lime-based additives prevent sludge build-up and to reduce acidity from products of combustion, especially at high temperature.

Pulp and Paper

In some embodiments, slaked lime and/or lime produced by the reactors, systems, and/or methods disclosed herein is used in the pulp and/or paper industry. For example, slaked lime is used in the Kraft process to re-causticize the sodium carbonate into sodium hydroxide. In some cases, the calcium carbonate that forms from this reaction can be returned to the reactors, systems and/or methods disclosed herein to regenerate the slaked lime. In certain instances, slaked lime can also be used as a source of alkali in the sulfite process of pulping, to prepare the liquor. In certain cases, slaked lime is added to a solution of sulfurous acid to form a bisulfite salt. The mixture of sulfurous acid and bisulfite is used, in some cases, to digest the pulp. Slaked lime can also be used to precipitate calcium lignosulfonates from spent sulfite liquor, in certain instances.

Aquariums

In some embodiments, slaked lime and/or lime produced by the reactors, systems, and/or methods disclosed herein is used as a source of calcium and/or alkalinity for marine aquariums and/or reef growth.

A Method of Storing Heat

In some embodiments, slaked lime and/or lime produced by the reactors, systems, and/or methods disclosed herein is used for thermochemical energy storage (e.g. for a self-heating food container and/or for solar heat storage).

Fire Retardant

In some embodiments, calcium and/or magnesium hydroxide produced by the reactors, systems, and/or methods disclosed herein is used as a fire retardant, an additive to cable insulation, and/or insulation of plastics.

Antimicrobial Agent

In some embodiments, slaked lime and/or lime produced by the reactors, systems, and/or methods disclosed herein is used as an antimicrobial agent. For example, in some instances, lime and/or slaked lime is used to treat disease contaminated areas, such as walls, floors, bedding, and/or animal houses.

The following examples are intended to illustrate certain embodiments of the present invention, but do not exemplify the full scope of the invention.

Example 1

This example describes a system run in the first mode where the produced acid and base were collected.

A near-neutral solution of 1M $Na_2SO_4$ was fed to the anode (made from carbon felt) and the cathode (also carbon felt) of a flow cell at a rate of 10 mL per minute, and solution was taken out from the anode and from the cathode. When a voltage of 2.5 V was applied to the cell the pH of the solution coming from the anode was 1.5, and the pH of the solution coming from the cathode was 12.5.

Example 2

This example describes a system run in the first mode where the produced acid and base are collected and reacted.

A hydrolysis reaction is run in an electrochemical cell comprising a first electrode and second electrode, such that base and hydrogen gas are produced at the first electrode (cathode) and acid and oxygen gas are produced at the second electrode (anode). The base is collected from the reactor through a conduit to a first apparatus in fluidic connection with the reactor, and the base is stored in the apparatus. The acid is collected from the reactor through a conduit to a second apparatus in fluidic connection with the reactor, and the acid is stored in that apparatus.

When desired, the base is transferred to a third apparatus in fluidic connection with the first apparatus and the acid is transferred to a fourth apparatus in fluidic connection with the second apparatus. The acid is then used to dissolve $CaCO_3$ in a chemical dissolution in the fourth apparatus to form $Ca^{2+}$ ions and $CO_3^{2-}$ ions. The $Ca^{2+}$ ions are then transported to the third apparatus (which is in fluidic connection with the fourth apparatus), where the base is used in a precipitation reaction with the $Ca^{2+}$ ions to form $Ca(OH)_2$. The $Ca(OH)_2$ may optionally be used in a cement-making process, for example, with a kiln and/or a heater.

Example 3

This example describes a system run in the first mode where the produced oxygen gas and hydrogen gas are transported and reduced and oxidized, respectively.

A hydrolysis reaction is run in an electrochemical cell comprising a first electrode and second electrode, such that base and hydrogen gas are produced at the first electrode (cathode) and acid and oxygen gas are produced at the second electrode (anode). The hydrogen gas is transported from the cathode to the anode through a conduit, where it is oxidized, producing acid. The production of acid decreases the pH at the anode further. The oxygen gas is transported from the anode to the cathode through a conduit, where it is reduced, producing base. The production of base increases the pH at the cathode further.

In some such systems or methods, the acid and base are optionally collected and/or reacted as described in Example 1.

Example 4

This example describes a system run in the first mode where the produced oxygen and gas may be collected and sold or used, or recombined to form water.

A hydrolysis reaction is run in an electrochemical cell comprising a first electrode and second electrode, such that base and hydrogen gas are produced at the first electrode (cathode) and acid and oxygen gas are produced at the second electrode (anode). The hydrogen gas and oxygen gas may be collected and sold or used, or recombined to form water if production of gas is not desired.

Example 5

This example describes a system run alternatively in the first mode and second mode.

The system or method of Example 1 is used in times of low electricity cost and/or high electricity availability, but some or all of the acid and base is stored, rather than used in chemical dissolution and/or precipitation reactions. When the electricity cost increases and/or becomes less available, the system is switched to a second mode, where the polarity of the electrodes is reversed from that in Example 1. The stored base from Example 1 is then added to the anode where it is oxidized to form oxygen gas. The stored acid is then added to the cathode where it is reduced to produce hydrogen gas. The hydrogen gas and oxygen gas may optionally be collected and sold or used.

Example 6

This examples describes running a system comprising two reactors to produce acid and base, which can be used in chemical dissolution and/or precipitation reactions.

A system comprising two reactors in fluidic connection are run. The first reactor produces base, dihalide (e.g., $Cl_2$), and hydrogen gas. The first reactor and second reactor are in fluidic connection, and hydrogen gas and dihalide produced in the first reactor are transported to the second reactor. Water is also added to the second reactor, and the second reactor produces acid (e.g., HCl).

The base is collected from the first reactor with a first apparatus and the acid is collected from the second reactor with a second apparatus. The acid is used in a chemical dissolution in the second apparatus, such as the chemical dissolution of solid $CaCO_3$ to $Ca^{2+}$ and $CO_3^{2-}$ ions. The second apparatus is in fluidic connection with the first apparatus, and the $Ca^{2+}$ ions from the second apparatus are transported to the first apparatus, where they react with the base in a precipitation reaction to form $Ca(OH)_2$. The $Ca(OH)_2$ may optionally be used in a cement-making process, for example, with a kiln and/or a heater.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
   producing an acid;
   dissolving a material comprising calcium and silicon with the acid to produce calcium ions;
   treating the calcium ions to produce solid calcium hydroxide and/or calcium oxide; and
   heating the solid calcium hydroxide and/or calcium oxide in a kiln to produce a cement.

2. The method of claim 1, wherein the material comprises a metal oxide comprising calcium and/or silicon.

3. The method of claim 1, wherein producing the solid calcium hydroxide and/or calcium oxide comprises producing a byproduct different from the calcium hydroxide and/or calcium oxide.

4. The method of claim 3, wherein the material further comprises at least one of the following elements: magnesium, aluminum, or iron.

5. The method of claim 4, wherein the byproduct comprises magnesium.

6. The method of claim 5, wherein the byproduct comprises magnesium carbonate formed through a reaction with carbon dioxide.

7. The method of claim 1, further comprising heating the solid calcium hydroxide and/or calcium oxide with silica and/or alumina in the kiln to produce the cement.

8. The method of claim 1, further comprising heating the solid calcium hydroxide and/or calcium oxide with silicate in the kiln to produce the cement.

9. The method of claim 1, wherein the cement is Portland cement.

10. The method of claim 1, wherein dissolving the material in the acid occurs in a region of a reactor with a pH of 6 or less.

11. The method of claim 1, further comprising heating the calcium hydroxide in a heater to convert the calcium hydroxide to calcium oxide.

12. The method of claim 1, wherein the acid comprises a hydrogen halide.

13. The method of claim 12, wherein the hydrogen halide comprises HCl, HBr, and/or HI.

14. The method of claim 2, wherein the metal oxide comprises $SiO_2$.

15. A method comprising:
    producing an acid;
    dissolving a material comprising calcium oxide and silicon oxide with the acid to produce calcium ions;
    treating the calcium ions to produce solid calcium hydroxide and/or calcium oxide and a byproduct different from the calcium hydroxide and/or calcium oxide; and
    heating the solid calcium hydroxide and/or calcium oxide with silica, alumina, and/or silicate in a kiln to produce a cement.

16. The method of claim 15, wherein the material further comprises at least one of the following elements: magnesium, aluminum, or iron.

17. The method of claim 16, wherein the byproduct comprises magnesium.

18. The method of claim 17, wherein the byproduct comprises magnesium carbonate formed through a reaction with carbon dioxide.

19. The method of claim 15, wherein the cement is Portland cement.

20. The method of claim 19, wherein the acid comprises HCl, HBr, and/or HI.

* * * * *